United States Patent
Polis et al.

(10) Patent No.: US 7,375,841 B1
(45) Date of Patent: May 20, 2008

(54) GENERATING A COURIER SHIPPING LABEL OR THE LIKE, INCLUDING AN ORNAMENTAL GRAPHIC DESIGN, AT NON-COURIER PRINTER

(75) Inventors: Jared Schutz Polis, Boulder, CO (US); David McCarter, San Diego, CA (US)

(73) Assignee: Provide Commerce, Inc., San Diego, CA (US)

( * ) Notice: Subject to any disclaimer, the term of this patent is extended or adjusted under 35 U.S.C. 154(b) by 269 days.

(21) Appl. No.: 09/847,644

(22) Filed: May 2, 2001
(Under 37 CFR 1.47)

Related U.S. Application Data

(63) Continuation of application No. 09/776,956, filed on Feb. 5, 2001, which is a continuation-in-part of application No. 09/149,650, filed on Sep. 8, 1998.

(51) Int. Cl.
*G06K 15/00* (2006.01)
*G06F 3/12* (2006.01)

(52) U.S. Cl. ..................... 358/1.18; 358/1.15
(58) Field of Classification Search .............. 358/1.18, 358/1.15, 1.12, 1.11, 1.5, 1.9, 1.1, 1.2, 1.3, 358/1.4, 1.6, 1.14, 1.16, 1.17, 1.13; 700/233, 700/232; 707/586; 705/26, 29, 33, 34, 40, 705/408, 1, 28; 347/2, 3, 5; 399/1, 2
See application file for complete search history.

(56) References Cited

U.S. PATENT DOCUMENTS

| | | | |
|---|---|---|---|
| 4,622,768 A * | 11/1986 | Moreau | 40/124.11 |
| 5,699,526 A | 12/1997 | Siefert | 395/227 |
| 5,706,106 A * | 1/1998 | Monaghan | 359/1 |
| 5,951,643 A | 9/1999 | Shelton et al. | 709/227 |
| 5,991,791 A | 11/1999 | Siefert | 709/100 |
| 6,026,403 A | 2/2000 | Siefert | 707/10 |
| 6,085,126 A * | 7/2000 | Mellgren, III et al. | 700/233 |
| 6,169,997 B1 | 1/2001 | Papierniak et al. | 707/501 |
| 6,206,750 B1 * | 3/2001 | Barad et al. | 446/268 |
| 6,253,203 B1 | 6/2001 | O'Flaherty et al. | 707/9 |
| 6,480,855 B1 | 11/2002 | Siefert | 707/10 |
| 6,502,096 B1 | 12/2002 | Siefert | 707/10 |
| 6,519,600 B1 | 2/2003 | Siefert | 707/10 |
| 6,714,931 B1 | 3/2004 | Papierniak et al. | 707/10 |

* cited by examiner

Primary Examiner—Dov Popovici
(74) Attorney, Agent, or Firm—Peter K. Trzyna, Esq.

(57) ABSTRACT

Computer system and method to generate an ornamental design on a member from a group consisting of a courier waybill shipping label, a greeting card, and a packing list, the method including: assigning, with a consumer system, signals corresponding to the member; transmitting the signals to an order center; combining, the signals with signals corresponding to an ornamental design; printing the member and printing the ornamental design on the member, at a shipper printer device; and shipping the member under control of the order center computer in accordance with waybill shipping information signals triggered by the ordering center computer.

79 Claims, 44 Drawing Sheets

FIG. 2

Order: Blue Irises [20IRIS ST]
Order Nr: JSCHU8113300 (Sheet 1 of 1)
Quantity: 1
Order Date: 23 April, 1998
Deliver By: 24 April, 1998
Ship To: Nicholas Rodgers
Proflowers, Inc.
8436 S. Yarrow St.
Littleton, CO 80123 US
Phone: 303-555-5555

Here are some roses for you to enjoy.

Jared Schultz

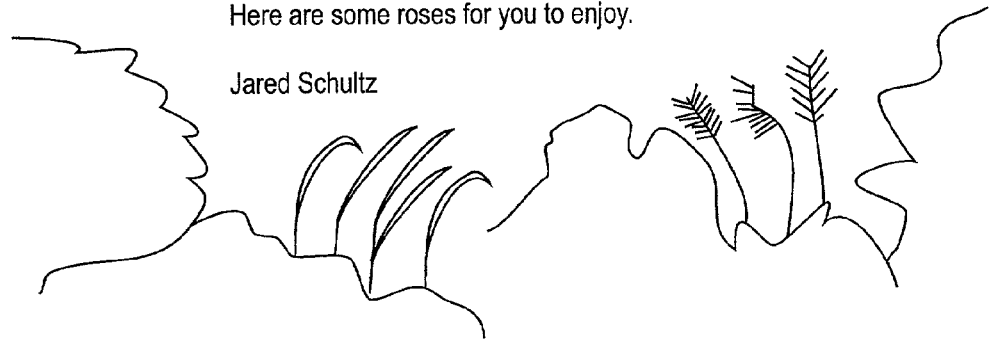

SHIPPER'S FEDEX ACCOUNT NUMBER

FedEx.

From: Phone: (303)415-9806

Federal Express

SHIP DATE:23APR98
MAN WGT:5LBS.
DIMMED:34X8X6

ProFlowers.com
850 Mitten Rd.

Burlingame, CA 94010
To: Phone: (303)555-5555
NICHOLAS RODGERS
PROFLOWERS, INC.
8436 S. YARROW ST.

Littleton, CO 80123
REF:JSCHU8113300 (1 of 1)

RELEASE#:
6208951

DELIVERY ADD K833
TRK # 7900 7883 4884   PRIORITY OVERNIGHT

FRI
AI

FORM ID: 0201    DEN WN BJC

801-CO-US

Deliver by:
24APR98

FIG. 9

Proflowers.com

Proflowers.com ships all arrangements FedEx Overnight directly from growers! All arrangements are packed in ice, and include plant food & care guide.

Welcome to Proflowers.com!

▲ Our Featured Items this month:

Occasion Name 1

An arrangement of pink asiatic lilies pale yellow or peach gerberas, white freesia and pink roses.

Our Price: $29.95 plus S&H

Click for Details | Buy this arrangement

Occasion Name 2

Bring spring into the life of some one special with this exquisite bouquet of 20 vividly colored graceful tulips.

Our Price: $29.95 plus S&H

Click for Details | Buy this arrangement

▲ More Arrangements

▲ Fresh Cut Long Stem Roses! Only $29.95 plus shipping

---

Shop:

<select an occasion> ▶ or
<select a flower type> ▶
Show Me

▼ Tip: You may browse our inventory by selecting an occasion or flower type.

Features:
▲ About Proflowers.com
▲ Flower Guide
▲ Flower Care

▼ Tip: Click on an item to learn more about Proflowers or flowers in general.

Customer Service:
<select a service option> ▶

▼ Tip: Got a question? Problem with an order? Select a service option from the menu.

[May 10] ▲ Reminder Service

[NEW!] ▲ Monthly Contest!

FIG. 10

Proflowers.com

Proflowers.com ships all arrangements FedEx Overnight directly from growers! All arrangements are packed in ice, and include plant food & care guide.

Shop:
- <select an occasion> or
- <select a flower type>
- Show Me

▼ Tip: You may browse our inventory by selecting an occasion or flower type.

Features:
- ▲ About Proflowers.com
- ▲ Flower Guide
- ▲ Flower Care

▼ Tip: Click on an item to learn more about Proflowers or flowers in general.

Customer Service:
- <select a service option>

▼ Tip: Got a question? Problem with an order? Select a service option from the menu.

▲ Reminder Service
▲ Monthly Contest!

Welcome to Proflowers.com!

▲ Our Featured Items this month:

Occasion Name 1
An arrangement of pink asiatic lilies pale yellow or peach gerberas, white freesia and pink roses.

Our Price: $29.95 plus S&H

Click for Details | Buy this arrangement

Occasion Name 2
Bring spring into the life of some one special with this exquisite bouquet of 20 vividly colored graceful tulips.

Our Price: $29.95 plus S&H

Click for Details | Buy this arrangement

▲ More Arrangements
▲ Fresh Cut Long Stem Roses! Only $29.95 plus shipping

Proflowers.com

Proflowers.com ships all arrangements FedEx Overnight directly from growers!
All arrangements are packed in ice, and include plant food & care guide.

Shop:
- <select an occasion> ▶
- or
- <select a flower type> ▶
- Show Me

Features:
- ▲ About Proflowers.com
- ▲ Flower Guide
- ▲ Flower Care

Customer Service:
- ▲ <select a service option> ▶

[May 10] ▲ Reminder Service

[NEW] ▲ Monthly Contest!

🏠 Home

Billing Information:    (✓) : mandatory fields
▲ Please bill to:
First Name: [_____] ✓
Last Name: [_____] ✓
Address 1: [_____] ✓
Address 2: [_____]
City: [_____] ✓
State/Prov.: [___▶] ✓   Zip/Postal Code: [____] ✓
Phone: [_____] ✓

▲ Billing Method:
Credit Card: [<select card> ▶] ✓   Exp. Date: [__] (mm/yy) ✓
Cardholder: [_____] ✓
Account #: [_____] ✓   Your Credit Card information is stored on a separate server, and is completely secure.

▲ Email Address: [_____]
Your email address will be used to recall your saved profile and to notify you if there are any problems with your order. It cannot be used to access your credit card information.
[✓] Please email me about special Proflowers.com offers and specials.

<<Cancel this Order          Continue>>

FIG. 20

Proflowers.com

Proflowers.com ships all arrangements FedEx Overnight directly from growers!
All arrangements are packed in ice, and include plant food & care guide.

Shop:
<select an occasion> or
<select a flower type>
Show Me

Features:
▲ About Proflowers.com
▲ Flower Guide
▲ Flower Care

Customer Service:
<select a service option>

▲ Reminder Service

▲ Monthly Contest!

🏠 Home

Review your order:
Please take a moment to review your order.
If the information is correct, click "Confirm Order>>" to complete your order.

| Item: | Quantity: | Price: | Shipping: | Total: |
|---|---|---|---|---|
| Item Name | 1 | $29.95 | $4.95 | $34.80 |

Card Message:
Happy Holidays
Sincerely, Sender

Delivery Date:
4/20/98    Change...

Ship to:
Recipient Name
1234 Main St.
Anytown, CA 90001    Change...

Bill to:
Recipient Name
1234 Main St.
Anytown, CA 90001

<Cancel this Order     Continue>>

FIG.22

Proflowers.com

Proflowers.com ships all arrangements FedEx Overnight directly from growers!
All arrangements are packed in ice, and include plant food & care guide.

Shop:
- <select an occasion> ▶ or
- <select a flower type> ▶
- Show Me

Features:
- ▲ About Proflowers.com
- ▲ Flower Guide
- ▲ Flower Care

Customer Service:
- <select a service option> ▶

▶ Reminder Service
▶ Monthly Contest!

---

🏠 Home

Order Confirmed:

Please print this page and keep it for your records.

You may track or review this order at a later time by selecting "View Order" from the Customer Support menu.

Order Number: USERN898300

| Item: | Quantity: | Price: | Shipping: | Total: |
|---|---|---|---|---|
| Item Name | 1 | $29.95 | $4.95 | $34.80 |

Card Message: Happy Holidays
Sincerely, Sender

Delivery Date: 4/20/98

Ship to:
Recipient Name
1234 Main St.
Anytown, CA 90001

Bill to:
Recipient Name
1234 Main St.
Anytown, CA 90001

( Done )    ( Place Another Order )

FIG. 23

Proflowers.com

Proflowers.com ships all arrangements FedEx Overnight directly from growers!

All arrangements are packed in ice, and include plant food & care guide.

Shop:
▲ <select an occasion> ▶
or
<select a flower type> ▶
Show Me

Features:
▲ About Proflowers.com
▲ Flower Guide
▲ Flower Care

Customer Service:
▲ <select a service option> ▶

▲ Reminder Service

▲ Monthly Contest!

◀ ▶

← Home

▲ About Proflowers.com
Great Quality
Unlike other floral delivery services, Proflowers flowers are shipped directly from the growers and are several days fresher than flowers you might find in your local store. We guarantee the composition and quality of our bouquets with a full satisfaction, money-back guarantee. We have not found any competitor with a similar commitment, and we believe it is just another way of offering better service to you, our valued customer.

Exceptional Value
Because we ship directly from the growers to you, there is no costly middleman. You are buying flowers at wholesale rate, and even with shipping cost, most assortments are 20-30% below comparable retail price and our assortments are fresher, too!

We Appreciate Your Business
Our network of growers and importers represent some of the finest in the country. Our extensive selection process and quality review ensures that all Proflowers.com growers are "a peak above the rest" in the quality and freshness of their flowers.

You, too can order flowers DIRECT from growers! That's right, cut from the field and into your living room in 24 hours!

Each Proflowers.com floral assortment is guaranteed to be of the highest quality and consist of the flowers specified. We have a 100% guarantee on all orders. If the flowers do not arrive in beautiful, fresh condition, we will refund your money.

FIG. 28

Proflowers.com

Proflowers.com ships all arrangements FedEx Overnight directly from growers!
All arrangements are packed in ice, and include plant food & care guide.

Shop:
▲ <select an occasion> ▶ or
▲ <select a flower type> ▶
Show Me

Features:
▲ About Proflowers.com
▲ Flower Guide
▲ Flower Care

Customer Service:
▲ <select a service option> ▶

▲ Reminder Service

▲ Monthly Contest!

🏠 Home

▲ Customer Service : View Order

Order Number:
USERN898300

Order Status:
Has not shipped

Item:
Item Name

Quantity:
1

Price:
$29.95

Shipping:
$4.95

Total:
$34.80

Card Message:
Happy Holidays
Sincerely, Sender

Delivery Date:
4/20/98
Change....

Ship to:
Recipient Name
1234 Main St.
Anytown, CA 90001
Change....

Bill to:
Recipient Name
1234 Main St.
Anytown, CA 90001

Cancel Order

Done Viewing Order

Proflowers.com

Proflowers.com ships all arrangements FedEx Overnight directly from growers!
All arrangements are packed in ice, and include plant food & care guide.

Shop:
<select an occasion> ▶ or
<select a flower type> ▶
Show Me

Features:
▲ About Proflowers.com
▲ Flower Guide
▲ Flower Care

Customer Service:
▲ <select a service option> ▶

May 10 ▲ Reminder Service

NEW ▲ Monthly Contest!

◀ ▶

🏠 Home

Modify Billing Information: (✓) : mandatory fields
▲ Please bill to:
Verify that your billing information is correct:

First Name: [First Name] ✓
Last Name: [Last Name] ✓
Address 1: [Address 1] ✓
Address 2: [Address 2] ✓
City: [City] ✓
State/Prov.: [ST] ▶ ✓ Zip/Postal Code: [92001] ✓
Phone:

▲ Billing Method:
If you received a notice that your card has been declined, enter new card information here:

Credit Card: [<select card>] ▶ ✓ Exp. Date: [  ] (mm/yy) ✓
Cardholder: [                    ] ✓
Account #: [                    ] ✓

Your Credit Card information is stored on a separate server, and is completely secure.

⟵ Cancel this Order                    Continue ⟶

FIG. 39

Proflowers.com

Proflowers.com ships all arrangements FedEx Overnight directly from growers!
All arrangements are packed in ice, and include plant food & care guide.

Shop:
▲ <select an occasion> ► or
<select a flower type> ►
Show Me

Features:
▲ About Proflowers.com
▲ Flower Guide
▲ Flower Care

Customer Service:
▲ <select a service option> ►

▲ Reminder Service

▲ Monthly Contest!

🏠 Home

△ Monthly Contest

FREE ROSES FOR MOTHER'S DAY

Submit a brief story to us (no longer than one paragraph) about how flowers have made a positive impact in you rlife. If we choose to use your story, we will supply you with a dozen, high-quality, long-stemmed roses for delivery anywhere in the United States at no charge.

(✓) : mandatory fields

▲ Entry Form:
First Name: ✓
Last Name: ✓
Email Address: ✓
Phone: ( ) ✓
Your Story: ✓

Submit Entry

FIG. 41

AFFILIATES PROGRAM                             http://www.proflowers.com/cfm/affiliates.cfm/

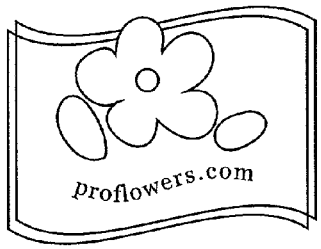

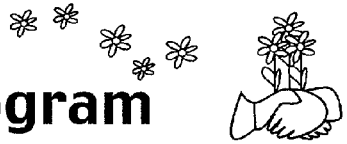

affiliates program

Join the Proflowers Affiliates Program

Earn commissions of between 7% and 10%!

Flowers are a wonderful way to mark a special occasion or holiday and to say "I love you," "Congratulations," "Get Well," "Happy Birthday," "Happy Anniversary," or "Keep up the good work!" Flowers are also a big business. In 1996, American consumers purchased almost $14 billion of flowers.

| Select an Occasion ▼ |
| Select a Flower Type ▼ |
| More Arrangements... ▼ |

( Show Me! )

- Home
- About Us
- Flower Guide
- Flower Care
- Shipping Info
- Reminder Service
- Customer Service
- Monthly Contest
- Track/Modify Order
- How to Order With Proflowers, you can offer your Web site visitors beautiful fresh cut flowers and specially designed arrangements that are shipped direct from the grower via FedEx Priority Overnight. A fully automated system provides a direct link between the grower and FedEx, and the savings are passed along to the consumer. Your Web site visitors will save between 30% and 40% compared with other flower sites on the Internet.

Proflowers is pleased to announce that bluemountain.com, the leading electronic greeting card site, has joined the Proflowers affiliate network.

What you need to join the Proflowers Affiliate Network:
1. Read our Affiliate Network Agreement.
2. Complete the online application.
3. If you're accepted, we'll send you all the information that you need to get started.

- Customer Survey

| Chocolates ▼ |

( vote ) ( results )

Frequently Asked Questions
Application Form
Affiliate Network Agreement

Proflowers has been awarded a three star rating (the highest possible!) from Refer-It, a leading affiliate rating service. 

Copyright©.1998 proflowers.com

FIG. 42

DOM
TRK#: [1 of1]  Order#BJOHN1236000

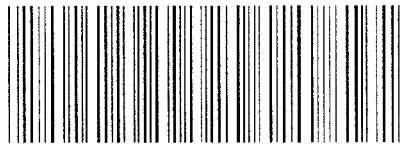

CALIFORNIA NURSERY STOCK
CERTIFICATE FOR INTERSTATE AND INTRASTATE
SHIPMENTS
NO: A2251001
THIS PLANT MATERIAL OR NUrSERY OR PREMISES FROM
WHICH THIS SHIPMENT WAS MADE HAS BEEN INSPECTED
AND FOUND FREE FROM ESPECIALLY INJURIOUS PLANT
PESTS AND DISEASE SYMPTOMS.
THIS SHIPMENT NEED NOT BE HELD FOR INSPECTION IN CA.
Issued By: Humboldt Country Agricultural and California
Department of food & AG.
1220 N. Sreet, Sacramento, CA 95814
CONTENTS-CUT FLOWERS
BOUQUET MIX Customer Service
Proflowers.com
5005 Waterridge Vista Drive
Second Floor
San Diego, CA 92121
1.800.776.3569

Ship Date: 2/12/01

RELEASE #
6208951

TO: Brad Johnson
Proflowers
3975 Gloria Lane
Carlsbad, CA 92008 US
858.729.2756

REF: Order#BJOHN1236000

TUE
Deliver By:
14FEB01

TRK #     FORM ID: 0201

MON

Updated Order

SYSTEM # 0008564  12FEB01
92008-CA-US     SJC     AA

A5 MRYA

ORDER: Christmas Wreath
Order#: BJOHN1236000 [1 of1]
Quantity: 1

BJOHN1236000

Ship Date:   2/12/01
Ship To:     Brad Johnson
             Carlsbad, CA 92008 US 1-800-PROFLOWers     Order#: BJOHN1236000

FIG. 43

Dear Andrea,
Happy Valentine's Day!!!
I guess today, as good as any other day, I'm
thanking ya for your friendship; you are truly
cherished.  Johnny Korn

ORDER:        Blue Irises [20IRIS ST]
Accessories:  Fine Chocolates
Order #:      ASULT0251000 [1 of1]
Quantity:     1
Deliver By:   2/14/00
Ship To:      Andrea Sltenfuss
              Florida Fantasies (Can Come True)
              3910 Irving Street - Harrison Building
              Rm 0517/Box 0204
              Philadelphia, PA 19104 US
              Phone: 215-417-8067

SHIPPER'S FEDEX ACCOUNT NUMBER

From:        Phone: (619)454-9850
Customer Service
ProFlowers
3160 UPPER BAY ROAD

FedEx
Fedral Express

SHIP DATE: 14FEB00
CAD # 0061276
MAN WGT:5 LBS.

DOM
TRK #: 472917938535
Order#: ASULT0251000
[1 of 1]

ARCATA          CA 94010
To:             Phone: (215)417-8067
ANDREA SULTENFUSS
FLORIDA FANTASIES (CAN COME TRUE)
3910 IRVING STREET - HARRISON BUILD
RM 0517/BOX0204
PHILADELPHIA    PA 19104

PRIORITY OVERNIGHT
BILL THIRD PARTY

RELEASE#:
6208951

REF:ASULT0251000
DELIVERY ADD K833

TRK # 4729 1793 8535    PRIORITY OVERNIGHT

FORM ID: 0201

801-PA-US

PHL
SF BBXA

SPU
MON
A1

Deliver by:
14FEB00

GENERATING A COURIER SHIPPING LABEL OR THE LIKE, INCLUDING AN ORNAMENTAL GRAPHIC DESIGN, AT NON-COURIER PRINTER

This is a continuation-in-part of, and claims priority from, U.S. Patent Application Ser. No. 09/149,650 filed Sep. 8, 1998, and a continuation of U.S. Patent Application Ser. No. 09/776,956, filed Feb. 5, 2001, both of which are incorporated by reference.

I. COPYRIGHT NOTICE

A portion of the disclosure of this patent document contains material which is subject to copyright protection. The copyright owner has no objection to a statutory fair use of this material, as it appears in the files of the files or records of the U.S. Patent and Trademark Office, but otherwise reserves all copyright rights whatsoever.

II. FIELD OF THE INVENTION

This invention concerns a digital electrical apparatus, methods, articles of manufacture, and data structures involving the same, applied to the field of shipment and product production and transportation. More particularly, this invention relates to a digital computer control system located at an ordering center for shipping product from a remotely located distribution center. Even more particularly, the computer control system handles orders received from various consumer ordering system and coordinates with financial institution and courier computer systems to carry out the delivery of product preferably manufactured at a distribution center. Efficient communications are effectuated over a communications system utilizing an open end network gateway, TCP/IP lines, and local servers.

Still more particularly the present invention is directed toward graphic ornamentation of a courier label, packing list, or the like that is computer-generated preferably at a shipper's location (such as a distribution center), e.g., by using shipping label data assigned by/from a carrier computer.

III. BACKGROUND OF THE INVENTION

In order to teach a preferred embodiment of the present invention by way of an example, the following disclosure is directed to the sale of flowers, though the same can be said about many other such areas of commerce.

Have you recently tried to order a dozen roses? It is expensive. As of today, FTD is charging a total cost of about $65. Why is the cost so high? Generally, there are lots of players in the production and distribution chain.

Consider the following. A grower produces the flowers at a location that could be almost anywhere in the country. (Foreign production has added importation problems.) A transportation company moves harvested flowers from the grower to a wholesaler's warehouse, usually in a refrigerated truck. The wholesaler usually amalgamates flowers from several growers to build a warehouse inventory to supply orders. Private trucking companies or couriers are used to ship the flowers from the wholesaler's warehouse to retail flower shops, which also could be almost anywhere in a particular country. Superimposed on this retail chain is a series of order clearinghouses, such as FTD, Interflora, 1-800-flowers, or the like. These companies route consumer's orders to local florists to carry out a local delivery—usually by an employee of the local flower shop. Often a greeting card, ribbons, candy, etc. produced by respective manufacturers is (are) conveyed along with the flowers. The clearinghouse (or referring floral store) handles the bill for the flower sale, and the money is distributed to others, one way or another, in the distribution chain. However, even to a charge card company like American Express can take a cut from the sale.

Here is an approximate cost breakdown: the people who receive the orders—either the referring local flower shop or the clearinghouse—receives about 20% of the sale price: 10% goes to the grower, 10% goes to shipping, 5% goes to miscellaneous e.g, American Express) and 55% goes to the retail florist that actually delivered the product. It is no wonder that the price for a dozen roses from FTD is about $65. The approach of the prior art is many things, but it certainly is not an efficient system.

The primary problem with this approach is that the product that is being delivered must pass through many intermediaries, each of which takes a profit and has a cost for overhead for some period of time. Additionally, the flowers are usually 3-6 days old by the time they are delivered to the consumer—a serious problem because most of the transportation is not refrigerated and the goods are highly perishable.

In sum, prior to the present invention, there existed a labor-intensive system with many intermediaries for delivering old flowers and other such products to consumers.

IV. SUMMARY OF THE INVENTION

It is an object of the present invention to provide an apparatus, method, and article of manufacture involving a digital electrical computer apparatus located at an order center for shipping a product from a remotely located distribution center by steps including: assigning shipping information signals to the consumer order; linking, by digital communication, the signals a packing list with the shipping information signals; printing the packing list and the shipping information signals at a printer at a distribution center; and shipping the product, along with the shipping label, from the distribution center.

It is another object of the present invention to provide an apparatus, method, and article of manufacture involving computer-implemented conveyance of a consumer-composed element, such as a greeting card, from the ordering center to the distribution center for printing and shipment along with the shipping label, at the printing device at the distribution center.

It is another object of the present invention to provide an apparatus, method, and article of manufacture involving distribution from the location where the product was produced, e.g., the grower shipping flowers directly to the consumer.

It is another object of the present invention to provide an apparatus, method, and article of manufacture involving use of a sheet for the printing at the local distribution center, the sheet having demarcations, preferably perforations, such that the packing list, shipping label, and greeting card (even with preprinted artwork and the consumer customizable message, words, a graphical element, etc.) can be conveniently separated.

It is yet another object of the present invention to provide an apparatus, method, and article of manufacture involving dynamically assigning the shipping and other information signals through a TCP/IP connection, and preferably via an open end or front end network gateway It is yet another object of the present invention to provide an apparatus, method, and article of manufacture involving efficient communications with a fax modem in a local calling area of the distribution center and/or a remote fax server for a subsequent transmitting over the communications system to a fax machine as the printing device at the distribution center.

It is yet another object of the present invention to provide an apparatus, method, and article of manufacture involving translating at the ordering apparatus to produce the signals representing the packing list, the shipping list, and the consumer customizable element in one digital format.

It is yet another object of the present invention to provide an apparatus, method, and article of manufacture involving associating an order code signals with each said consumer order at the ordering apparatus, obtaining shipping status information signals from the digital electrical computer shipping system, and combining these signals at a machine-readable site having an address for access by a consumer's digital electrical computer—and preferably providing notice of the address by printing it on such locations as the packaging for the product.

It is a further object of the present invention to provide an apparatus, method, and article of manufacture involving an order center capable of receiving orders from a consumer computer and/or a telephone.

These and other objects evident in contrasting the prior art with the present invention are addressed by providing a revolutionary distribution technology that enables centralized control of remote shipping—preferably from the site of the grower or analogous product producer. The system is faster and less expensive because there are fewer intermediaries and significant digital operations. The result is a faster and more efficient system.

This example of the invention has a communications system that can include a telephone system, and preferably an open or front end network gateway system such as the Internet and TCP/IP communications, and more preferably local fax servers. The communications system is used by a consumer ordering system, such as a computer or a telephone, to communicate an order to an order center computer system. The order center computer system communicates over the communications systems with computer systems of a courier and a financial institution, as well as to a printer device at a remotely located distribution center. The printer device can be as simple as a fax machine, preferably loaded with special paper easily dividable into portions including a packing list, a shipping label, and a consumer composed element, such as a message, graphical element, or the like.

By utilizing this system, the ordering center can receive the order, obtain information for generating a shipping label, and trigger a courier vehicle to go to the distribution center to pick up a shipment. The shipping label, packing list, and consumer-composed communication are translated into the same digital format and efficiently conveyed to the distribution center printing device. Printing at the device signals those at the distribution center (e.g., flower grower) to package flowers according to the packaging label, package them with suitable packaging in a box with the consumer-composed greeting card message, and attach the shipping label to the box. (Preferably, the product is produced in response to a consumer order, thereby minimizing waste and storage.) The courier picks up the box and delivers it the next morning to the consumer.

The result is a faster delivery (next day rather than 3-6 days), resulting in fresher product and less inventory. Another result is fewer intermediaries, so the cost of production and delivery is reduced. The consumer-composed message permits delivery of something individually customized and fulfilled just for the recipient. If there is any concern about the delivery, a consumer can use a computer/telephone accessible status location (e.g., Internet address) to immediately determine the status of an order. Billing is efficiently handled because a pick-up by the courier is communicated to the courier shipping system, and in turn to the order center system, resulting in automatic billing to the financial institution computer system.

It is, therefore, respectfully submitted that the present invention provides an improvement over the prior art that brought the public a dozen roses for $65 for much less.

V. BRIEF DESCRIPTION OF THE DRAWINGS

FIG. 2 is an illustration of a sheet structured and configured for printing in accordance with the present invention.

FIG. 9 is a detailed frameset overview diagram.

FIG. 10 is a home page illustration.

FIG. 18 is a recipient information screen.

FIG. 19 is a billing information screen.

FIG. 20 is an order summary screen.

FIG. 22 is an order confirmed screen.

FIG. 23 is an about proflowers.com screen.

FIG. 28 is a view order (order summary) screen.

FIG. 29 is a cancel order review screen.

FIG. 32 is a modify billing information screen.

FIG. 39 is a contest entry screen.

FIG. 41 is a customer affiliates information screen.

FIG. 42 is an illustration of a representative courier shipping label including an ornamental graphic design.

FIG. 43 is an illustration of representative printing, including for a greeting card, for a packing list, and for a courier shipping label including respective ornamental graphic designs.

VI. DETAILED DESCRIPTION OF THE DRAWINGS

Figure 1:
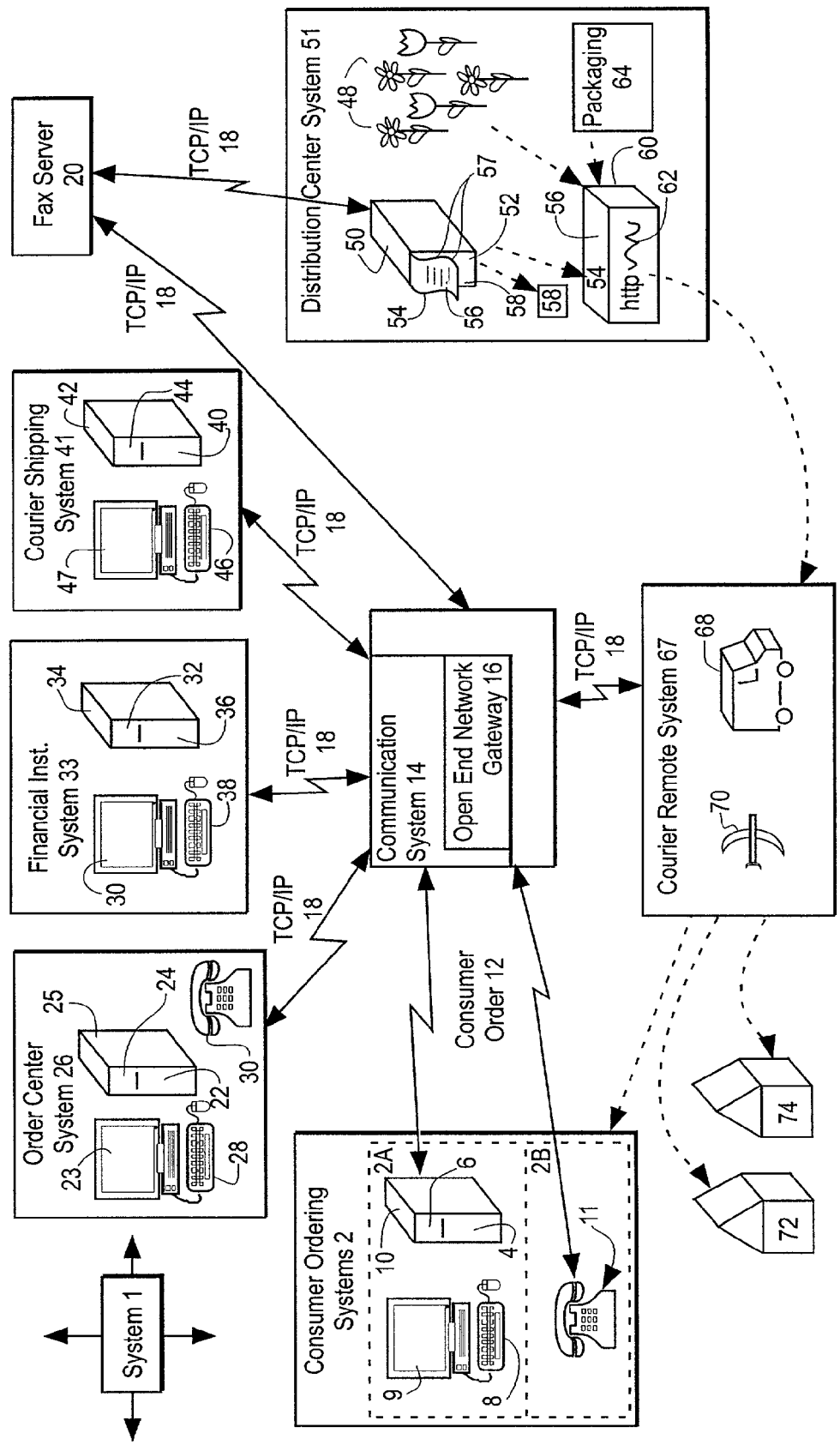
FIG. 1 is an illustration of elements of the present invention.

Turning now to FIG. 1, an overview of the invention is illustrated using flower production and delivery as a general example of a production and shipping System 1 suitable for many other such products.

Operation of the invention begins with the consumer calling in from anywhere on the world or otherwise placing an order generally characterized in FIG. 1 as Consumer Ordering Systems 2. Consumer Ordering Systems 2 is represented with two components: Component 2A and 2B. Component 2A shows a Computer 4 that includes a Microprocessor 6 controlled by a Computer Program 10. The Computer 4 is also connected to a Keyboard 8 and Monitor 9 to allow entry of data and information into the computer to convert the data and information into electrical signals per subsequent communications. Of course, an equivalent approach would be to use a dumb terminal or other input device to an open end network gateway (e.g., TV via cable).

Alternatively, Consumer Ordering Systems 2 can be carried with a Telephone 11 as shown in Component 2B. In either case of 2A or 2B a consumer can place an Order 12 by connecting either the Computer System of 2A or the Telephone 11 of 2B to a Communications System 14, including for example a telephone network. The Communications System 14 also preferably includes a Front End or Open End Network Gateway 16 (or a plurality thereof, for example, the Internet. Accordingly, a consumer Order 12 is received by the Communication System 14 and perhaps the Open End Network Gateway 16 for further communication, for example, to an Order Center System 26.

Order Center System 26 receives a communication preferably by a TCP/IP 18 Communication, which is a preferred embodiment. At the Order Center System 26 there is shown a Computer 22 that also has a respective Processor 24 controlled by a Computer Program 26. The Computer 22 is electrically connected to Keyboard 28 and to Monitor 23 so that at Order Center System 26 information can be entered at the Keyboard 28 and converted into electrical signals for processing and transforming in the Computer 22 and displayed on the Monitor 23. Communications can come from the Communication System 14 to the Order Center System 26 or communications can go from the Order Center System 26 to the Communication System 14.

Also shown in FIG. 1 is a Financial Institution System 33. Financial Institution System 33 includes its respective Computer 32 which has a Processor 36 controlled by a Computer Program 34. It respectively is connected to its own Keyboard 38 and Monitor 39 to form a system having analogous components to those described of the Order Center System 26. Mastercard and American Express computer operations are representative of such systems.

Also shown in FIG. 1 is a Computer Shipping System 41 which includes its respective Computer 40 having its respective Microprocessor 44 controlled by its respective Computer Program 42 and the Computer 40 is electrically connected to Keyboard 46 and Monitor 47. In like manner to that which has been discussed above, information can be entered at the Keyboard 46 for being converted into electrical signals for processing by the Computer 40 and for display on the Monitor 47. Federal Express and UPS computer operations are representative of such systems.

Order Center System 26 and Financial Institution System 33 and Courier Shipping System 44 each can communicate and be linked individually or collectively to Communication System 14, preferably by a TCP/IP 18 connection.

The Order Center System 26 assigns the Consumer Order 12 intelligently to the correct Distribution Center System 51—preferably there are multiple Distribution Center Systems 51 and an incoming Consumer Order 12 is assigned by the Order Center System 26 to the appropriate Distribution Center System 51 by using such factors as price, inventory, product quality, geographical location, and indeed any other factors that may be desirable. The Order Center System 26 "knows" this information because it is received, preferably by computer communication from a digital electrical computer system (not shown in FIG. 1) at the respective Distribution Center Systems 51. This information is organized into a database of Distribution Center Systems 51.

Also shown in FIG. 1 is a Fax Server 20 which additionally which additionally is preferably a TCP/IP 18 connection between Communication System 14 and Fax Server 20. Fax Server 20 communicates to a Distribution Center System 51 which is the location for producing a product to be shipped as represented in FIG. 1 by Flowers 48. Also shown in Distribution Center System 51 is a Printing Device 50, for example a fax machine, and shown in FIG. 1 being produced by the Fax machine in response to a communication from the Fax Server 20 is Sheet 52 which has three components: 54, 56, and 58, each divided by perforated lines shown as 57. The components 54, 56, and 58 include a Packing List 58, a Customizable Component 56 and a Shipping Sheet or label, for example a Federal Express label, 54.

The product is preferably produced at the Distribution Center System 51, for example, Flowers 48 are grown at the Distribution Center System 51. In response to an order printed on Sheet 52, the Flowers 48 are harvested and located inside a Box 60 with packaging 64 including a coolant and insulation and such other packaging as may be suitable for the product. The Sheet 52 is separated at Perforations 57, and preferably a consumer customizable message 56 (such as a personal message or graphical image) is located within the Box 60 with the Packaging 64 and the Product 48. The Shipping Label 54 is located on the outside of the Box 60, and the Packing List 58 is retained by the Distribution Center System 51.

Printed on the exterior of Box 60 is a notice for obtaining order status information, such as an address on the Open End Network Gateway 16, for example, an Internet address (e.g., beginning with HTTP). The address is useful for informing those in the overall process of how to reach a web page provided by the Order Center System 26.

Also shown on FIG. 1 is a communications arrow, also preferably a TCP/IP 18 communications link between Communication System 14 and Courier Remote System 67. This allows the Courier Shipping System 41 to communicate via Communication System 14 to the Courier Remote System 67. Courier Remote System 67 includes a Vehicle 68, for example a Federal Express truck, equipped with scanning equipment. Courier Remote System 67 may also include such other transportation systems as may be necessary, for example an Airplane 70. In carrying out an order a Vehicle 68 would go to the Distribution Center System 51 to pick up a Box 60. It will use the scanning equipment to scan the Order 54 into the Courier Remote System 67 for later communication back to the Courier Shipping System 41. The Courier Remote System 67 then facilities transportation of the Box 60 from the Distribution Center System 51 to an ultimate recipient in FIG. 1., for example as Recipient 72 or Recipient 74 or even the recipient being the location of the Consumer Ordering System 2.

To illustrate how the System 1 is used to implement an order more generally, a Consumer Order 12 is placed via one of the Consumer Ordering Systems 2A or 2B to the Communication System 14 and preferably to the Open End Network Gateway 16 for relay onto the TCP/IP 18 connection to the Order Center System 26 for processing as is later discussed herein.

The Order Center System 26 generates a communication via TCP/IP 18 to the Communication System 14 to the Fax Server 20 to the Distribution Center System 51 and more particularly to Printing Device 50 which generates the Sheet 52. Additionally, Order Center System 26 communicates via the Communication System 14 to exchange financial information to carry out the order with Financial Institution System 33. Further, Order Center System 26 communicates via Communication System 14 to the Courier Shipping System 41 to organize and carry out the shipping aspects of System 1, which includes the Truck 68 picking up the Box 60 and transporting Box 60 to a Recipient, for example 72.

Turing now to FIG. 2, a representative Sheet 52 is provided to illustrate the three components: 54, 56, and 58, each divided by perforated lines shown as 57. The components 54, 56, and 58 include a Packing List 58, a Customizable Component 56, and a Shipping Sheet, for example a Federal Express label, 54.

Note that a Shipping Sheet 54 or label is being utilized here in an expansive sense, not be limited to a printed label with an adhesive back, but also including a sheet of the sort used in a plastic window, as conventionally represented by the approach of Federal Express. Also encompassed by present invention is the use of a sheet, label, or printing on the packaging or box to uniquely identify the package, and the computer(s) recognize the package and electronically associate shipping instructions with the package, sheet, label, etc.

To summarize, the invention can be considered a method of making (and product produced and shipped thereby), a method of using, an apparatus, and resulting data structures, or even a combination of machines and a product article of manufacture for use in the method. Representatively, the invention can be viewed as a broad method for using a digital electrical computer apparatus located at an order center for shipping a product from a remotely located distribution center, the method including the steps of: producing output electrical signals representing a packing list for a consumer order of a product by causing an ordering apparatus located at an order center to change input digital electrical signals into the output digital electrical signals, the ordering apparatus including a digital electrical computer having a processor, the processor electrically connected to a memory device for storing and retrieving machine-readable signals in the memory device, to an input device for receiving input data and converting the input data into the input electrical signals, and to an output device for receiving the output electrical signals, and wherein the processor is controlled by a computer program to implement the step of producing; assigning shipping information signals to the consumer order with a digital electrical computer shipping apparatus; linking, by digital communication, the signals representing the packing list with the shipping information signals; transmitting signals representing the packing list and the shipping information signals to, and receiving the signals representing the packing list and the shipping information signals at, a printer device at a distribution center located remotely from the order center and from the digital electrical computer shipping apparatus; printing the packing list and a shipping label at the printer device at the distribution center; and shipping the product, along with the shipping label, from the distribution center.

This broad method can further include the step of: entering more of the input data at the input device to produce more of the output electrical signals including signals representing a consumer-composed element; and wherein the step of linking includes linking, by digital communication, the signals representing the packing list with the signals representing the consumer-composed element; the step of transmitting includes transmitting the signals representing consumer-composed element, along with the shipping information signals, to the printer device at the distribution center; the step of printing includes printing the consumer-composed element, along with the packing list and the shipping label, at the printing device at the distribution center; and the step of shipping is carried out by shipping the consumer-composed element, along with the product and the shipping information, from the distribution center.

The broad method can also be viewed, as regards the step of generating output electrical signals representing the packing list for the consumer order of a product is carried out by using flowers as the product, such that the step of printing the shipping label and the packing list from the electrical signals is carried out printing the packing list identifying the flowers, and such that the step of shipping is carried out by shipping the flowers and the shipping information, from the distribution center. Preferably the method is carried out by growing the flowers at the distribution center.

In the broad method, the step of printing can include printing on a sheet in the printer device; and further including the step of: locating demarcations on the sheet in the printer device to detach the packing list from the shipping label. Preferably the demarcations include perforations, such that the step of detaching includes detaching by tearing the sheet at the perforations.

The broad method can also be carried out including the steps of: entering more of the input data at the input device to produce more of the output electrical signals representing a consumer-composed message to a recipient of the flowers; the step of linking includes linking, by digital communication, the signals representing packing list with the signals representing the consumer-composed element; the step of transmitting includes transmitting the signals representing consumer-composed element, along with the shipping information signals, to the printer device at the distribution center; the step of printing includes printing the consumer-composed element, along with the packing list and the shipping label, at the printing device at the distribution center; and the step of shipping is carried out by shipping the consumer-composed element, along with the product and the shipping information, from the distribution center.

Moreover, the step of printing can include printing the message on a greeting card having preprinted artwork. Further, the step of printing can include printing on a sheet in the printer device; and further including the step of locating a sheet in the printer, the sheet including a greeting card having preprinted artwork and demarcations for detaching the greeting card from the packing list and the shipping label; and wherein the step of shipping includes separating the packaging list, the shipping information, and the greeting card by tearing the sheet at the demarcations.

Preferably the method is carried out so that the step of assigning the shipping information signals includes dynamically assigning the shipping information signals through a TCP/IP connection. Also, prior to the step of transmitting, preferably the method includes translating at the ordering apparatus to produce the signals representing the packing list and the shipping list signals in one digital format. With further regard to the method, the steps of transmitting and printing can be carried out with the printing device being a fax machine; and further including the step of connecting the fax machine to a communications system for the receiving of the signals representing the packing list and the shipping information signals.

Also preferable is to carry out the step of transmitting by including transmitting via an open end network gateway to a remote fax server for a subsequent transmitting over the communications system to the fax machine. Similarly, it can be suitable to carry out the step of transmitting by including transmitting to a remote fax server with a fax modem in a local calling area of the distribution center for a subsequent transmitting to over the communications system to the fax machine.

In a general case, the broad method can further include the steps of: associating an order code signals with each said consumer order at the ordering apparatus; obtaining shipping status information signals from the digital electrical computer shipping system; and combining the order code signals with the status information signals at a machine-readable site having a network gateway address for access by a consumer's digital electrical computer.

For keeping those involved well-informed, the method can further include the step of printing an network gateway address on publicly distributed notices, such as packaging for the product to facilitate an electronic communication from a consumer's digital electrical computer to the order center. This idea works out well in conjunction with making the processor electrically connected to the input device by electrically connecting the input device to a consumer computer, and electrically connecting the consumer computer to an network gateway, and electrically connecting the network gateway to the processor.

Still, traditional technology must be accommodated. Thus, the method can be carried out by providing telephones at the order center for receiving acoustic ordering information for use as the input data.

Over all, it is preferable to carry out any of the foregoing views of the invention by producing the product at the distribution center. This adds to the efficiency from utilizing the step of printing that includes printing on a sheet in the printer device; and further including the step of locating demarcations on a sheet in the printer device to detach the packing list and the shipping label—preferably also with the demarcations including perforations to detach the packing list from the shipping label. Even more preferably is to carry out the method by further including the steps of: entering more of the input data at the input device to produce more of the output electrical signals representing a customizable—preferably consumer-composed—message to a recipient of the product; the step of linking includes linking, by digital communication, the signals representing packing list with the signals representing the consumer-composed element; the step of transmitting includes transmitting the signals representing consumer-composed element, along with the shipping information signals, to the printer device at the distribution center; the step of printing includes printing the consumer-composed element, along with the packing list and the shipping label, at the printing device at the distribution center; and the step of shipping is carried out by shipping the consumer-composed element, along with the product and the shipping information, from the distribution center. In this way, the step of printing can include printing the message on a greeting card. Better still is to have the step of printing carried out by locating a sheet in the printer, the sheet including a greeting card for the message and having preprinted artwork and demarcations for detaching the greeting card from the packing list and the shipping label; and wherein the step of shipping includes separating the packaging list, the shipping information, and the greeting card by tearing the sheet at the demarcations. More ideally is to have the step of printing include printing a graphical element as part of the consumer-composed message. This can be accomplished by further including the step of: prior to the step of transmitting, translating at the ordering apparatus to produce the signals representing the packing list and the shipping list signals in one digital format.

Speed is improved by carrying out the method wherein the step of assigning the shipping information signals includes dynamically assigning the shipping information signals through a TCP/IP connection. Cost is also reduced by carrying out the method, wherein the steps of transmitting and printing are carried out with the printing device being a fax machine; and further including the step of connecting the fax machine to a communications system for the receiving of the signals representing the packing list and the shipping information signals. This may involve having the step of transmitting include transmitting via a network gateway to a remote fax server for a subsequent transmitting over the communications system to the fax machine. Another approach is having the step of transmitting include transmitting to a remote fax server with a fax modem in a local calling area of the distribution center for a subsequent transmitting to over the communications system to the fax machine.

To put status information in the hands of consumers, the method can be carried out by associating an order code signals with each said consumer order at the ordering apparatus; obtaining shipping status information signals from the digital electrical computer shipping system; and combining the order code signals with the status information signals at a machine-readable site having a gateway address for access by a consumer's digital electrical computer. Again, information can be distributed or publicized by printing a network gateway address on packaging for the product to facilitate an electronic communication from a consumer's digital electrical computer to the order center.

Thus, orders can be placed so that (1) the step of producing includes:
making the processor electrically connected to the input device by electrically connecting the input device to a consumer computer, and electrically connecting the consumer computer to a network gateway, and electrically connecting the network gateway to the processor; and/or (2) by providing telephones at the order center for receiving acoustic ordering information for use as the input data.

Billing aspects of the invention can be viewed as the method further including the steps of: verifying charge card availability to pay for the product by an electrical communication from the digital electrical computer ordering apparatus to a charge card digital electrical computer system prior to shipping the product; and processing the shipping information to trigger a second electronic communication to the charge card digital electrical computer system charging the payment to the charge card subsequent to the shipping the product.

As to shipping, the method can be carried out so that the step of communicating data representing the shipping information to the digital electrical computer apparatus at the order center includes: scanning the shipping label to obtain scanning data; and transmitting the scanning data to the digital electrical computer apparatus at the order center for processing the shipping information to trigger the charging of the charge card.

The foregoing technical discussion of the invention has referred to a "method" as representative of the apparatus, method of making, product produced by the method, data structures, articles of manufacture, and necessary intermediates. To illustrate that an apparatus characterization is also valid for teaching how to make and use the invention, consider the invention as including an apparatus comprising: an ordering apparatus located at an order center, the ordering apparatus including a digital electrical computer having a processor, the processor electrically connected to a memory device for storing and retrieving operations including machine-readable signals in the memory device, to an input device for receiving input data and converting the input data into input electrical signals, to an output device for converting output electrical signals into output, the processor controlled by a computer program to the produce circuitry connections in the processor in producing the output electrical signals from the input electrical signals, including generating output signals representing a packing list for a consumer order of a product from the input data entered at the input device; a digital electrical computer shipping system controlled by a program to assign shipping information to the consumer order; a communications system for transmitting the electrical signals representing the packing list and the shipping information signals; a printer device at a distribution center located remotely from the ordering center and from the shipping system for receiving the signals representing the packing list and the shipping information signals, and for printing a packing list and a shipping label from the signals representing the packing list and the shipping information signals; and packaging for the product and the shipping information, combined for shipment from the distribution center.

Viewing the invention as a method for making an apparatus, the method includes the steps of: providing an ordering apparatus located at an order center, the ordering apparatus including a digital electrical computer having a processor, the processor electrically connected to a memory device for storing and retrieving operations including machine-readable signals in the memory device, to an input device for receiving input data and converting the input data into input electrical signals, to an output device for converting output electrical signals into output, the processor controlled by a computer program to the produce circuitry connections in the processor in producing the output electrical signals from the input electrical signals, including generating output signals representing a packing list for a consumer order of a product from the input data entered at the input device; providing a digital electrical computer shipping system controlled by a program to assign shipping information to the consumer order; linking the ordering apparatus and the shipping system to a communications system for transmitting the electrical signals representing the packing list and the shipping information signals; linking a printer device to the communications system at a distribution center located remotely from the ordering center and from the shipping system for receiving the signals representing the packing list and the shipping information signals, and for printing a packing list and a shipping label from the signals representing the packing list and the shipping information signals; and shipping the product and the shipping information, from the distribution center.

With more particular regard to using the invention, the user screens shown in the figures are self-explanatory.

With more particular regard to making the invention, the following specifications can be utilized, particularly with reference to the figure numbers referenced below.

Document Conventions

This document presents the user definitions, the tasks analyses, and descriptions of the design one screen at a time.

The user definition describes particular user types with respect to their tasks and responsibilities.

The task analyses describes the task flow for the various tasks. These analyses include descriptions of the tasks and diagrams illustrating the work flow, independent of the existing technology. These task flows indicate the flow of work and use of work objects.

The screens are presented in the following manner:

Brief Overview of Function

A short description of the task the user intends to perform.

Page Design

A graphical illustration of the page design. Optional or alternative design ideas are typically presented here as well.

Flow Chart of Screen

A logic diagram of the task or page including all non-standard behaviors. These flow diagrams typically do not describe alternative design ideas.

Textual Description of the Controls

Text describing each control in the interface. Optional or alternative design ideas are typically discussed here as well.

Questions or Issues to Resolve

These are questions and issues, which are, as yet, unresolved and may wait until a later date to be addressed.

Standards

The design utilizes controls and conventions that are supported in all Mozilla/2.0 compliant browsers. Please refer to the Conventions portion of the Interface Design section for a more detailed description.

Terminology

The terminology used in the design is subject to change based on user feedback during the usability testing. However, the terminology used in this design document will likely remain as described.

Flow Diagrams

Figure 3:
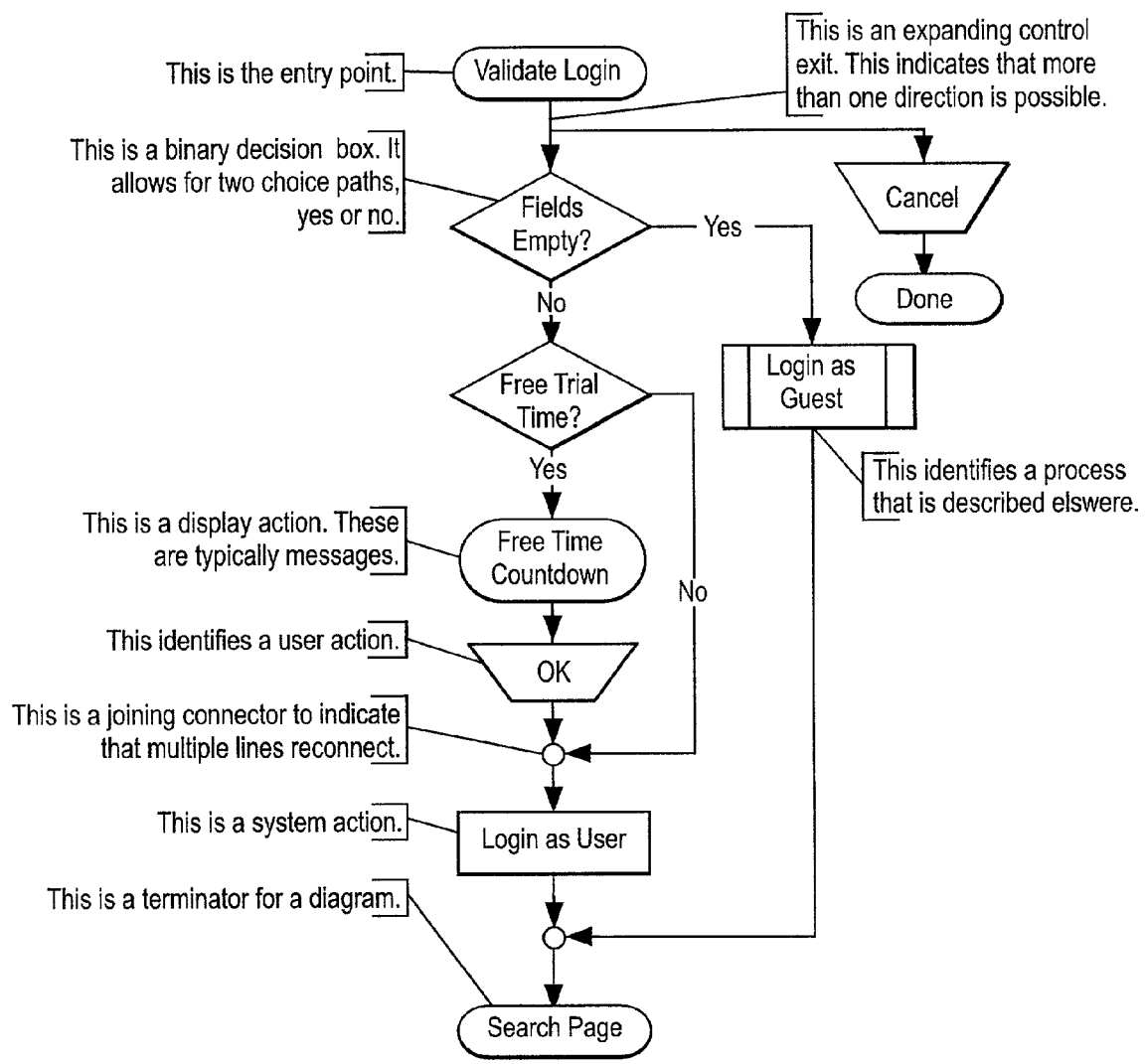
FIG. 3 is a logic flow diagram example.

The logic diagrams follow standard software flow-charting design conventions. The diagram typically flows from top to bottom. Each box has one input and one output, with the exception of decision boxes. These have two outputs. See FIG. 3.

Textual Descriptions

The textual descriptions of the pages include several possibly unfamiliar conventions that are described below.

Bold Text

Bold text in the descriptions or overviews refers to a control or page of the same (or very similar) name in the design, description, or flow diagram.

Indenting

This indicates subordinate relationship. For instance controls at this level of indentation belong solely to the feature directly extended from them.

EXAMPLE

The following is an example from the documentation. The following controls belong to this example.

User Profile THIS INDICATES THE NAME OR REFERENCE OF THE CONTROL.

Button: Displays user profile page.

Each control is identified as to what kind of control it is.

Quit

Button: Displays confirmation pop-up dialog.

These next controls belong solely to the quit feature.

Quit Confirmation

Pop-up dialog: Informs the user that they will be logged out of the system.

Continue

Button: Logs user out of system and displays login page.

Cancel

Button: Displays currently active page.

Default: This is the default control.

User Definition

User Profile

Proflowers.com provides users with a single point of access for viewing, purchasing and delivering flowers. The typical user of this type of service is one who possesses a credit card and is comfortable with the concept of shopping and making purchases on-line. The user of this site will typically be interested in addressing a certain need, such as a special event, holiday or a gift. Since flowers typically have an emotional component inherent to their type or arrangement, the user of this service will require some guidance as to which type of flower or arrangement is appropriate for the occasion. The most common user of this service will typically be male, and have an income that varies widely. The user will presumably be somewhat familiar with the web, but not necessarily an advanced user. Although most users will typically purchase flowers as a gift, some users may wish to order flowers for decoration during holidays or special gathering. In such cases, it is typically a woman who is making this type of purchase.

Despite the above mentioned gender stereotypes, it is conceivable that the reverse of these stereotypes is also possible. Web usage is still somewhat disproportionately male, however with the rise of Internet access in the marketplace the need for this distinction is becoming less relevant.

Some features of this service, which would be beneficial to the above-mentioned user, include a reminder service for important occasions and holidays, as well as automated delivery and gift registry.

Task Analysis

Observations

Since buying flowers is not an uncommon or unusual task, observation of this task is not necessary. The typical task flow of this process involves browsing available inventory or asking for assistance in purchasing an arrangement for a certain occasion, such as Valentine's day, the loss of a loved one, decoration for the arrival of guests, or as an apology. Whether or not the purchase is a gift or for oneself determines how and where the flowers will eventually be delivered. Finally, the means of payment are negotiated.

Scenarios

The following scenarios capture the typical activities and behaviors thought to be representative of the users and tasks within the domain of this web site. These scenarios promote a better understanding of the user's needs through a narrative approach.

Bob the Business Manager

Bob recently started an argument with his wife over a trivial matter, and he's feeling a bit chagrined because he realizes he was being unfair. He loves his wife very much, and he wants to let her know that despite the times they disagree he still cares for her deeply. He is not a particularly adventurous type, and he thinks that the old-standby, flowers, would be the perfect way to show his affection and apology. He is a busy person, and doesn't have time to go shop for flowers, so he gets on-line to see what he find there. He performs a search of the Internet for "flowers", and comes across a few sites that sell flowers and deliver them. The first few sites he visits seem pricey, or are difficult to navigate since they force him to know what he wants ahead of time. He finally sees the Proflowers site, and he notices that the site is asking him why he's buying flowers. He tells it, and it provides him with a list of flowers appropriate for the occasion. He assumes that his wife has some basic knowledge of flower types whereas he has none, and picking the right arrangement, he thinks, will win him big points for being so considerate. After browsing the selection, he picks the one he thinks his wife will like. He tells the system where to send it, includes a brief and sweet message, and indicates how he wants to pay. After the transaction is complete, he congratulates himself for being such a smooth operator.

While at Proflowers, he notices that he can sign up for a reminder service. Since he forgot his mother's birthday last year and still hasn't heard the end of it, he signs up and asks to be reminded of his wife's birthday, his mother's birthday, and his anniversary.

Betty Bereaved

Betty's coworker and friend recently lost her mother to a debilitating illness. She visits the Blue Mountain site, since she had sent electronic greeting cards to friends before. She notices a banner ad for Proflowers, and given the circumstances she decides it would be a nice gesture if she left some flowers on her friend's desk to enjoy when she returns to work. She goes to the Proflowers site and notices that she can pick from a list of occasions. She selects "bereavement", and browses the available arrangements. Since price is important, she tries to find something that is inexpensive but nice. She likes the fact that she knows she is getting a good deal, which is important. She finally finds a nice subtle but lovely arrangement, and has it shipped to herself at work since she doesn't know her friend's home address. She knows her friend will return next Monday, and she doesn't want the flowers to sit too long. She tells Proflowers to deliver on a specific date, the Friday before she returns. She sees that the flower arrangements include food and are much fresher than most arrangements elsewhere will be, so she's not worried abut them sitting in the office over the weekend. She includes a brief message, and pays for the flowers. A short while later, she receives a confirmation of the order in her email box and is satisfied that the flowers are on their way.

Gary in the Gulf

Gary, an Air Force pilot, was sent to the Persian Gulf during a breakdown in diplomatic relations with Iraq. He and his wife are new parents, and he is saddened by the fact that he will be away from his family. He promises her that he'll return in a three months, and not to worry. After three months, tensions have risen and he will have to remain on duty for another three months. He wants to send his wife some flowers to apologize for being away and to tell her that he loves her. He visits a number of flower sites on-line, but they all seem too expensive for what he gets. Since he has a limited income, he appreciates the excellent prices Proflowers offers. Also, as a military man, he appreciates the efficient process of shopping and ordering Proflowers provides. He feels comfortable that his wife will get a nice, fresh arrangement, and she won't ball him out for spending too much money.

Harriet the Hostess

Harriet has houseguests from Holland visiting, and she thinks it would be a nice gesture if she placed some tulips in their room as a welcome gift. She works all day, and the nearest florist is not on her normal route to and from work. She has Internet access at work, and has shopped on-line before. She sees a banner ad for Proflowers on a search engine, and decides to give it a try. She notices that not only does Proflowers offer significantly lower prices, but that the flowers are especially fresh since the come directly from the growers. Since her guests will be visiting for a week, she doesn't want the flowers going bad before they leave. She already knows what she wants, so she decides that instead of picking an occasion, she instead picks a flower type and begins browsing. She doesn't need a card, and she only needs to have the flowers delivered to herself.

Tom Techie

Tom is typical of many 20-30 year-old (or so) folks working in a fast paced high-tech industry, such as a software development company. He has more than enough income to meet is needs and many of his wants. What he doesn't necessarily have is a lot of time. Nor does he think about these things during normal business hours. These factors make the Internet a perfect place to shop for Tom. Among other things, he buys, software, mountain bike parts, and occasionally flowers from on-line services.

Tom knows a lot about software, a fair amount about bikes, but very little about flowers. He typically buys the standard roses for all occasions. He doesn't usually remember the occasions very well, either. Tom uses a scheduling program to alert him of upcoming occasions, but doesn't have the time to go a buy something. So he is left with the option of shopping the Internet at the last minute. He typically chooses flowers because he's not sure what else to what else to give. And hey, they deliver, too. The occasions seem typical, too, Mother's day, Valentine's day, "Oops, I'm sorry" day, to name a few.

Randy Romantic

Randy knows how to treat his significant other(s). Flowers are perfect for any occasion. Randy knows flowers a little better than most and prefers to augment the flowers with a special gift, such as chocolate or a basket.

Randy used to use the Yellow Pages but was never quite sure what he was sending or what he was getting for his money. Moreover, it was sometimes difficult to get in touch with a florist. The Internet opened up a whole new world to him.

He likes to send flowers on general occasions, as well as special those occasions for his friends and lover(s). He uses his home computer to order flowers, which means it's probably done after normal business hours. Randy doesn't spend a lot of time on his computer, but is fairly familiar with the Internet.

He really likes the ability to preview the arrangements to ensure that they are the right kinds of flowers for the occasion. It has taken him a long time to learn which flowers are better for which occasions, and is interested in learning more.

Randy like to have the flowers delivered in a special way, if possible. The standard drop off at the doorstep is fine in a pinch. But those special occasions require special delivery. It's not easy finding someone who will deliver on Sundays.

The ability to include a gift of chocolates or special basket appeals to Randy and he is always looking for ways to make the flowers a little more special. He also likes to choose a nice card and add his own notes to it.

Figure 4:
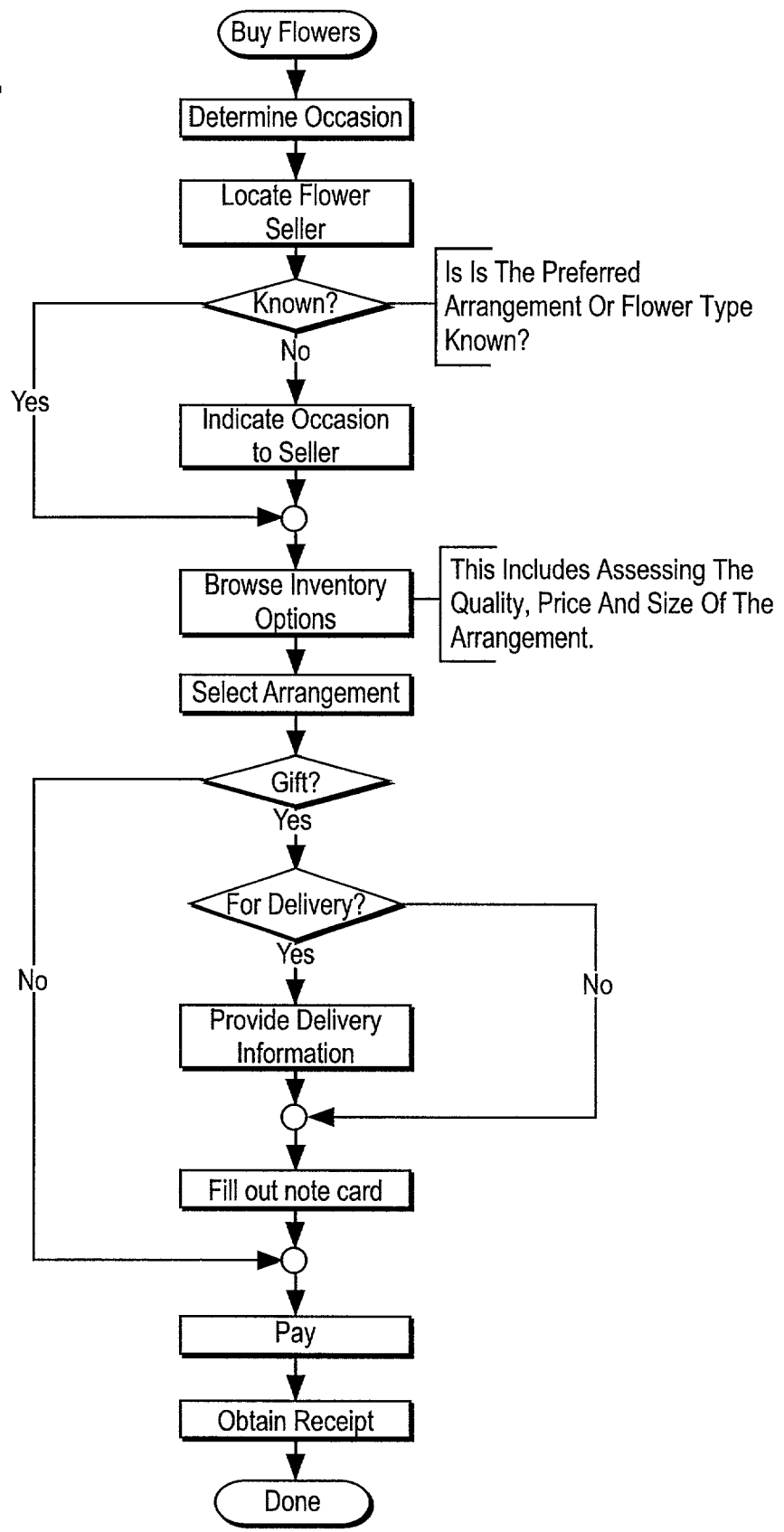
FIG. 4 is a task flow diagram for purchasing flowers.
Figure 5:
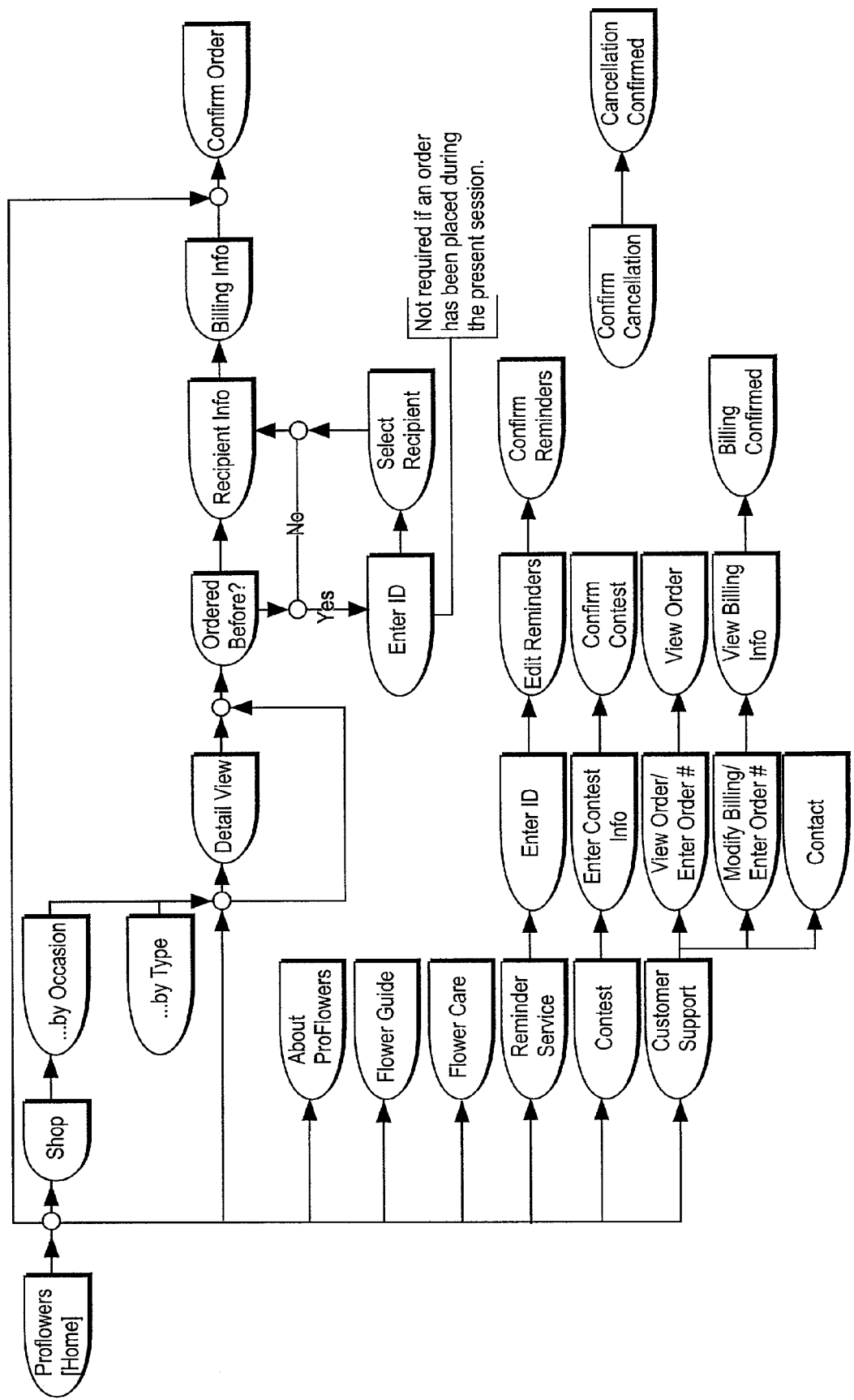
FIG. 5 is a site overview diagram.
Figure 6:
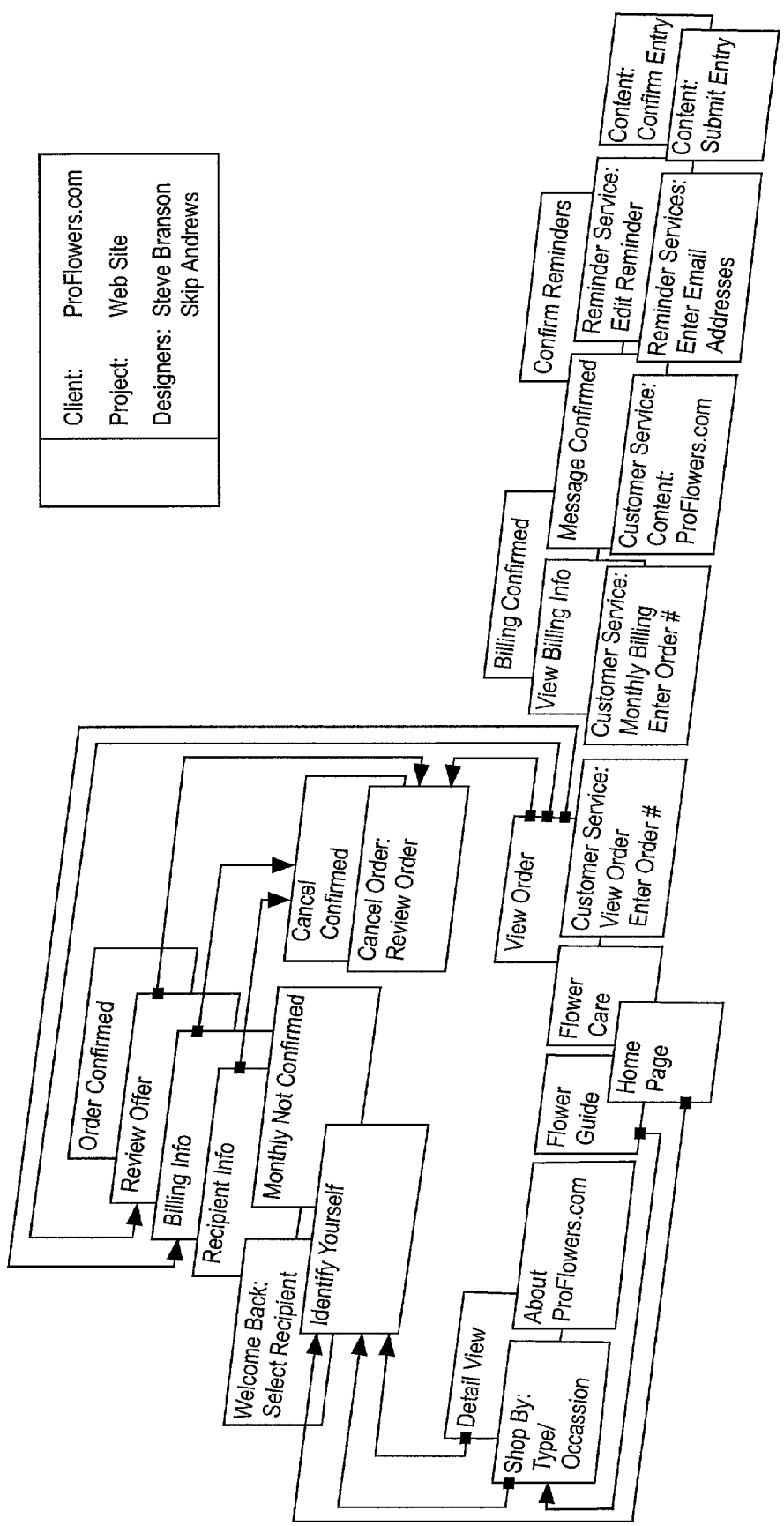
FIG. 6 is a physical overview diagram.
Figure 7:
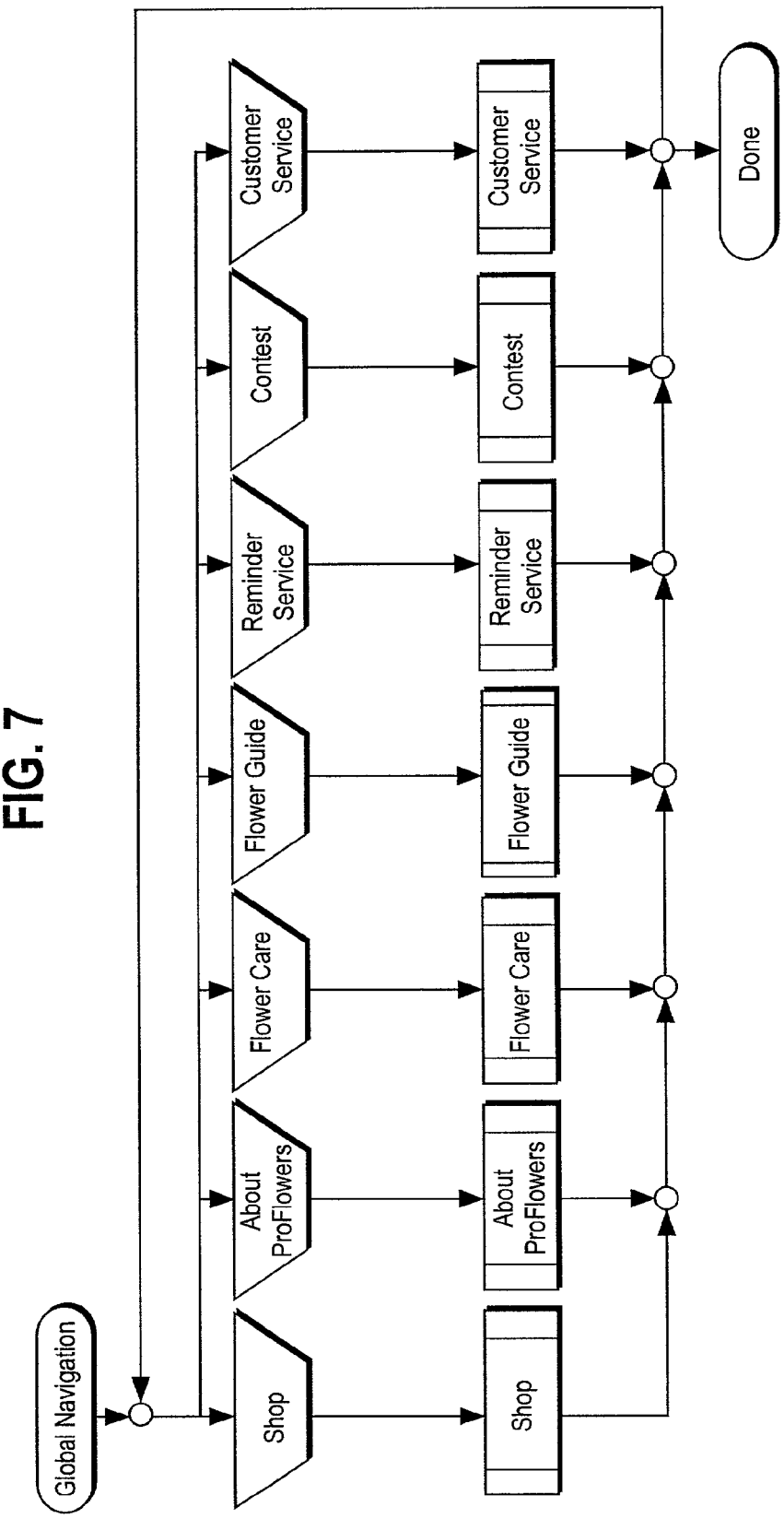
FIG. 7 is a navigation overview.

Randy may need to send flowers to more than one person on some occasions, but he typically sends flowers to one person at a time. See FIG. 4.

User/Task Matrix

| Task | Male CEO | Executive Assistant | Male Soldier | Female Office Worker | Female Homemaker |
|---|---|---|---|---|---|
| Shop by Occasion | ++ | ++ | ++ | + | + |
| Shop by Flower Type | - | + | - | + | ++ |
| Purchase as Gift | ++ | ++ | ++ | + | + |
| Purchase for self | - | - | - | + | + |
| Purchase Multiple | + | ++ | - | - | - |
| Deliver as Gift | ++ | ++ | ++ | + | + |
| Deliver to Self | - | - | - | + | + |
| Quality Important | ++ | + | + | ++ | ++ |
| Variety Important | + | + | + | + | ++ |

| VALUE | MEANING |
|---|---|
| - | Unlikely |
| + | Possible |
| ++ | Highly Likely |

Metrics and Objectives

Usabiltiy Metrics

This site must be easy to use, with no requirement for learning. Since the usage model for this site varies from regular to intermittent use, it should be simple to navigate and provide a simple model of interaction. Advanced features such as a reminder service and gift registry should be simple to use and should not interfere with the typical browsing and ordering process. Discovery of advanced features should be introduced by non-intrusive suggestions based on usage patterns, or through navigation of optional portions of the site. The site should accommodate both inexperienced, non-technical users, yet be well designed technically to appeal to more advanced users.

Product Objectives

The objective of this site is to provide users with a simple method for selecting, purchasing and shipping flowers and arrangements at a competitive price. Value can be added to the process by inviting users to specify the occasion for which the flowers are being purchased, By doing so, users will be provided with suggestions for appropriate arrangement. By relying on the knowledge of the service provider (Proflowers.com), users will feel more comfortable that the purchase is appropriate for the occasion. This coupled with information about the quality, savings and value-added features such as a Reminder Service and Monthly Contests, Proflowers.com provides creates a positive image for the site that will induce book-marking and return visits (Proflowers may want to consider a "Bookmark this page" link).

Task Priorities

The primary tasks this site should accommodate include selecting an occasion, selecting an arrangement, specifying a recipient for delivery, and payment. Other tasks that can be addressed are browsing by flower type, gift registry, and important date reminders. Additionally, marketing items such as contests and company information should be included.

Interface Design

Conventions

Certain conventions are utilized throughout this design. These conventions have been selected to create an internal standard for behaviors which are common yet not standardized from site to site. These behaviors assume that JavaScript will be used in conjunction with HTML in the implementation of this design. When certain JavaScript codes are not 100% compatible, they do not prevent the use of the site, but rather enhance the experience for users with compatible browsers.

JavaScript

The following syntax refers to Event Handlers which respond to certain actions: OnMouseOvero function—this function allows a behavior or state change to occur when the cursor is placed over an image object. The typical use of this function is to change a button from deselected to a selected state. This will be referred to in the document as an "OnMouseOver behavior".

OnChangeo function—reacts to drop down list selection by activating that selection for purposes of navigation without requiring an explicit submit action.

OnLoad( ) function—this function allows an action to occur when a page is loaded.

Focuso function—this function places the focus in the specified field, such as the first text box of an on-line form. Often, this code is used in conjunction with the OnLoad event handler.

Other uses—JavaScript is an object-oriented language, allowing multiple functions to be carried out with a single action. Utilization of this capability can improve and enhance the interactivity and responsiveness of a web site. JavaScript can also perform data checking operations.

Frames

In order to maintain the visibility of key elements to the site, namely the company logo, mission statement and site navigation, this design intends to use frames. All Mozilla/2.0 browsers support frames. The frameset structure of the site is diagrammed below. In order to maintain the consistency of the site's navigation, the frames have been designed using the "frames-within-frames" method. This allows two frames to be updated simultaneously, maintaining a consistent level of navigation despite the use of the browser's "Back" button.

Navigation

Hyperlink: blue underlined text that causes a new page to load <A>

Hyperlink Button: graphic that serves as a hyperlink <A>

Button: standard 3D button generated by <INPUT TYPE=Button> tag.

Data Checking

In some cases, such as the recipient and billing information pages, it is necessary to verify that the user has input viable data, and that certain data elements match one another (for example the city and zip). If the system detects a data error, it returns the user to the original form and places RED asterisks or some other highly salient marker next to the items that were input incorrectly. The "Continue >>" button is replaced by an "OK" button. If the user ever performs a destructive action, such as "Cancel Order", it must be confirmed by an explicit action on the part of the user.

Security

SSL Security should be activated whenever the user is performing an action or viewing a screen in which personal information may be edited. Credit Card Account information cannot be accessed from this site, only changed if an appropriate order number is provided.

Cookies

User interviews revealed a variety of responses to the use of cookies, from unfamiliar to always refusing. Cookies can provide a significant benefit, and be the source of a major annoyance as well. It is our inclination to avoid the use of cookies due to a general lack of understanding of this technology. If cookies are utilized, the user should be able to bypass them and still use the site fully with cookies refused or disabled.

Load Speed

Several programming techniques can be employed to facilitate faster loading, which is highly recommended. To make the overall page load faster and to allow the text content to become visible before the images have completed loading, all HTML tags regarding tables and images should include HEIGHT & WIDTH values. Doing so allows the browser to predict the layout of the page, and thus can display information incrementally rather than being forced to load the whole page first.

Figure 8:
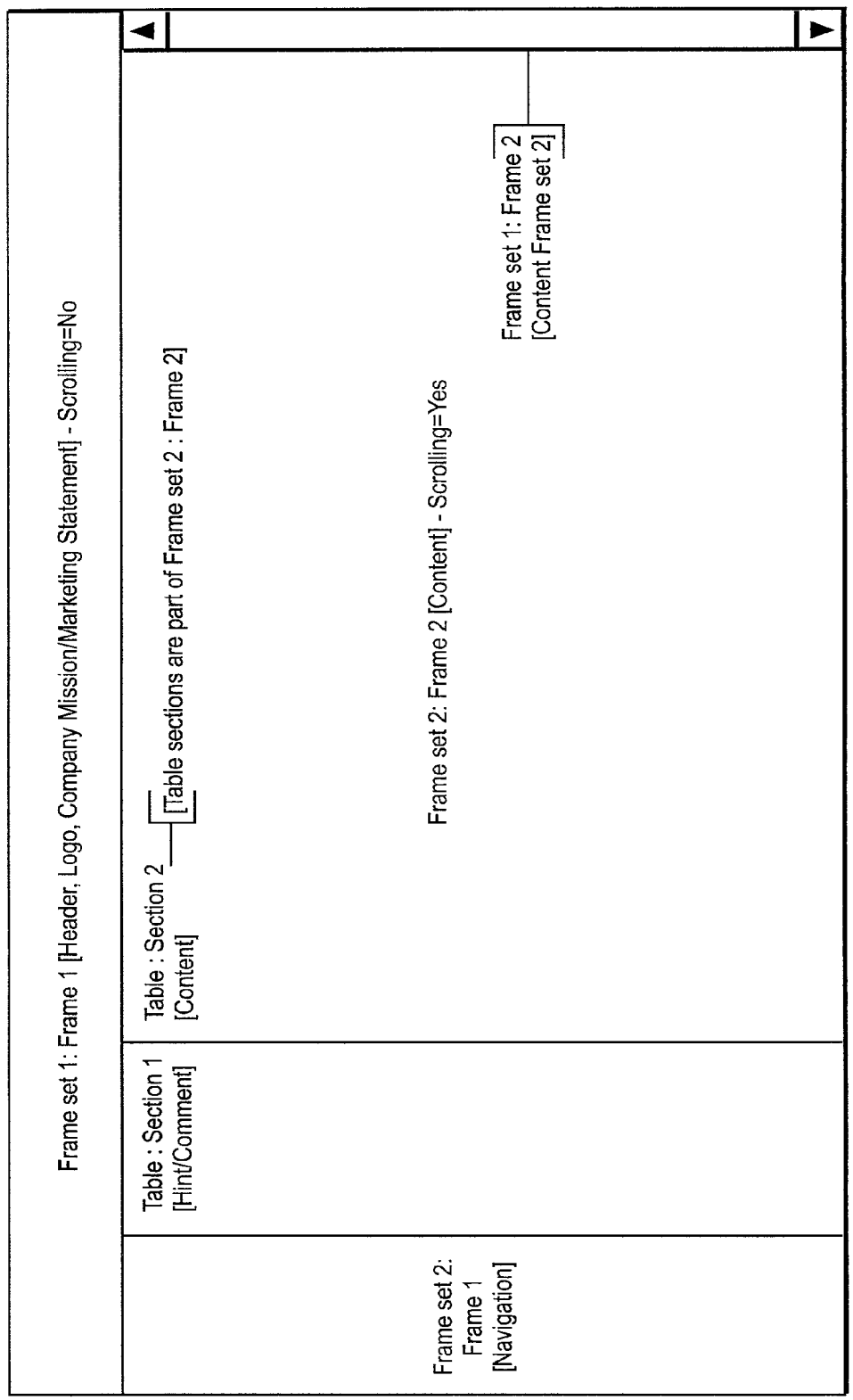
FIG. 8 is a general frameset overview diagram.

Design Note: Frames (FIG. 8) allow for the constant visibility of two important page elements; the Navigation portion is always visible despite scrolling, and the Header is also always visible. These areas can be utilized to present information that will always be visible to the customer.

The Home Page (FIG. 10) is the first screen that visitors see when visiting the Proflowers.com site. It displays arrangements for the nearest upcoming flower occasion. It also displays tips for using the navigation. Also on the home page are links to more arrangements for the upcoming holiday and a direct link to long stem roses, which are a popular item.

Note the use of the (u) symbol to draw attention to important elements and information on the screen. This convention is used throughout the design, and was very effective in bringing important information to the user's attention. As a matter of fact, users often missed important information that wasn't preceded by this symbol. This simple element is very effective in focusing and controlling attention.

Behaviors

Arrangement Image/Click for Details

Hyperlink: clicking on the arrangement image takes the user to an enlarged detail view uf the arrangement.

Buy this Arrangement

Hyperlink Button: clicking on Buy loads the Recipient Page of the order process.

Flower Name Hyperlink

Text Hyperlink: the names of flowers are hyperlinked to the appropriate section of the flower guide. Clicking on the flower name loads the flower guide, scrolled to the portion of the screen describing the flower.

Navigation

1. Shop:

<select an occasion>

Drop-down list: this list contains all of the main occasions, e.g. gift, thank you, apology, get well soon, etc. plus at the top of the list the nearest flower holidays; Easter, Secretaries Day, and Mother's Day, for example.

Selecting an occasion from the list causes the available inventory for the selected occasion to be displayed in the main content frame, sorted by descending price.

<select a flower type>

Drop-down list: similar to <select by occasion>, only the inventory is sorted by the type of flower selected. The most popular flowers should be listed first, and plants should be listed last.

Show Me

Graphical Button: if the browser does not support the onchangeo function, then the "Show Me" button submits the user's selection. If the user selects from both lists, show only the occasion. The Flower Type and Occasion lists are mutually exclusive.

2. Features

About Proflowers.com

Graphical Button: links to the About Proflowers.com page; graphical button changes appearance to indicate the selection. OnMouseOver behavior may be implemented, if time allows.

Flower Guide

Graphical Button: links to the Flower Guide; see above.

Flower Care

Graphical Button: links to Flower Care; see above.

3. Customer Service

<select a service option>

Drop-down list: presents a list of three options: View Order, Modify Billing, and Contact Proflowers. Selection of an item loads the appropriate page. See also comments for "Show Me".

4. Added Features

These items were separated from the main navigation to draw attention to these features.

Reminder Service

Graphical Button: links to Reminder Service; see above.

Monthly Contest

Graphical Button: links to Monthly Contest; see above.

Logic

Shopping for flowers has two parts: locating the item and placing an order for it.

Figure 11:
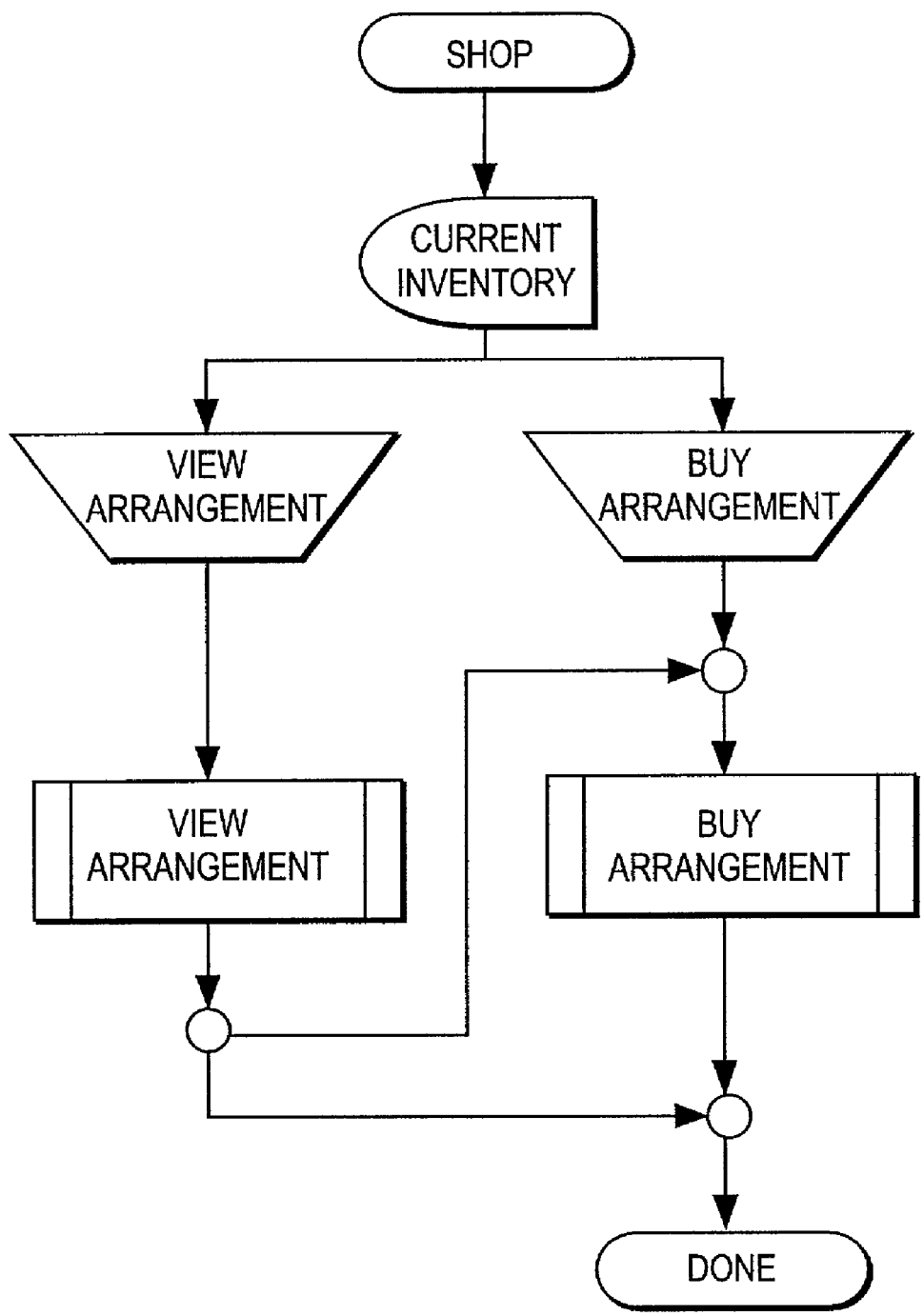
FIG. 11 is a shopping logic flow diagram.
Figure 12A:
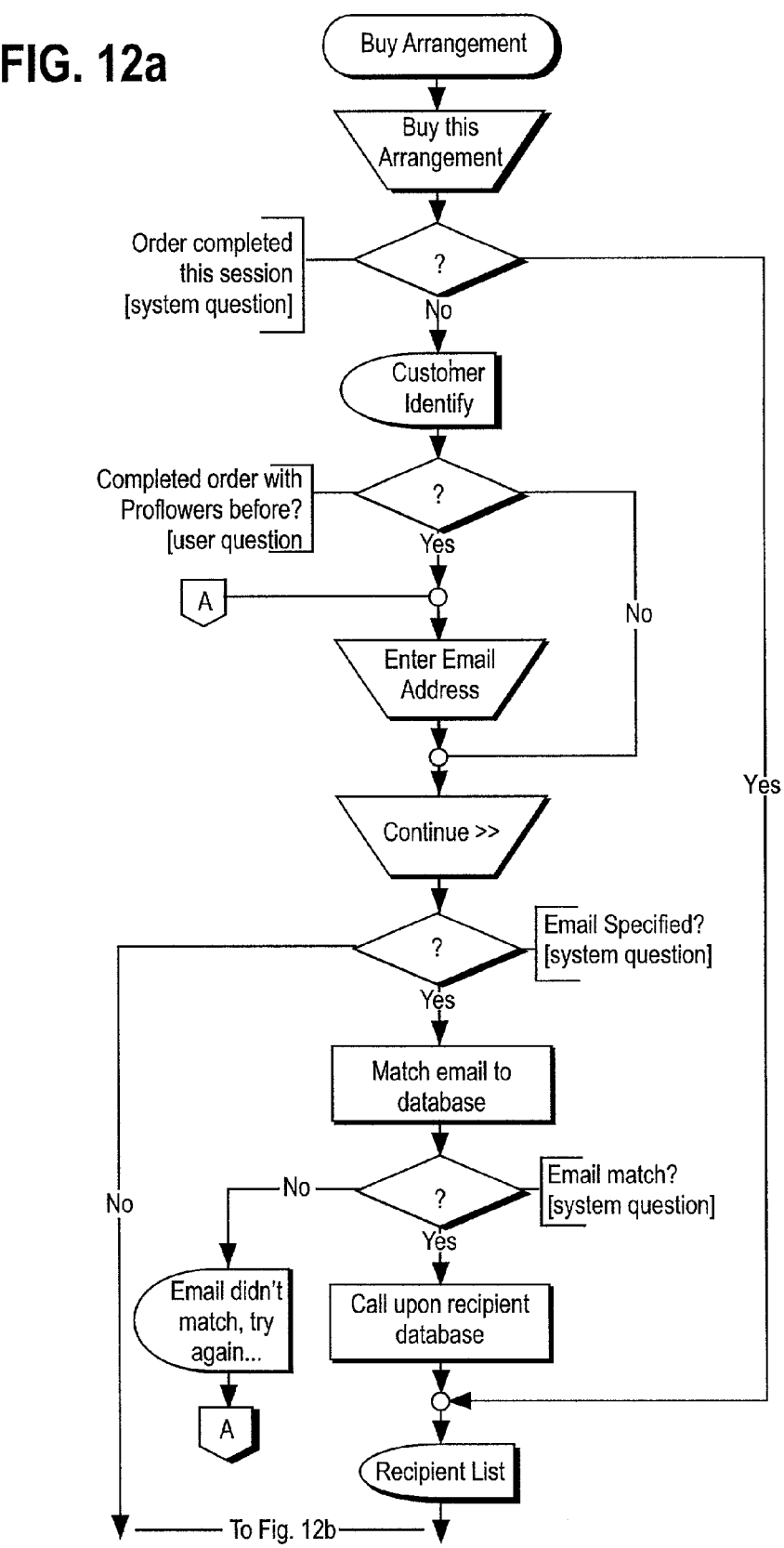
FIG. 12 is an ordering process logic flow diagram.
Figure 12B:
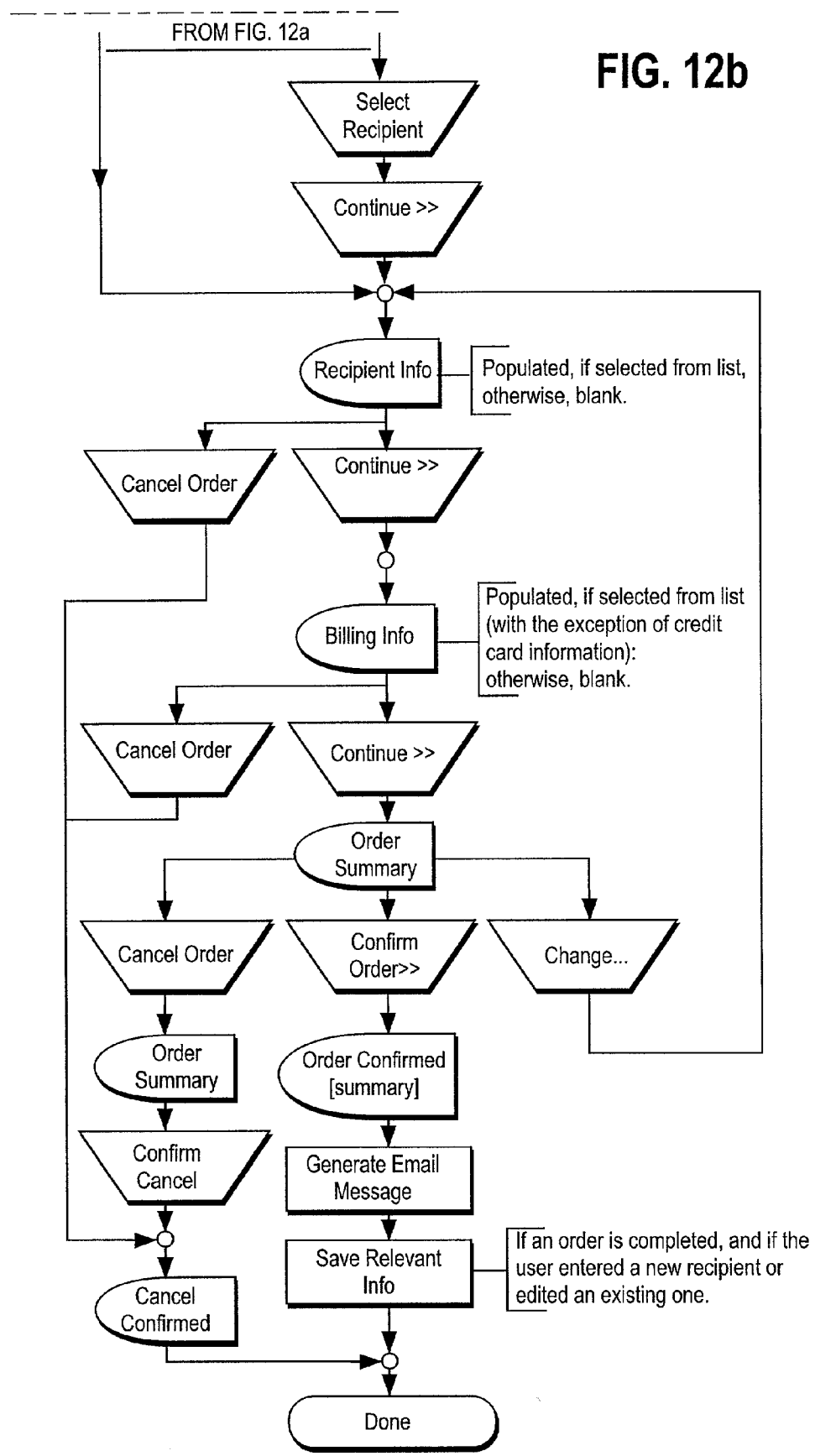

These two logic flows illustrate the general logic of the shopping and ordering process, followed by the appropriate screen shots (e.g., FIGS. 11-12).

Figure 13:
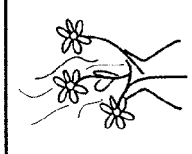
FIG. 13 is a shop by occasion screen.

If the user selects an occasion from the Shop by Occasion menu (FIG. 13), the selected occasion loads. Arrangements appropriate for the selected occasion are listed in order of price, from largest to smallest. Behaviors are identical to the Home Page Behaviors.

It is not necessary to assign an ordinal value to each arrangement; numbers are included for illustration purposes only.

Figure 14:
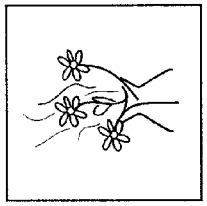
FIG. 14 is an arrangement detail screen.
Figure 15:
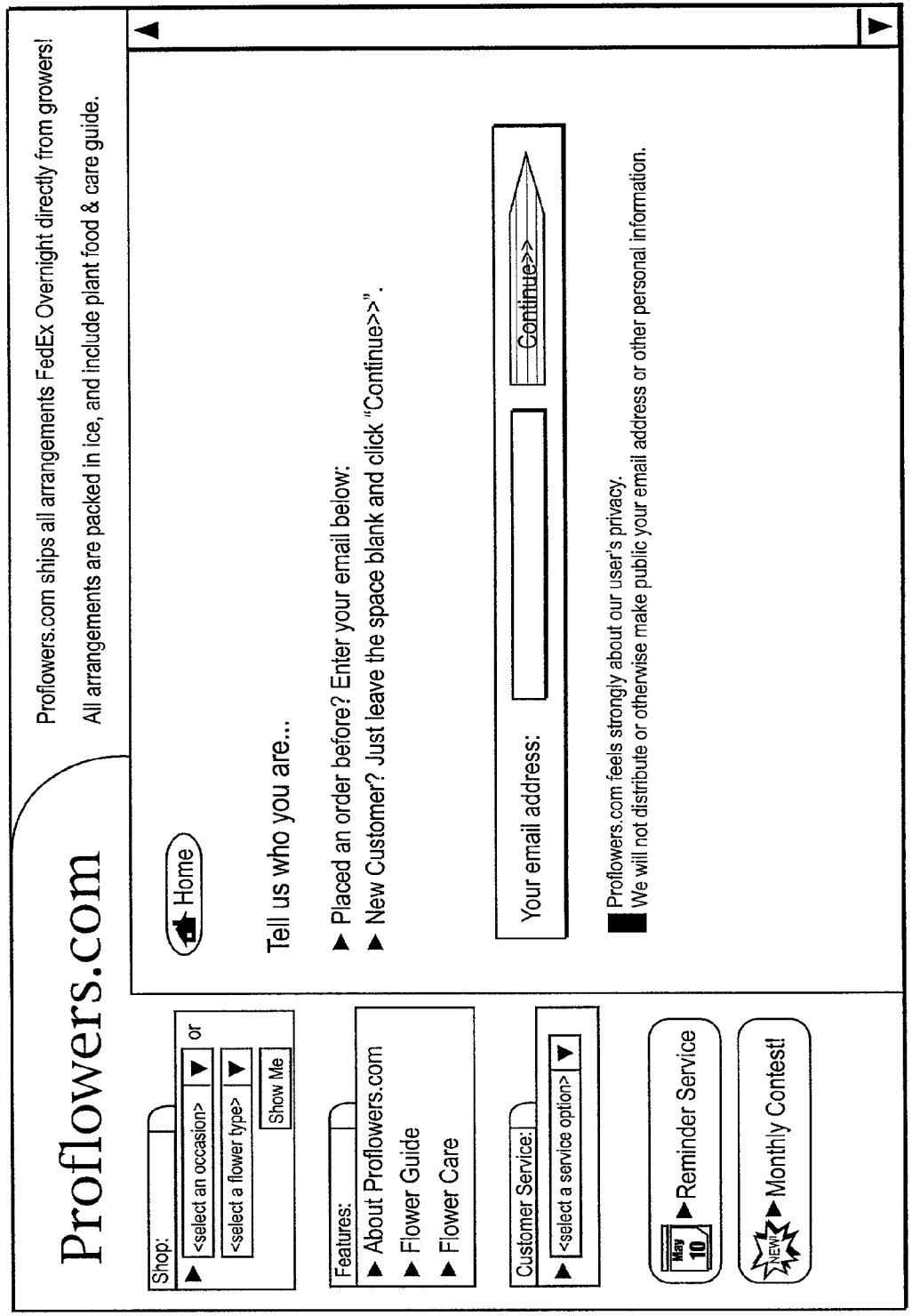
FIG. 15 is a customer identify screen.

The Arrangement Detail screen (FIG. 14) allows the user to view each arrangement in more detail than the initial shop screen. This facilitates faster downloading by providing single larger images on a page rather than several. By saving the original image in its larger format, then reducing the size while in Catalog View, the load time for the detail view is significantly reduced as the image is already cached. Behaviors are identical to the Home Page Behaviors.

If the user has not yet completed an order during the active session, they are asked to identify themselves. The user has the option of entering an email address if they have shopped Proflowers.com previously, or leaving the field blank and clicking "Continue >>". If the system recognizes the user, it provides the Recipient Selection screen. Otherwise, an error and request for reentry appears.

Behaviors

Your Email Address:

Text Box: the user enters their email in the text box, or leaves it blank. If left blank, the site loads the Recipient Information Page (i.e., screen). The cursor should focus on this field automatically.

Continue >>

Graphic Button: clicking continue submits the value of the text box and proceeds to the next screen; Enter or Return will also execute this command.

Figure 16:
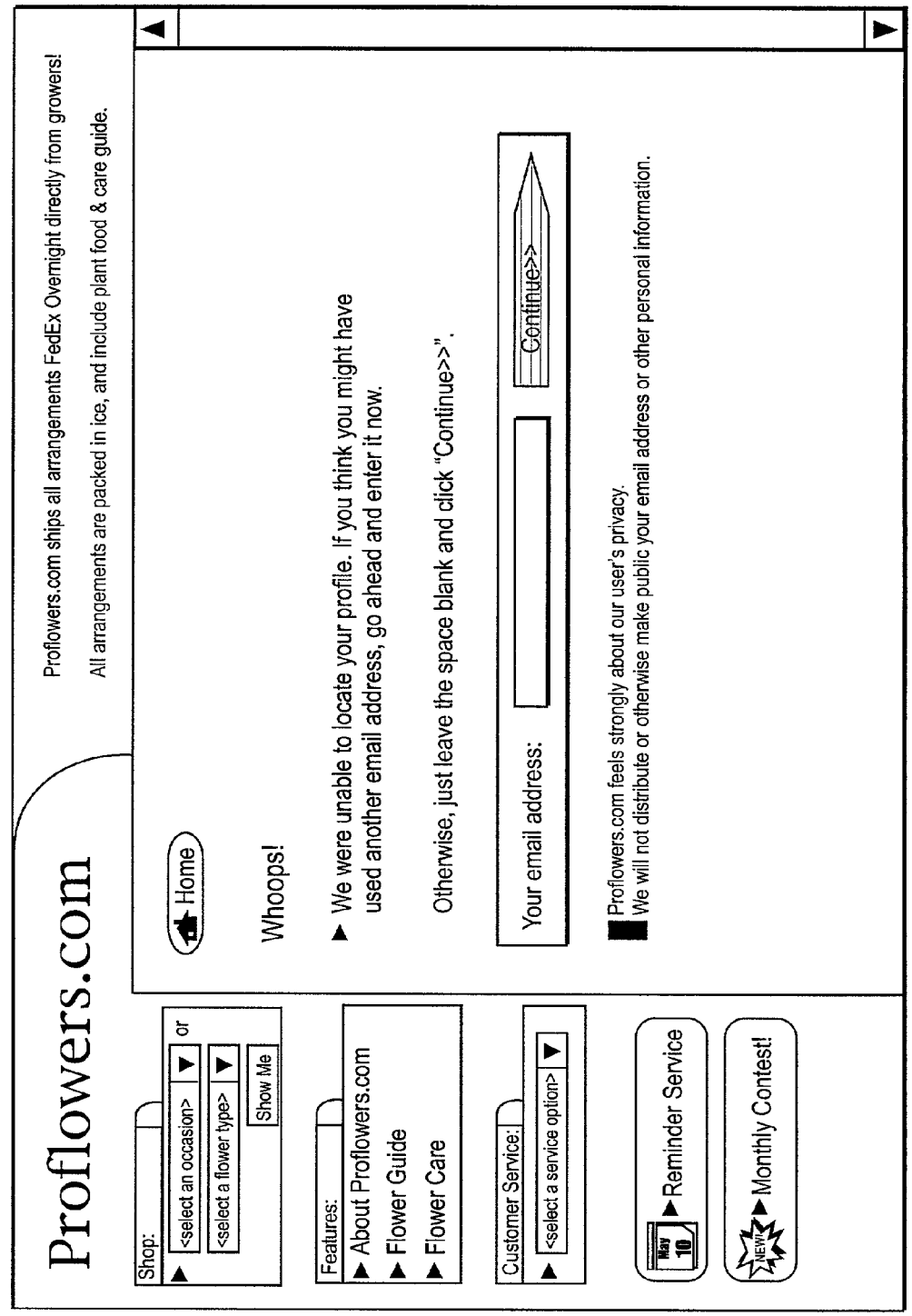
FIG. 16 is a customer identify error screen.

If the user enters an email address that is not recognized, they are presented with an opportunity to reenter their email address (FIG. 16). This is due to the fact that many users have several email addresses, and may have entered one different than the one used to place an order. Behaviors are identical to the Customer Identify Screen.

Figure 17:
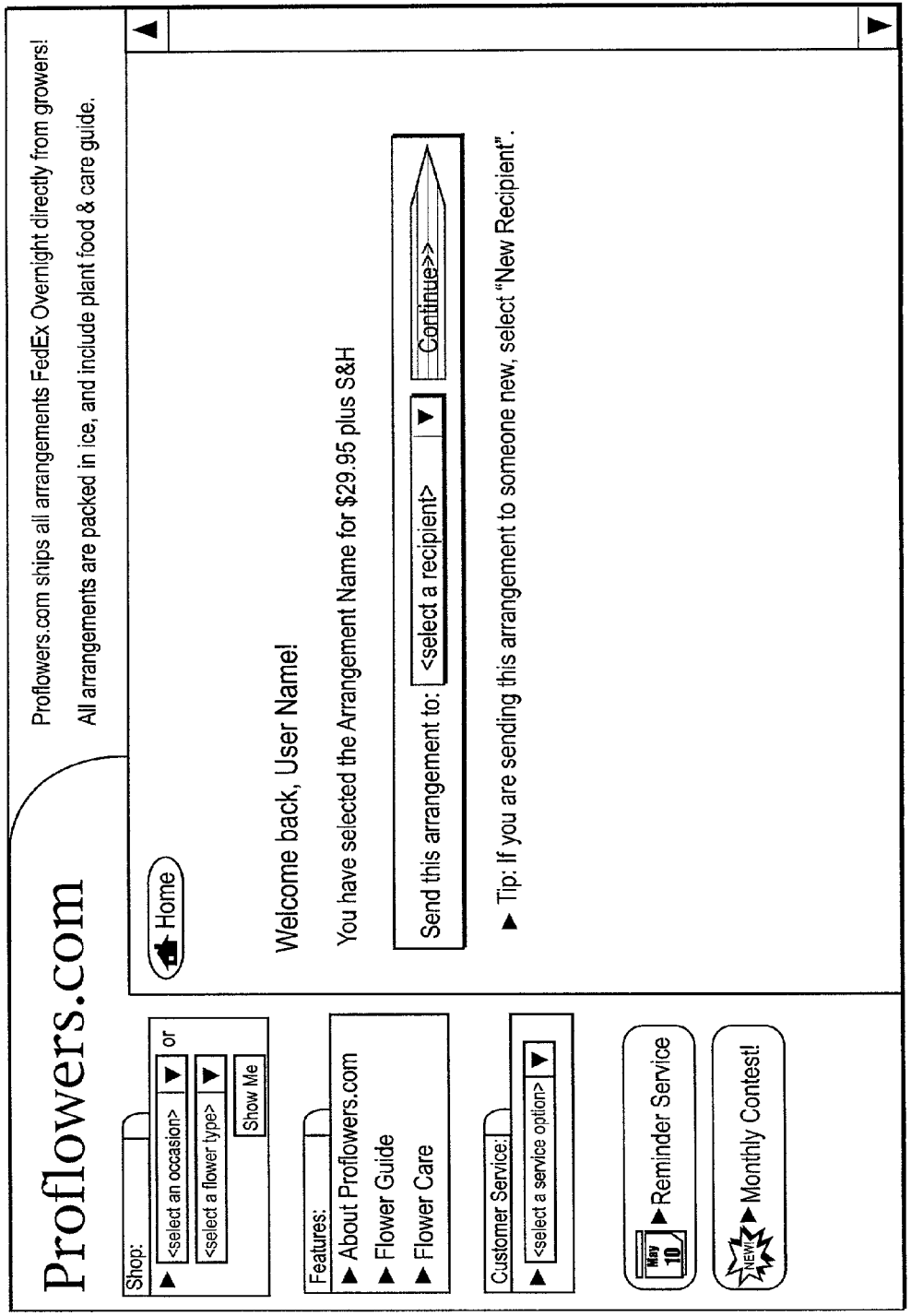
FIG. 17 is a select recipient screen.
Figure 21:
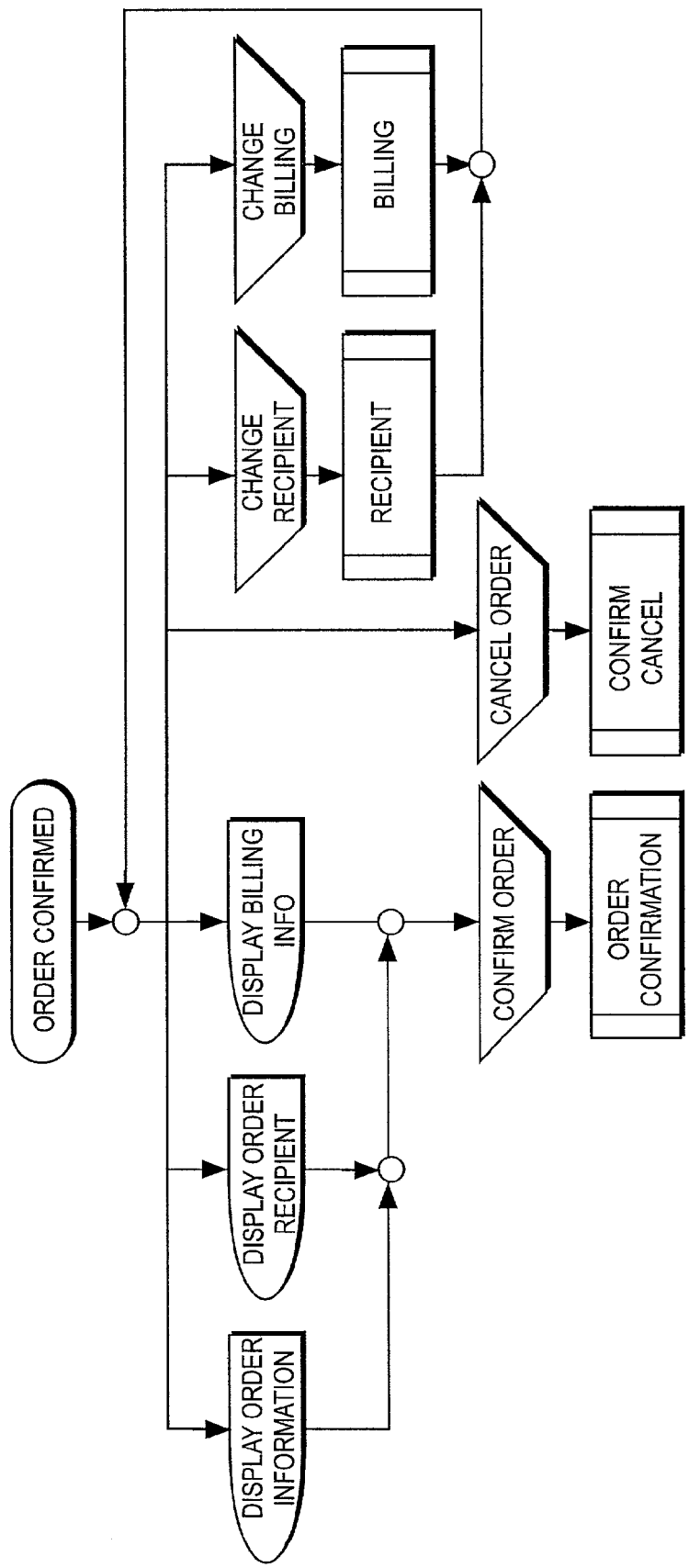
FIG. 21 is a logic flow chart.

If the user is recognized as a previous user, either by the presence of a cookie or by the entry of a recognized email address, they are presented with a selectable list of recipients. This list contains "New Recipient", the user's name, and the names of any other recipients from past orders. (See FIG. 17.)

Note: the browser must have entered Secure Mode at this point.

Behaviors

Select a Recipient

Drop down list: lists "New Recipient", the user's name, and the names of any previous recipients. JavaScript should be used to automatically detect the selection. The default value is "New Recipient".

Continue >>

Graphical Button: if the selection is not automatically detected, then users may click this button to proceed; hitting Enter or Return will assume the default selection is desired.

Figure 18:
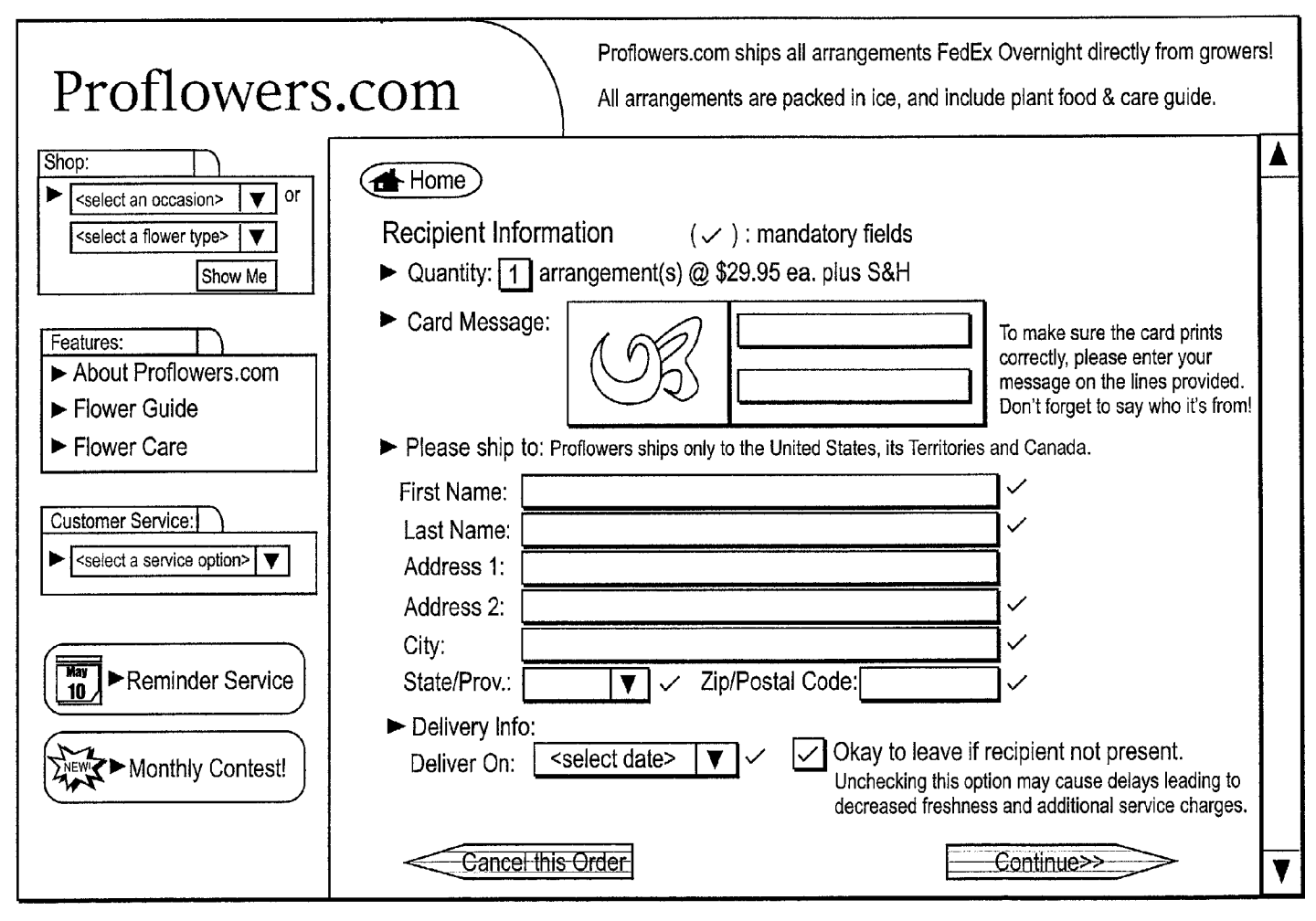

If the user selected a recipient, the address fields are already populated with the appropriate information. If a recipient was not selected, the fields are left blank. The screen in FIG. 18 summarizes the order quantity, arrangement name, card message, and shipping information.

If there are any errors, the page reloads with the erroneous fields highlighted. Note: if the browser is not yet in secure mode, it is now.

Behaviors

The Tab key may be used to advance between fields; the focus should default to the quantity field.

Quantity:

Text Box: user enters the quantity of arrangements they wish to send. The default value is 1.

Card Message:

Text Boxes: five text boxes within the context of a graphic for the actual card; explanatory text indicating users should specify who it's from.

Please Ship To

The following standard form elements collect information about the Recipient of the arrangement. Fields marked with a (*) are mandatory.

First Name:

Text Input: space for user to insert first name; the cursor should default to this field.

Last Name:

Text Input: space for user to insert last name.

Address 1:

Text Input: space for user to insert the main address

Address 2:

Text Input: space for user to insert optional address information.

City:

Text Input: space for user to insert the city.

State/Prov:

Drop Down List: list for selecting state (format =AL, AZ, CA., etc . . .) Only those states, provinces and territories that can be shipped to are included. The country is implicit in the selection.

Zip/Postal Code:
Text Input: space for user to insert zip code; only allows 7 digits or whatever is allowable by virtue of the State or Province Selected.

Delivery Date:
Drop-down list: list of dates for shipping that extend four weeks from the present date. Shipping values are listed next to each date, as to indicate the difference between weekend and weekday delivery. Additionally, important holidays and flower days are listed by name next to the appropriate date as to facilitate the selection of a moving holiday date (i.e. Mother's Day, Thanksgiving, etc.)

If it is possible, it might be desirable to list the actual holiday name in lieu of the actual date.

Leave on Doorstep:
Check: if this option is checked, arrangements will be left if no one is available to receive them; this is checked by default. Explanatory text next to this option explains the possible problems associated with un-checking this option.

Cancel Order:
Graphical Button: discards information and activates Cancel Confirmed screen.

Continue >>
Graphical Button: saves the recipient information and proceeds with the Billing portion of the order; hitting Enter or Return activates this function.

The Billing Information screen FIG. 19 collects the billing information from the user. Mandatory fields are marked with an (*). This page is secure, and should indicate so. If the user was identified by the system, the "Bill to:" information is populated, and the "Billing Method:" information is blank.

Note: Credit Card information should not be accessible from any portion of the site.

Behaviors

Billing Address
The following standard form elements collect billing information. Fields marked with a (*) are mandatory.

First Name:
Text Input: space for user to insert first name; the cursor should default to this field.

Last Name:
Text Input: space for user to insert last name.

Address 1:
Text Input: space for user to insert the main address
Address 2:
Text Input: space for user to insert optional address information.

City:
Text Input: space for user to insert the city.
State/Prov:
Drop Down List: list for selecting state (format=AL, AZ, CA., etc . . . ); should include an option "NONE" for international orders.
Zip/Postal Code:
Text Input: space for user to insert zip or postal code; country is implicit and determined by the value entered.

Phone:
Text Input: text field which allows enough space for international phone numbers.

Billing Method:
The following standard form elements collect information about the preferred billing method.

Credit Card
Drop-Down List: user may select from Visa, Mastercard, and Discover. The initial value of this list is "[select one]".

Account Number:
Text Input: space to enter card numbers; should be limited to 16 digits.

Expiration (mm/yy):
Text Input: space to enter expiration date. A suggested default value on "01/98" will indicate the format to enter the expiration date. An error routine should check for any data less than current month.

Cancel Order
Button: discards order information and returns user to order cancellation confirmation screen.

Continue >>
Button: saves billing information and proceeds to the order summary; pressing Enter or Return executes this action as well.

Before confirming an order, the user has a chance in the screen in FIG. 20 to review the order and make any modifications.

Behaviors

Change:
Button: allows the user to edit the information for the selected section. Clicking "Change . . . " opens the edit screen for either billing or shipping; confirming the change returns the user immediately to this screen.

Cancel this Order:
Graphical Button: opens the Cancel Order/Review Order screen to allow the verification of the cancellation.

Confirm Order >>
Graphical Button: submits the order to the billing server and opens the "Order Confirmed" screen; pressing Enter or Return executes this action.

After confirming their order, the user is presented with a printable summary of their order in the screen in FIG. 22, which includes the order number. They may select "Done" or "Place Another Order"; both have the same effect of returning the user to the Main Screen (users seemed to need an explicit button for completing the task).

Design Note: Notice that the Done button has a soft, rounded appearance whereas the Place Another Order Button has a pointed end. This is to suggest Finished, in the formed as opposed to "Continue on with another action", as in the latter; this convention is utilized throughout the design.

The screen in FIG. 23 should provide users with general information about Proflowers.com, such as details regarding the price, quality and freshness of the arrangements. It should also include links to the Customer Support page, in case users are looking for that type of information on this page. It is also a good opportunity to introduce links to the value added features and sections, like the Flower Care and Guide sections.

Figure 24:
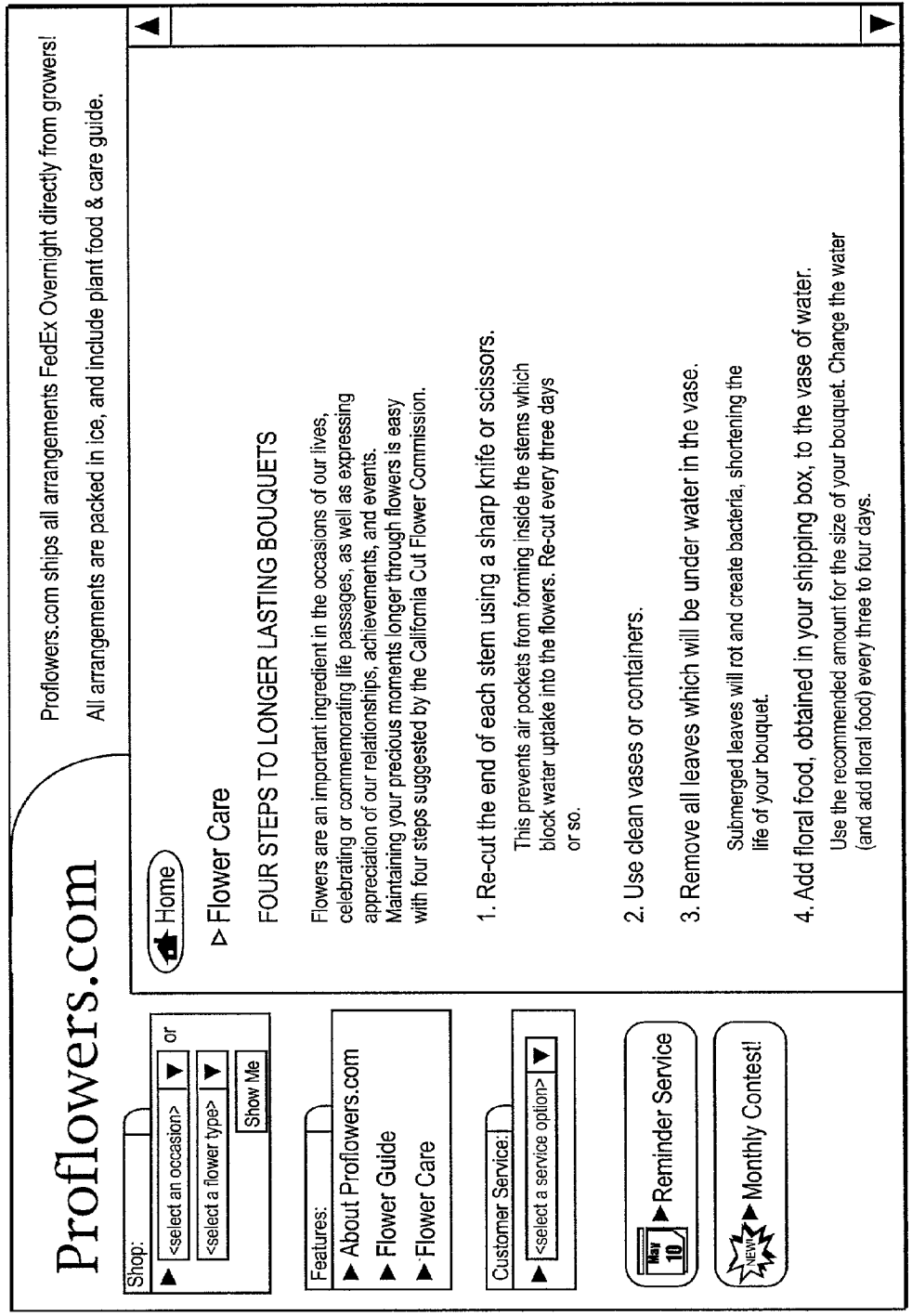
FIG. 24 is a flower care screen.

The screen in FIG. 24 provides a guide to caring for cut flowers. It should also include a link to the Flower Guide. Also, it should mention that this guide is included with every order.

Figure 25:
FIG. 25 is a flower guide screen.
Figure 26:
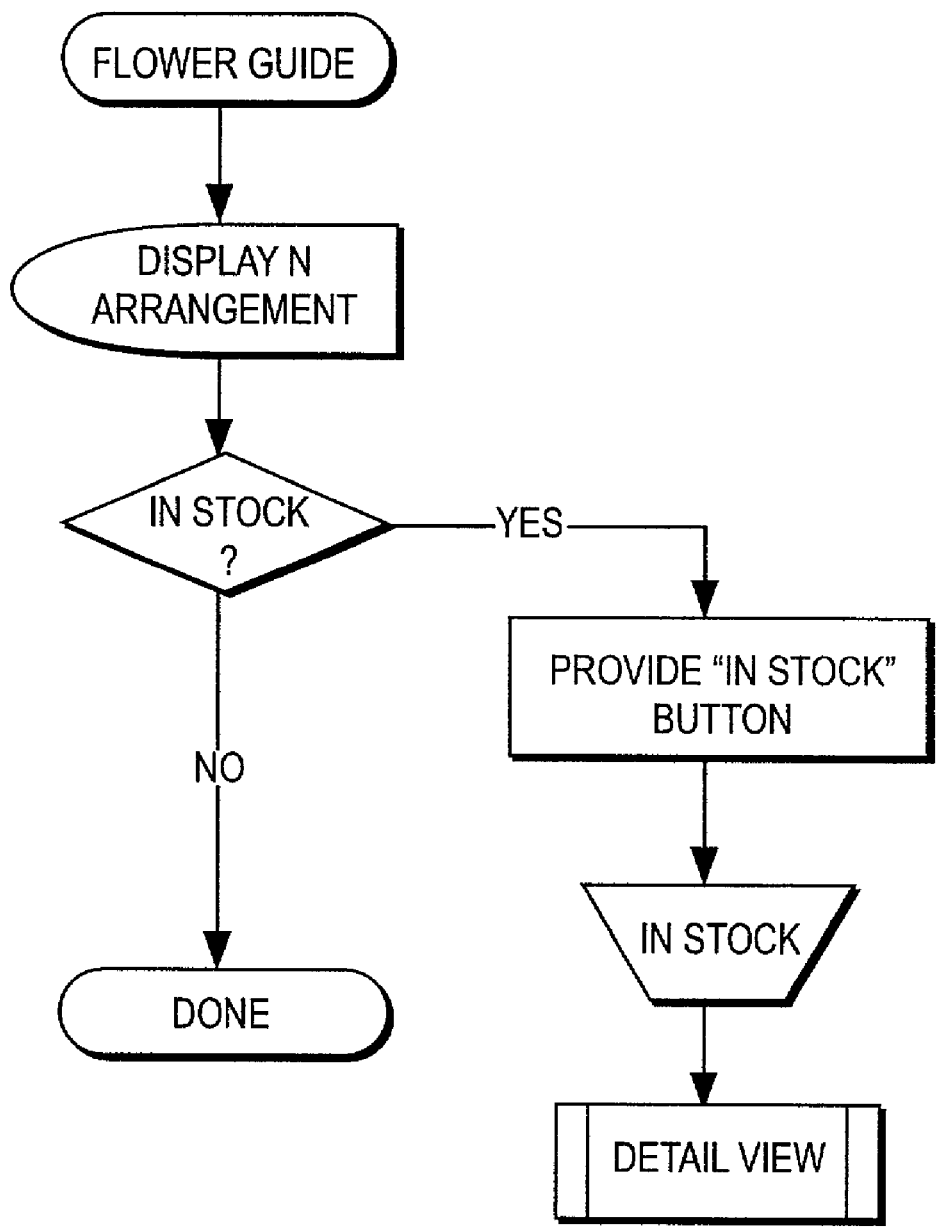
FIG. 26 is a logic flow diagram.

The Flower Guide screen in FIG. 25 provides users with a simple guide to the types, appearances and meanings of different flowers. This also allows Proflowers.com demonstrate its special knowledge about flowers.

If any of the featured flowers are available for sale through Proflowers.com, an "In Stock" hypertext button should be included with the description. Clicking "In Stock" takes the user to the appropriate detailed view of the arrangement.

The most popular flower types, such as roses and tulips, should be featured first in the guide, along with a brief description of the meaning and seasonal availability. Users may reach this guide by clicking on the names of flowers within the arrangement descriptions.

Figure 27:
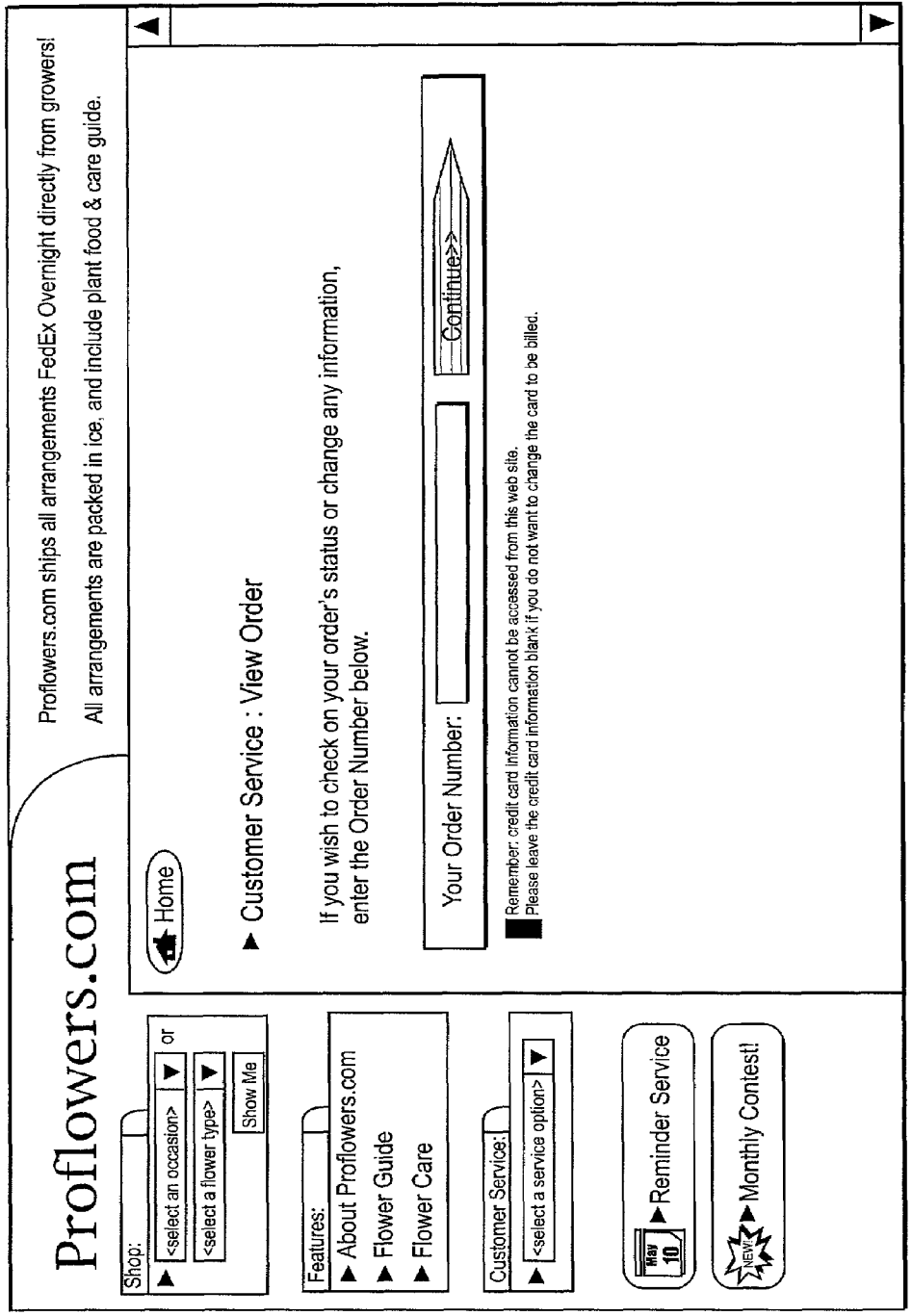
FIG. 27 is a view order (identify order) screen.

When a user selects "View Order" screen (FIG. 27) from the Customer Service Menu, they get this screen. If the user wishes to view, edit or cancel an order, they may do so by entering their order number and clicking "Continue >>". The system will automatically poll FedEx with the number to generate the Order Status information, or at minimum provide them with an order status value.

Note: although not explicitly described in this document, this and all subsequent screens regarding order location should anticipate an entry error on the part of the user. Instead of providing an error screen instructing the user to go back, it should reload the same data fields but state that the order was not found and to re-enter it. This is similar to the "Customer Identification" screens.

Behaviors

Your Order Number:

Text Box: space for typing order number located on the Order Summary.

Continue >>

Button: submits the order number and locates the order summary for that order. Regarding FIG. 28, if the order number matches an order in the database, the details (including FedEx status) are displayed. If the order has not yet shipped, up to the day before intended shipping, the user may modify the information (see previous Order Summary for description of behaviors). Cancel Order takes the user to the Cancel Order Reviewscreen.

Note: whitespace is used to help the delivery date and order status information stand out.

These two pieces of information are very important, and should be made to stand apart from the other information on the page.

Figure 29:
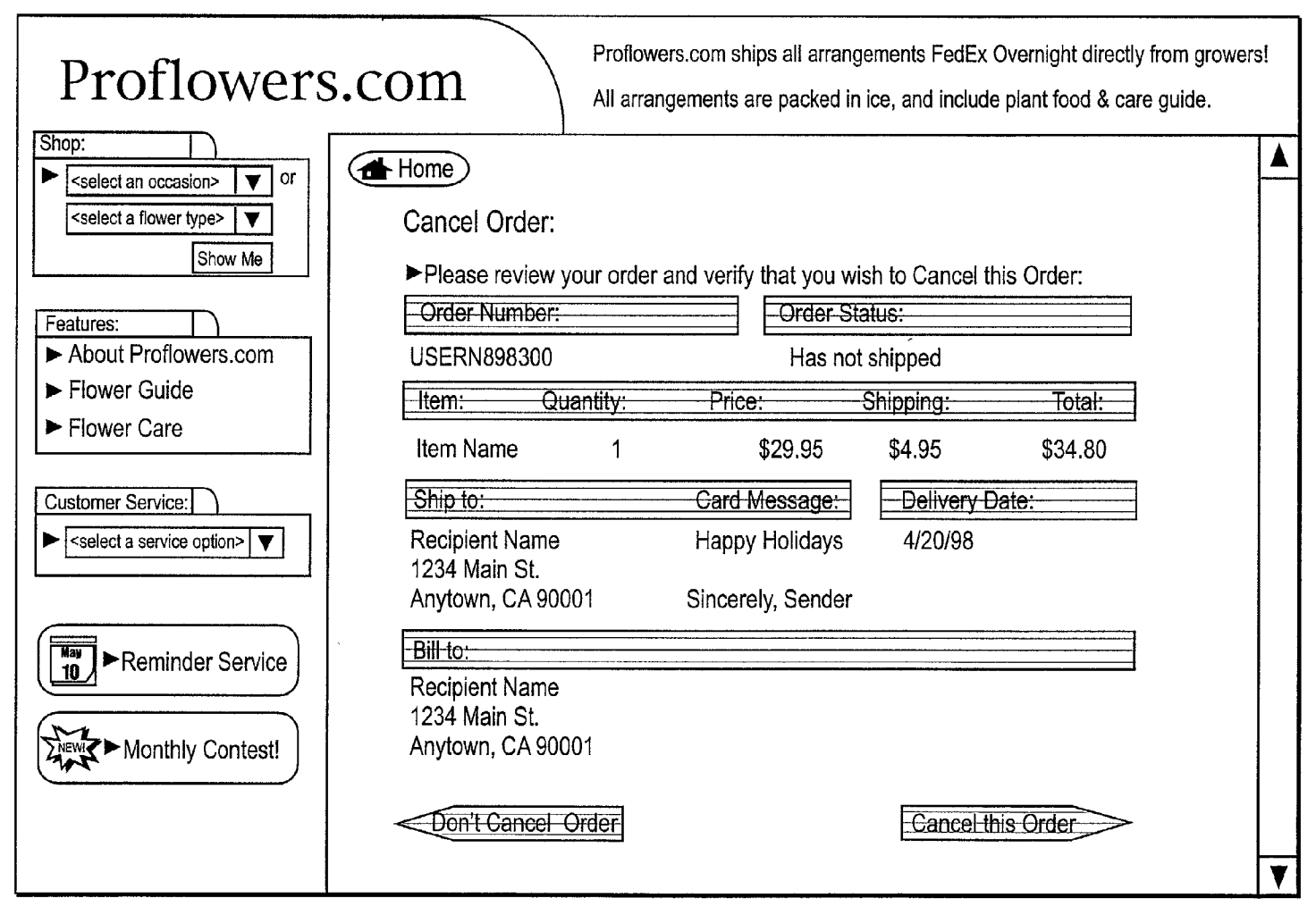

If the user selects "Cancel Order" from a screen (FIG. 29) containing a complete order summary, they are presented with this screen so they may review their order and verify their decision. Clicking "Don't Cancel Order" returns the user to the previous screen.

Clicking "Cancel this Order" takes user to Order Cancel Confirmed Screen. The system should remove the order from the system at this point.

Note: any screen containing an order summary for an order that has already shipped will not contain a "Cancel Order" button.

Figure 30:
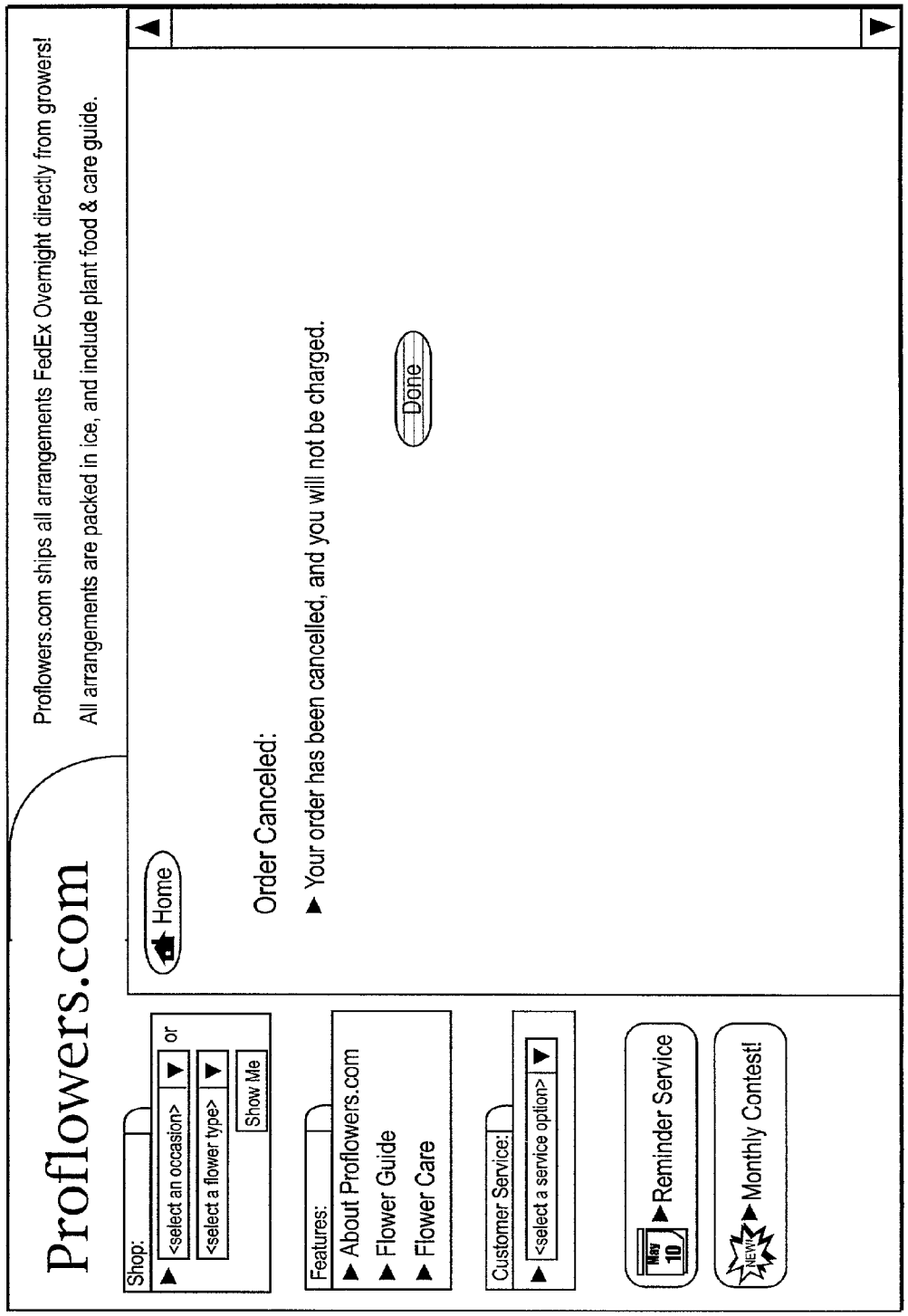
FIG. 30 is a cancel order confirmed screen.
Figure 31:
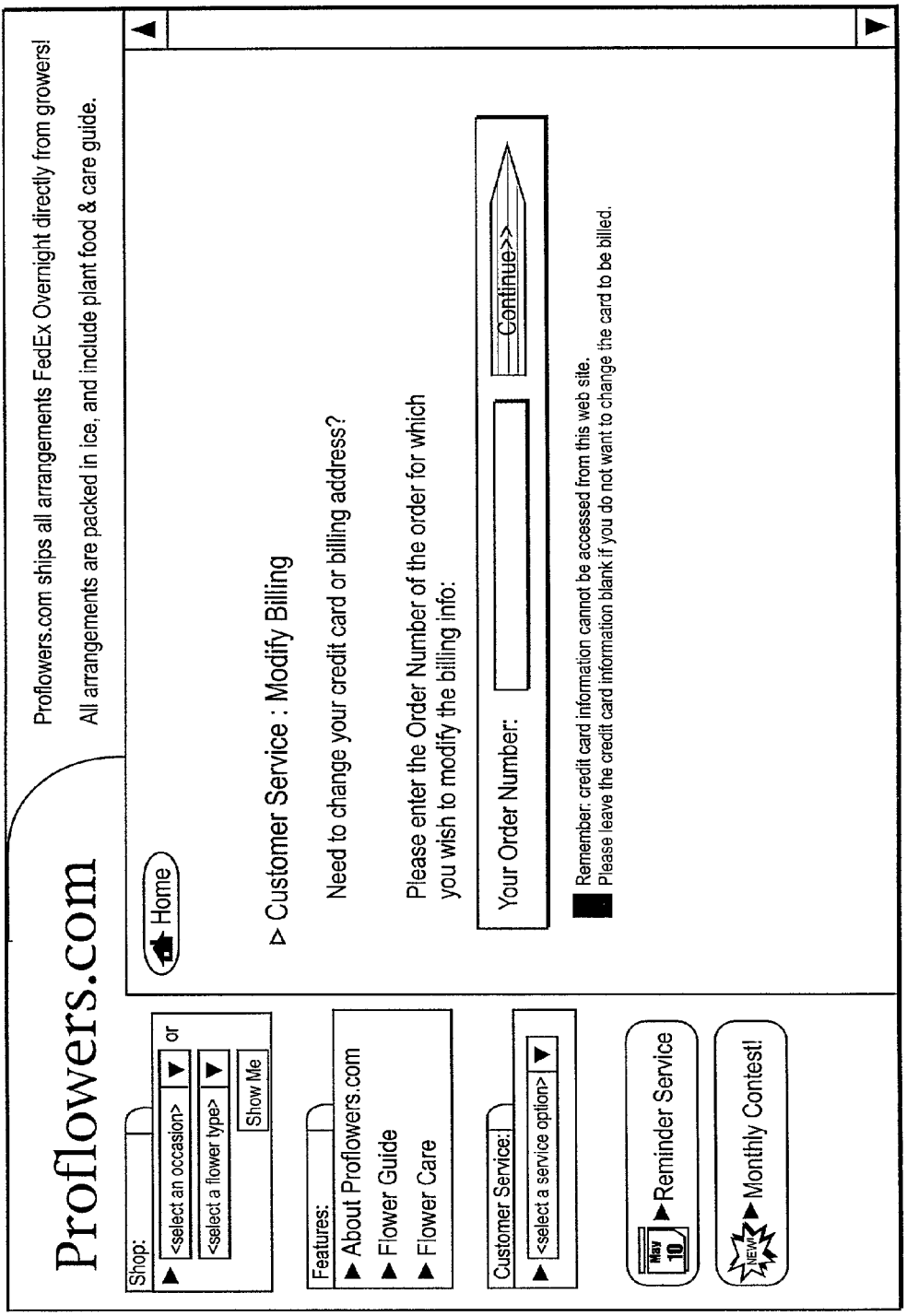
FIG. 31 is a modify billing screen.
Figure 33:
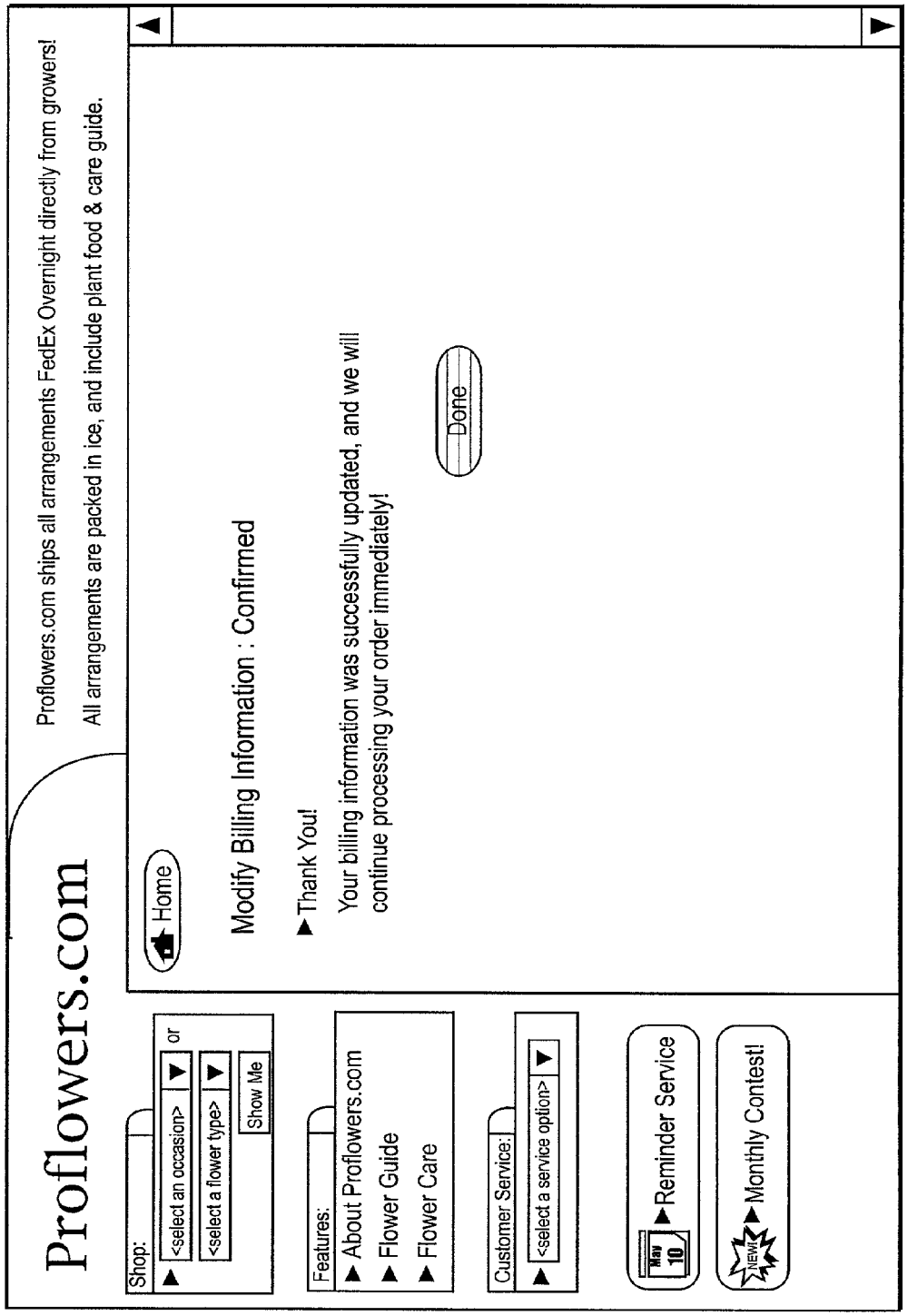
FIG. 33 is a modify billing (confirmed) screen.
Figure 34:
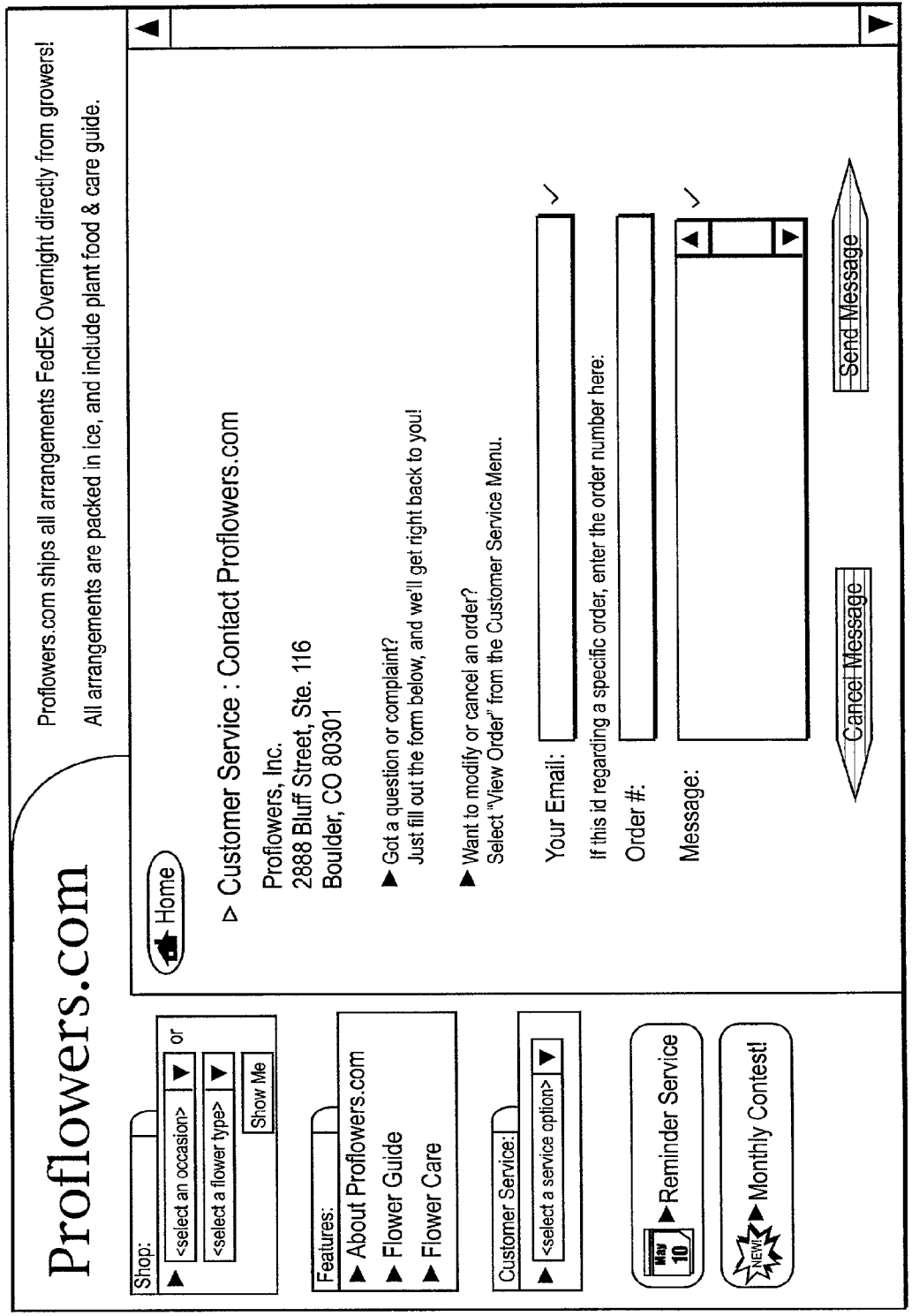
FIG. 34 is a contact proflowers.com screen.
Figure 35:
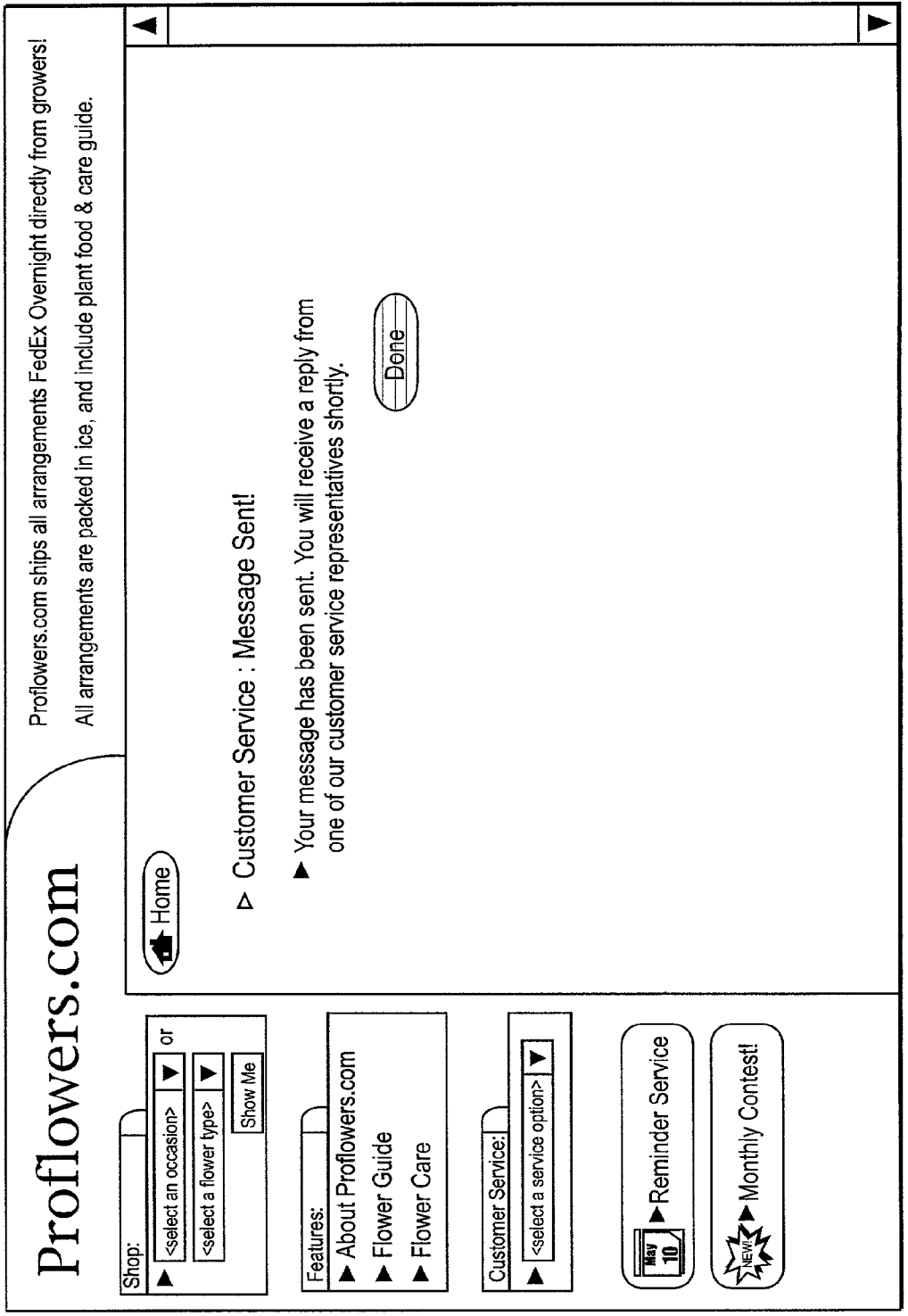
FIG. 35 is a contact confirmed screen.
Figure 36:
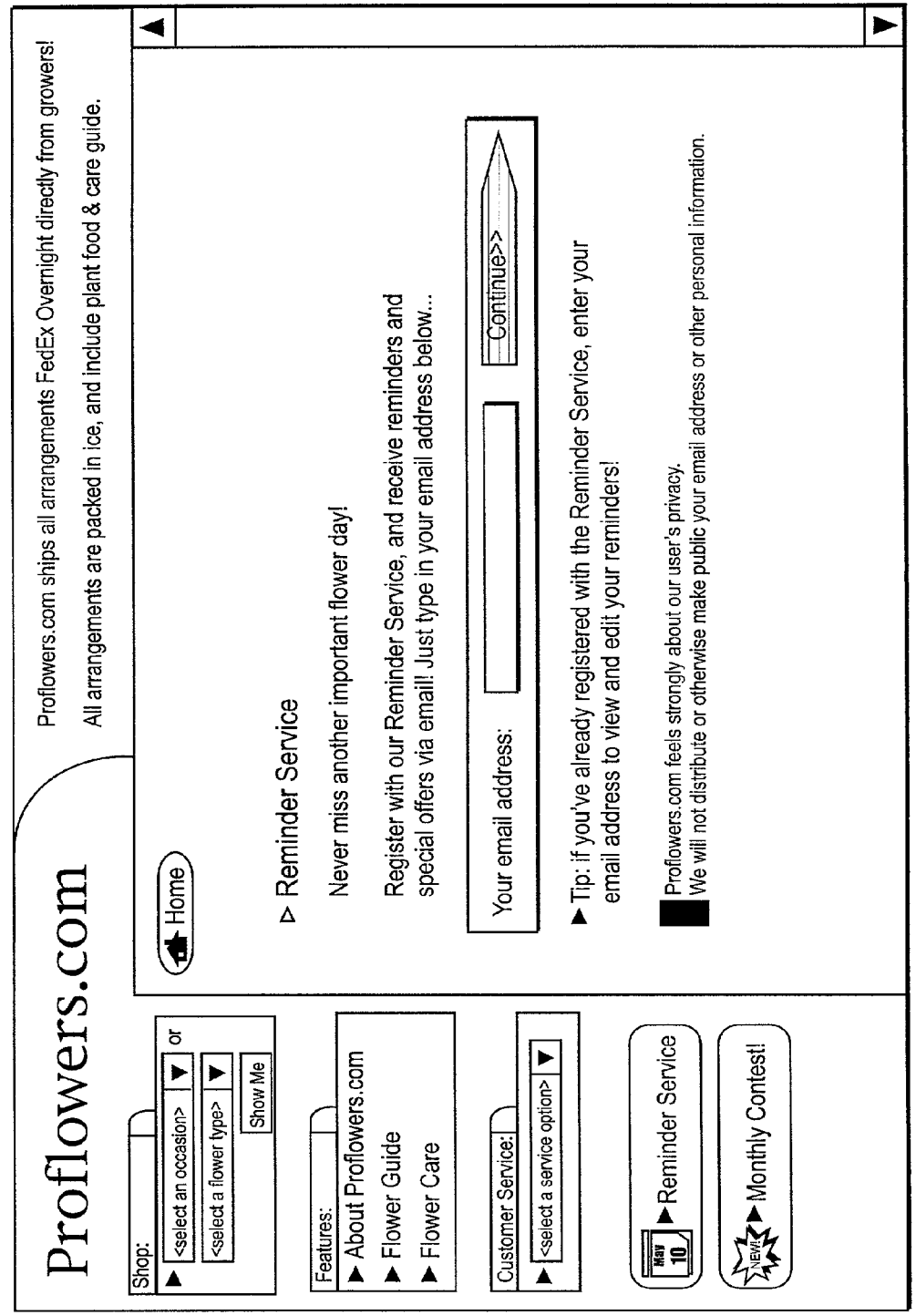
FIG. 36 is a reminder service screen.
Figure 37:
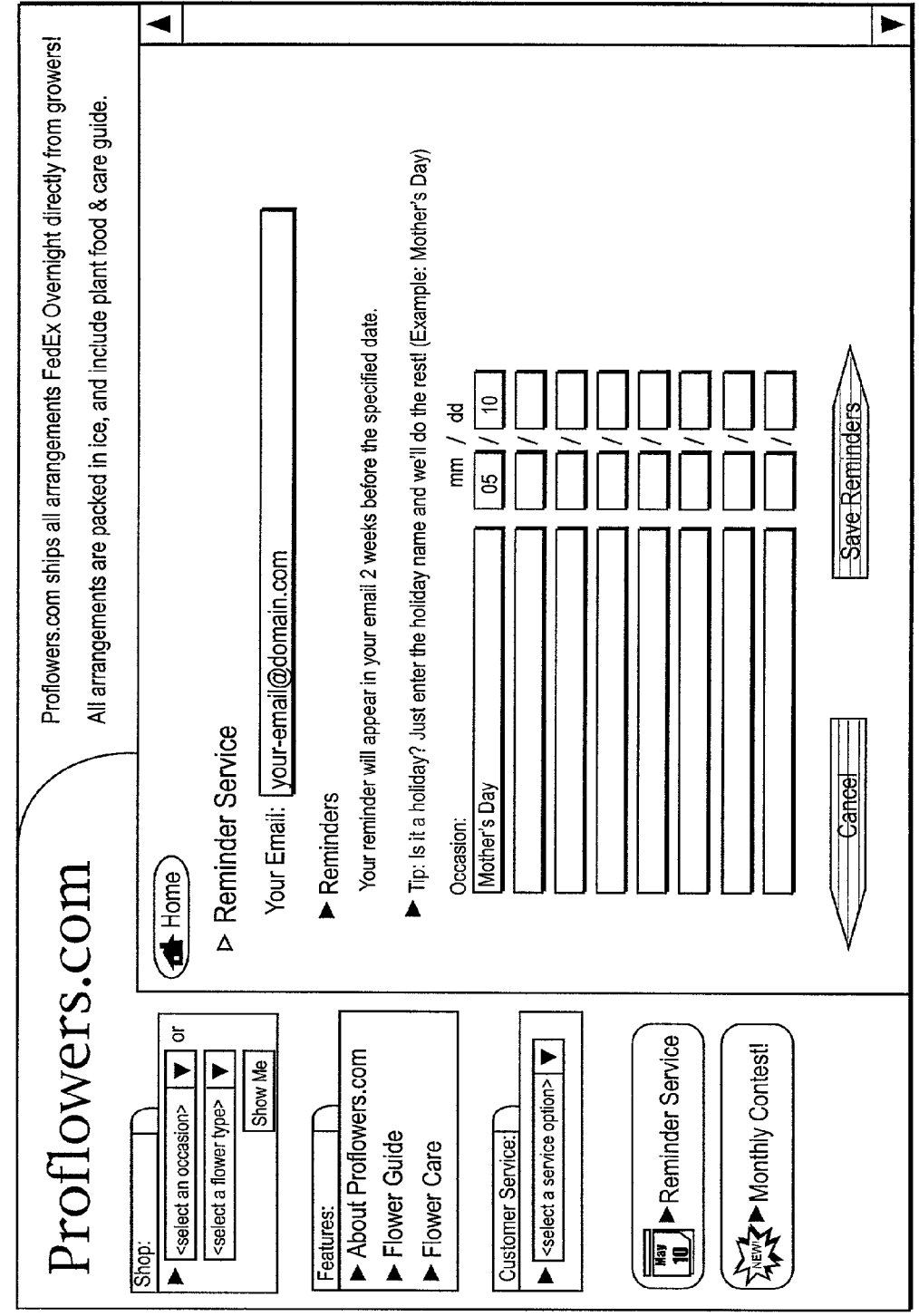
FIG. 37 is a reminder service (modify) screen.
Figure 38:
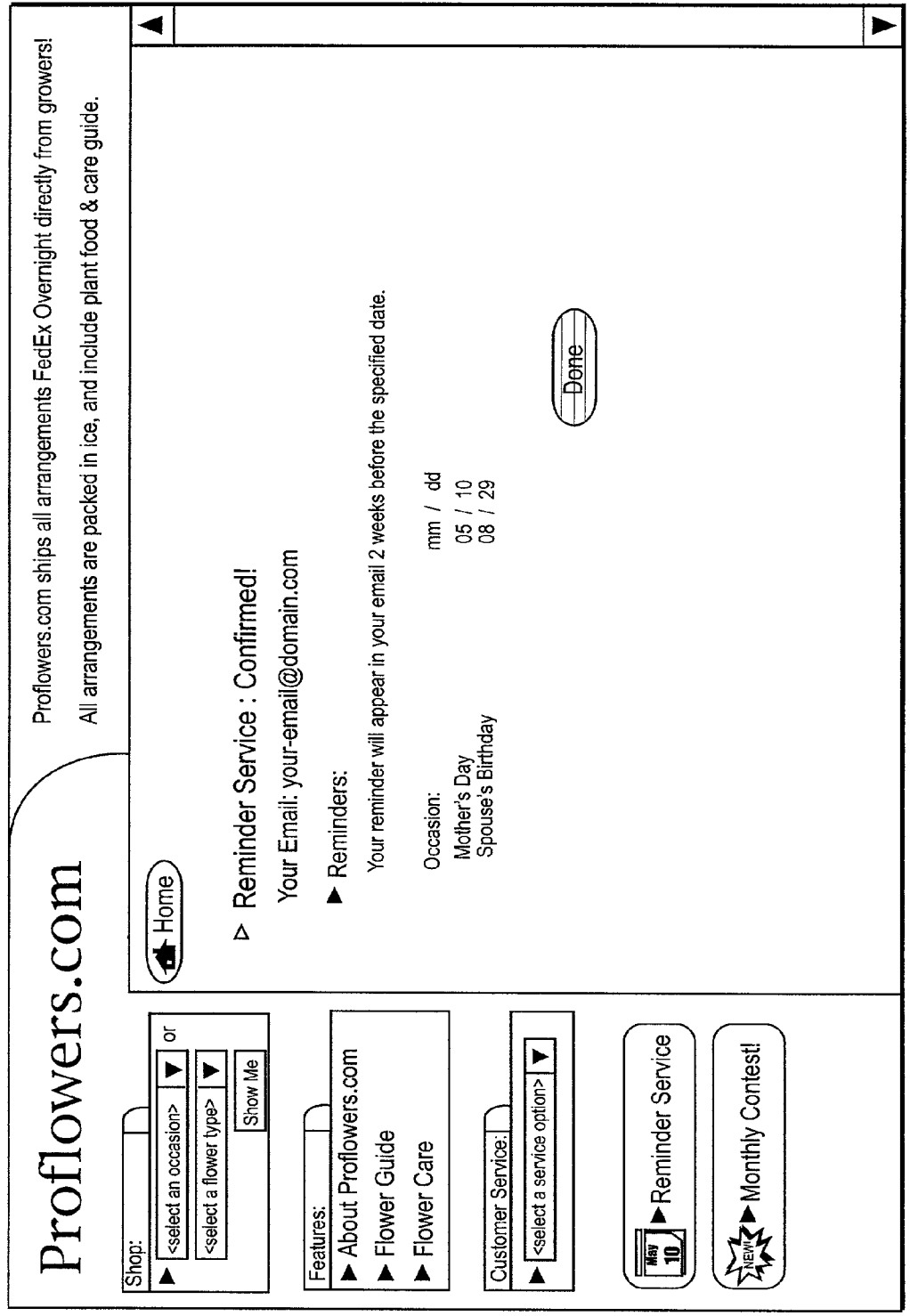
FIG. 38 is a reminders confirmed screen.

FIG. 30 is a screen that confirms to user that the order has been canceled.

Figure 40:
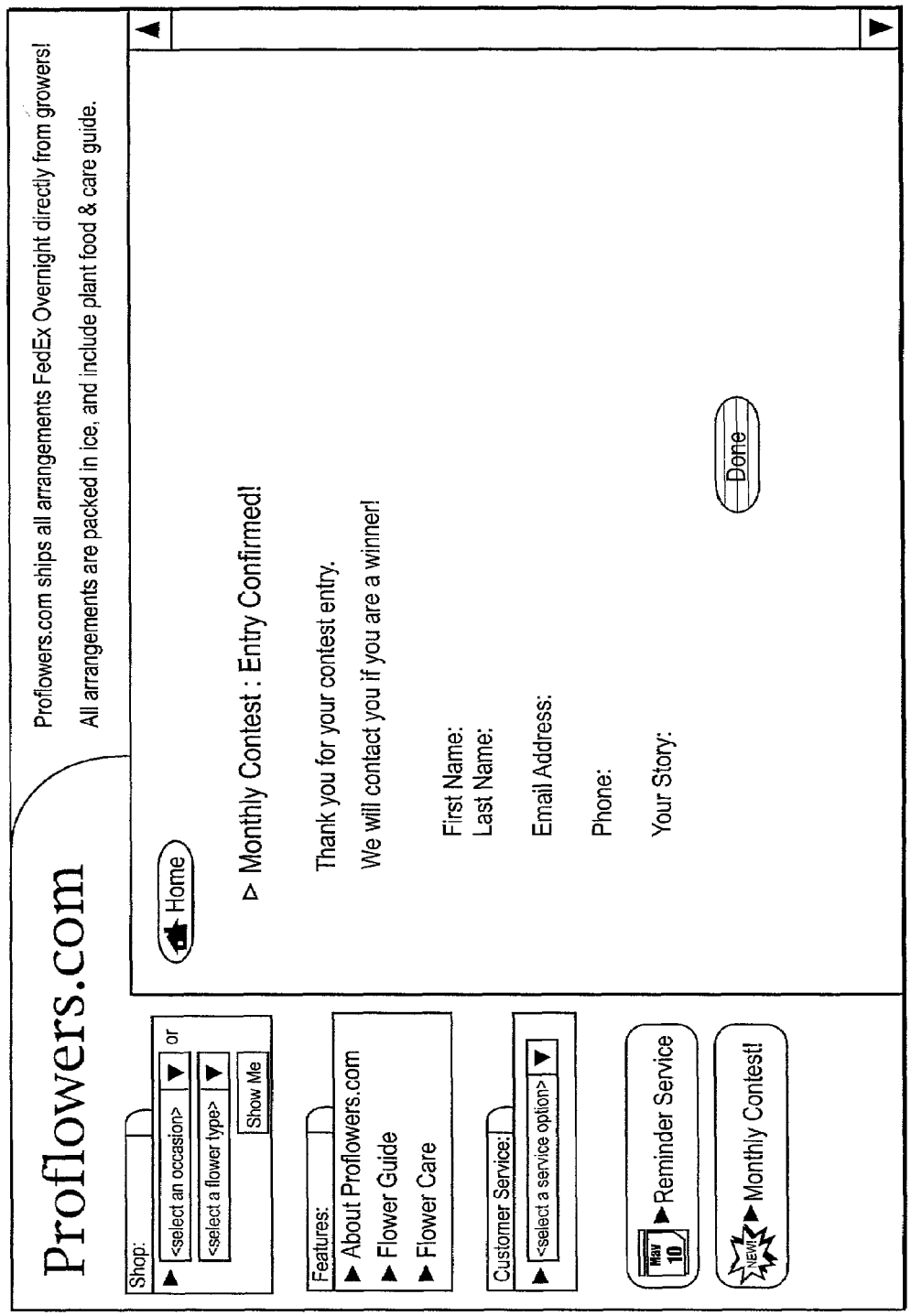
FIG. 40 is a contest entry confirmed screen.

If the user wishes to modify the billing information, especially if an email was sent that a credit card was declined, they may do so from the screen in FIG. 40.

Behaviors

Your Order Number:

Text Box: space for typing order number located on the Order Summary.

Continue >>

Button: submits the order number and locates the billing information for that order. See description for Billing Information in ordering process. A continue screen in FIG. 41 updates the information and provides confirmation; Cancel loads the order summary for verification.

Confirmation that the billing information has been successfully updated in FIG. 42. If users wish to contact Proflowers for any reason, they may complete the form in the screen of FIG. 43. Clicking "Cancel" returns user to the home page; clicking "Send Message" submits message and activates confirmation page.

After submitting a message, the user is presented with confirmation that their email was received in the screen illustrated in FIG. Clicking "Done" returns the user to the home page.

A Reminder Service screen in FIG. 45 allows users to enter special dates with the expectation that they will receive a reminder and special offer when the date approaches. Entering an email address accesses the reminders. If the email is recognized, the saved reminders can be edited. Otherwise, the reminders are blank.

The user may enter special occasions and dates in on the screen in FIG. 46. To assist the user, the name of a holiday may be entered without a date. If, after submitting the reminder the string matches one in the database, the date is automatically applied. This is useful for holidays which have shifting dates, like Easter, Passover, Mother's Day, Thanksgiving, and so on.

The first time the reminders are accessed, it should include one or two examples for the user to view.

After submitting reminders, they are summarized for the user in a screen shown in FIG. 47 to show that they were accepted by the system. Any holidays in which dates were left blank will now be populated by the system (if matched).

The contents of the contest page for the screen in FIG. 48 are up to the discretion of the Proflowers.com design and marketing teams.

Confirmation that the contest entry was submitted successfully is shown in the screen of FIG. 49.

Technology Issues

Frame Technology

Frames are compatible with all Mozilla/2.0 compatible browsers. Browser usage statistics from various Internet sources have indicated that the majority of users on the web are using a browser that is Mozilla/2.0 compliant. Therefore, ID is confident that the use of frames in the site will not hinder the vast majority of users that access the Proflowers site. These statistics include AOL users (see http://webmaster.info.aol.coml for more information on developing for AOL users).

JavaScript

This design assumes the use of JavaScript to implement certain elements in the design. It has been determined that the JavaScript Event Handlers indicated in this document are compatible with all Mozilla/2.0 and greater browsers, which accounts for much greater than 80% of the existing Internet users. JavaScript is a highly flexible, object oriented language which is well suited to implementing certain user interactions not possible with HTML, with the added benefit of being more stable and compatible than Java.

Design Issues

Thinking Outside the Box

There is more to this site than the pages it serves. There is an underlying structure which reinforces Proflowers intimate knowledge of their customers needs.

For example:

Dates: whenever a date must be selected (i.e. for delivery), not only is the date indicated but the holiday associated with that date is displayed as well. Since many holidays occur on shifting dates, this will make selecting a delivery date easier for the user. If the date affects shipping, that should be clearly indicated as well.

Email: any action performed by the user that affects their account should include on screen confirmation as well as email confirmation. Email requiring a user action should contain explicit instructions and even hypertext links to the actual screen they need to visit to resolve the issue.

Packaging: graphic elements on the packaging, flower guide, card etc. should be consistent with the look and feel of the site to indicate coherence and unity within the company.

Customer Service

Whenever a request is submitted to Proflowers.com, such as an order or service request, an automatic reply in the form of email should be generated stating that the message has been received by Proflowers. Any time an action regarding Proflowers and the customer occurs, and email should be generated if possible.

Browsing Inventory

If the user opts to view an arrangement in more detail, they are offered the option to continue browsing the inventory in the detailed view "mode". Previous experience and observation has shown that users will predictably utilize the browser's "Back" button to return to the overview page from which they selected the Detailed view. Since the pages are generated based on the user's browsing preference, it may not be technically feasible to include a "<<Back" button on that actual "Details" screen. Additionally, the limited inventory does not indicate the need for a mechanism to allow browsing within the "Details" view.

Users stated an interest in the names of flowers included in the text descriptions of arrangements should link to the appropriate section of the Flower Guide for the flower selected.

Shopping Cart

Task analysis indicates that ordering multiple items is less likely than ordering only one. Therefore, multiple orders are facilitated by a "Place another order" button on the final ordering screen. Users are not required to re-enter data as long as they don't leave the site or the 15-minute limit has not passed.

Survey

In order to gain valuable marketing information, Proflowers.com is interested in including a survey. The most appropriate point for this survey to appear is after a user has completed an order. This way the user will have a fresh impression of the ease of use and value of the site, since they have just completed using it. Proflowers.com should attempt to offer some incentive for completing the survey, since research shows that users are typically wary of offering this type of information. There is a perception that personal information will be disseminated against their wishes, so Proflowers.com should stress that the survey is merely intended to make their experience with Proflowers.com more pleasurable in the future by implementing their suggestions.

This survey could appear after the user clicks done, and be phrased as to indicate to the user that it is for the purposes of improving the site, and not for demographics/marketing reasons. Obviously, any demographic information collected should be carefully presented as to not contradict this statement.

Reminder Service

The reminder service allows a frequent user to specify certain special dates, such as birthdays and anniversaries. An email reminder and advertisement is sent to registered users, possibly with special offers for reminder service clients (i.e. free shipping, discount price, etc.) Users register for this service separately from the ordering process, but use their email address for identification.

To draw attention to the reminder service, it has been displayed as an independent button with a graphic.

Strategic Alliances

Proflowers may wish to partner with other resources to add value to the site, such as including a Blue Mountain greeting card or other gifts, as well as links to partner sites with product offerings within the same domain.

Registry

Certain individuals may wish to select a few items they like and send a note to their favorite gift giver a nice reminder to buy them flowers. Again, special discounts or offers could be provided to such users. Implementing this would follow the same heuristics as outlined in the Reminder Service, including having a separate button.

With even more particular reference to how to make (and implicitly how to use) the present invention, please consult the code in the Appendix, which is incorporated herein, in view of the following representative specifications for ProFlowers.com.

Notation

<root> refers to the application directory root (e.g., f:\BMAO)

Application Load
Assumptions

| | |
|---|---|
| daily unique visitors (average/peak): | 100,000/600,000 |
| percentage of visitors placing order: | 1% |
| products per order: | 1 |

Design Criteria Based on Assumptions

| | |
|---|---|
| daily orders (average/peak): | 1,000/6,000 |
| daily faxes (average/peak): | 1,000/6,000 pages |
| 1 min. per fax page, 600 pages per day per channel | |

Order Processing Pipeline
Tables: FL_orderFulfillment, FL_orderFulfillmentStatus
FL_orderFulfillmentStatus also defines the exact sequence of steps

| # | Description | Program | Status[1] |
|---|---|---|---|
| 1 | new, temporary and incomplete order | \cfm\orderForm1.cfm CFMODULE Name = "BMAO.uniqueOrderID" (in Cold Fusion\CustomTags) | T |

-continued

| | | |
|---|---|---|
| 2 a. supplier selection<br>   b. FedEx shipment preparation[5]<br>   (VALIDATION-ONLY in case of<br>   delayed order; canceled in batch<br>   process batchFedExCancel.cfm) | \cfm\orderForm3.cfm[2]<br>selectSupplier.inc<br>FedEx.inc | FEX |
| 3 credit card authorization | \cfm\orderForm3.cfm[2]<br>CyberCash.inc | CCA |
| 4 finish order process or prepare for future processing | \cfm\orderForm3.cfm[2] | PPR or PSN[3] |
| 5 fax packing list/greeting message and FedEx waybill to supplier (multiple quantities result in multiple faxes) | \admin\batchNotifySupplier.cfm[6] | PSH |
| 6 shipped | \admin\batchCheckShip.cfm | SHP |
| 7 credit card captured | \admin\batchCaptureCC.cfm | CCC |
| 8 credit card settled | \admin\batchSettleAuth.cfm[4]<br>\admin\batchSettleRet.cfm | SET (temporary SER) |
| 9 delete FedEx waybill labels | \admin\batchDell.abelFiles.cfm | COM |
| 10 Administrative tasks: supplier paid | BackOffice, Fulfillment | SPD |
| 11 Manual processing | Exception handling; immediately taken out of automated processing cycle | MAN |

Notes
[1]status code as set after successful completion of stage; set in table FL_orderFulfillment. Valid status codes are:
T . . . temporary order (order and associated table entries will be deleted nightly by SQL Server Stored Procedure pp_deleteTempOrders; temporary customers are deleted by pp_deleteTempOustomers)
FEX . . . FedEx shipment prepared (md. Label gif file in <root>\FedExLabels directory)
CCA . . . credit card authorized
PPR . . . pending processing (future orders to be batch processed at a future time)
PSN . . . pending supplier notification (waiting for packing list/greeting message and FedEx waybill label to be faxed)
PSH . . . pending shipment (packing list/greeting message and FedEx waybill label have been faxed to supplier)
SHP . . . shipped (as determined by successful tracking of first package within order)
CCC . . . credit card captured
SER . . . settlement error (temporary status set by \admin\SettleAuth.inc and \admin\SettleRet.inc to identify order with status CCC so that they can be skipped during the next loop of settlement processing; reset to CCC by \admin\batchSettleAuth.cfm and \admi n\batchSettleRet. cfm at the end of the program)
SET . . . credit card settled
COM . . . completed order (excluding administrative tasks, such as supplier payment)
SPD . . . supplier paid (administrative task)
ERR . . . error; typically, order is canceled and customer notified by email, if available
MAN . . . manual processing (order is taken out of the automated processing loop; programs will not take any further action on this order)
EDT . . . editing; temporary status code to indicate that the order is being edited by the user
DEL . . . deleted by the customer from order tracking page; used for auditing purposes
Note, that manual status changes are only allowed after the order is in COM state.
[2]Delayed/future orders are handled by \admin\batchOrderProcessing.cfm
[3]PPR status set by \cfm\orderForm3.cfm for delayed orders; PSN is set by \cfm\orderForm3.cfm for next day orders and by \admin\batchOrderProcessing.cfm once the order is processed
[4]batchSettleAuth.cfm settles authorized credit cards, i.e., purchases (all orders with status 'CCC' in table FL_orderFulfillment = 'marked' in CyberCash database);
batchSettleRet.cfm settles refunds (i.e., all orders with status 'MRE' in table FL_returns = 'markret' in CyberCash database).
[5]FedEx shipment preparation (except for VALIDATION-ONLY shipments) creates a label file in <root>\FedExLabels\<tracking number>.gif
[6]\admin\batchNotifySupplier.cfm looks for the FedEx waybill label file \FedExLabels\<tracking number>.eps which has been converted by GIFtoEPS.bat and thus is dependent on GIFtoEPS.bat having run at some time; there is no direct scheduling dependence between the two. The program first sets the tokens in the packing list/greeting message template and then appends the associated waybill gif file.
batchNotifySupplier.cfm also deletes <tracking number>.gif; <tracking number>.ps gets deleted by batchDelLabelFiles once status is SHP or CCC WHEN INTRODUCING NEW STATUS CODES, MAKE SURE TO ADD THEM TO TABLE FL_orderFulfillmentStatus.

Status Codes

The following status codes are used in the order processing pipeline:

| Status Code | Description | Sequence |
|---|---|---|
| ERR | processing error | 0 |
| T | temporary | 1 |
| MAN | manual processing | 2 |
| EDT | editing | 3 |
| DEL | deleted by customer | 4 |
| FEX | FedEx shipment prepared | 10 |
| CCA | credit card authorized | 20 |
| PPR | pending processing | 30 |
| PSN | pending supplier notification | 40 |
| PSH | pending shipment | 50 |
| SHP | shipped | 60 |
| CCC | credit card captured | 70 |
| SET | settled | 80 |
| COM | completed | 90 |
| SPD | supplier paid | 100 |
| 999 | testing use only | |

The sequence number is used to check for global status. For example, the order tracking program (OrderTracking.cfm) only shows orders with sequence >20.

Returns/Refunds Processing Pipeline

TABLE

FL_returns and FL_returnsStatus

| # | Description | Program | Status[1] |
|---|---|---|---|
| 1 | transaction marked for return/refund | \admin\orderRefund.cfm | MRE |
| 2 | transaction settled | \admin\batchSettleAuth.cfm | SET |

Notes
[1] status code as set after successful completion of stage; set in table FL_returns. Valid status codes are:
MRE . . . marked for refund ('markret' in CyberCash database)
SET . . . credit card settled Batch Processes and Scheduling

| Time | Process | Description | Dependency |
|---|---|---|---|
| every 15 minutes on the quarter | <root>\FedExLabels\GIF to EPS.bat | converts FedEx waybill labels from GIF to EPS | none |
| every 15 min.; 2 min. after the quarter | <root>\admin\batchNotifySupplier.cfm | postprocesses packing list and EPS label files (adds Postscript wrapper, scales to proper size, add "showpage") | none directly but needs EPS file; looks for EPS files of orders with status PSN |
| 11:00 AM to 7:30 PM | <root>\admin\batchCheckDelivery.cfm | Determines whether an order has been delivered | none, but should be run during times when FedEx delivery is most likely |
| 8:00 PM to 10:30 PM | <root>\admin\batchCheckShip.cfm | determines whether order has been shipped; runs 3 times (every 60 minutes) in case there are any Internet communications problems; also sends shipment notification email | none but must run on same day as shipment creation |
| 10:00 PM | <root>\admin\batchFedExCancel.cfm | cancels FedEx VALIDATION-ONLY shipments | none but must run on same day as shipment creation |
| 10:15 PM | <root>\admin\AffiliateShipment.cfm | Create data transfer file for Be Free | After 10:00 PM PT but before 2:00 AM ET |
| 10:20 PM | <root>\admin\AffiliateOrder.cfm | Create data transfer file for Be Free | After 10:00 PM PT but before 2:00 AM ET |
| 10:30 PM | <root>\admin\batchDelLabelFiles.cfm | housekeeping task deletes FedEx label files (EPS) of shipped orders | none; looks at all orders with status SHP or CCC[1] |
| 8:00 to 11:00 PM | <root>\admin\batchCaptureCC.cfm | captures credit card purchases | batchCheckShip: looks at all orders with status SHP |
| 12:15 AM | <root>\admin\batchReminderService.cfm | Send email reminders of customer-selected events | none but should be run early in the morning |
| 1:00 AM 2:00 AM 3:00 AM 4:00 AM | <root>\admin\batchOrderProcessing.cfm (runs 3 times in case of FedEx problems) | processes all orders due for delivery the next day | none but must be run past midnight since it looks for the next day and uses today's ship date |
| 3:00 AM | <root>\admin\batchSettleAuth.cfm | settles captured credit cards | none; should run after batchCaptureCC |
| 3:30 AM | <root>\admin\batchSettleRet.cfm | settles returns/refunds | none |
| 12:05 AM | SP: pp_deleteTempOrders | deletes temporary orders (those that never were finished) | none |
| 12:10 AM | SP: pp_deleteTempCustomers | deletes temporary customers (those that never placed an order) | none |
| 10:00 PM | database dump | SQL Server dump of BMAO, Master and msdb databases | none |
| 10:30 PM | tape backup | daily and weekly incremental and full backup | SQL Server database dump |
| 5:00 PM Sunday | <root>\admin\AffiliateProduct.cfm | Create data transfer file for Be Free | Anytime, once a week |

Notes
[1] it is recommended to run batchDelLabelFiles.cfm before batchSettleAuth.cfm because the latter sets the status that the former acts upon. This way, shipping labels stay around for another day-just in case they might be needed again.

Special Access Permissions, Accounts and Drive Mappings
File Permissions
Application Server (FLOWERS1)
The following files in \\FLOWERS1\<root>\ admin require execute (X) permission for the IIS anonymous user (MIIS). This is because they are run as a batch process by the Cold Fusion scheduler which runs under the IIS anonymous account.
application.cfm
batch*.cfm
*.inc
<root>\admin and the following files in <root>\admin required execute (RX) permission for the group BMAOadmin:
*.html
Master FAX Server (FLOWERS3)
Administrators group needs full control over directory C:\ToBeFaxed. This way, \\FLOWERS3\FAXWorkServer account and also \\FLOWERS1\CFService (both part of Administrators group) have the necessary (RWD) (RWD) permissions on all deposited fax files. (batch process running on FLOWERS1 later deletes these files)

Shares
\\FLOWERS3\c:\ToBeFaxed needs to be as ToBeFaxed so that application server (FLOWERS1) can deposit and later delete fax files. UNC mapping is done in <root>\admin\application.cfm with parameter FAXDirectory as \\FLOWERS3.proflowers.com\ToBeFaxed. This parameter needs to be changed if the master fax server is moved to a different machine.
The Administrators group needs Change permission on share.
Cold Fusion
The Cold Fusion service must run under an account other than the local system account. This is so that access permissions and shares on the drive attached to the fax master server (share ToBeFaxed, physical drive \\FLOWERS3\c:\ToBeFaxed) can be set appropriately.
The Cold Fusion service is setup to run under the CFService account.
CFService must be part of the Administrators group.
Master FAX Server (FLOWERS3)
All conversion services (WorkServer1, WorkServer2) must run under the FAXWorkServer account, which must be part of the Administrators group. This allows fax files to be picked up from the drive shared with FLOWERS1 (share name ToBeFaxed; physical drive \\FLOWERS3\c:\ToBeFaxed) and converted to fax format by one of the work servers.

Upgrade/Maintenance Notes
This section details any special considerations that must be taken when upgrading or maintaining any of the installed software components.
Cold Fusion
Make sure that the Cold Fusion service runs under the local account CFService. This is necessary for Cold Fusion to be able to create files on share ToBeFaxed.

IP Address Changes
If the address of any machine changes, DNS on FLOWERS3 needs to be updated accordingly. In addition, the following must be considered:
1. FLOWERS2, SMTP Server: change relay security options to allow mail relay from FLOWERS1
2. FLOWERS3, master fax server: make sure LCR table on FLOWERS3 reflects any IP address changes
3. FLOWERS4/FLOWERS5, slave fax servers: make sure LCR table on FLOWERS3 reflects any IP address changes
4. FLOWERS1: change Proflowers Web site IP address address (Microsoft Management Console, right-click on Proflowers site)
5. FLOWERS1: change SSL certificate IP address (Microsoft Management Console, right-click on Proflowers site, properties; directory security, key manager)
If IP address of DNS server changes, a DNS Server change request must be submitted to InterNIC at www.internic.net.

FAX ARCHITECTURE
Refer to hand-drawn diagram

Master FAX Server Failure
In case of a master FAX server failure (i.e., failure of FLOWERS3), the following steps should be followed in order to make FLOWERS4 a temporary master FAX server:
1. change parameter FAXDirectory on application server (FLOWERS1) in <root>\admin\application.cfm to point to \\FLOWERS4.proflowers.com\ToBeFaxed (make sure that Administrators group has Change permission on share ToBeFaxed and (RWD) (RWD) permission on directory/files). Make sure that FLOWERS4 has the RightFAX PostScript converter installed.
2. change FAXPrinter parameter in \\FLOWERS1\<root>\admin\application.cfm to \\FLOWERS4\PSFAX
3. if possible, increase the Internet bandwidth on FLOWERS4 to T-1 speed since files that need to be deposited on \\FLOWERS4\ToBeFaxed by FLOWERS1 for fax conversion are over 600 KB in size.

Fax Database Corruption
In case of fax database corruption on master fax server (FLOWERS3), consult RightFAX Administration Guide, page 120, ff. If the database is non-recoverable, reinstall RightFAX with install option "install a blank database". In this case, new bump codes must be obtained from RightFAX Technical Support (click on RightFAX Server control panel applet on FLOWERS3). If any of the control panel applets are missing, make sure the appropriate control panel dil's are available (e.g., \WINNT\SYSTEM32\work_ctl.dll for the work servers)

SERVER TASKS
FLOWERS1—Web Server
Location
San Diego
DNS entries
flowers1.proflowers.com, www.proflowers.com, proflowers.com secure.proflowers.com (for SSL—Proflowers)

| Service | Description |
| --- | --- |
| MS IIS 4.0 | Microsoft Internet Information Server-Web Server, FTP Service |
| Cold Fusion Professional Application Server 3.1 | Application logic and batch processing |
| SSL | Secure Socket Layer, VeriSign Certificate |
| Jasc Image Robot | GIF to EPS/Postscript conversion |
| Diskeeper | NTFS file de-fragmentation |

-continued

| Service | Description |
|---|---|
| McAfee Netshield | Virus scanning and protection |
| NT Resource Kit 4.0 | Task scheduling |
| WinZip 6.1 | File decompression |
| Farallon Timbuktu | Server remote control |
| Crystal Reports | Cold Fusion report generation |
| FedEx ShipAPI | Connection to FedEx |
| MS SMTP Service | SMTP mail relay (secondary/backup for FLOWERS2) |

FLOWERS2—Database Server
Location
San Diego
DNS Entries
flowers2.profowers.com
fpt2.proflowers.com
epop.proflowers.com (for SMTP relay service)

| Service | Description |
|---|---|
| MS SQL Server 6.5 | Database service |
| MS SMTP Service | SMTP mail relay service |
| MS IIS 4.0 | Microsoft Internet Information Server-Web Server (disabled-used for backup and remote configuration), FTP Service |
| CyberCash Payment and Admin Server | Real-time credit card processing |
| Adobe Acrobat Reader | Viewer to read CyberCash documentation |
| Diskeeper | NTFS file de-fragmentation |
| McAfee Netshield | Virus scanning and protection |
| WinZip 6.1 | File decompression |
| Seagate/Arcada Backup Exec | Daily/weekly tape backup |
| Farallon Timbuktu | Server remote control |

FLOWERS3—Master FAX Server
Location
San Diego
DNS entries
flowers3.proflowers.com

| Service | Description |
|---|---|
| RightFAX Enterprise 5.x | fax service |
| RightFAX PostScript converter | PostScript conversion module |
| WinZip 6.1 | File decompression |
| Diskeeper | NTFS file de-fragmentation |
| Farallon Timbuktu | Server remote control |

FLOWERS4—Slave FAX Server
Also serves as fail-over for master FAX server.
Location
San Diego
DNS entries
flowers4.proflowers.com

| Service | Description |
|---|---|
| RightFAX Enterprise 5.x | fax service |
| RightFAX PostScript converter | PostScript conversion module |
| WinZip 6.1 | File decompression |

-continued

| Service | Description |
|---|---|
| Diskeeper | NTFS file de-fragmentation |
| Farallon Timbuktu | Server remote control |

FLOWERS5—Slave FAX Server
Location
San Francisco
DNS Entries
flowers5.proflowers.com

| Service | Description |
|---|---|
| RightFAX Enterprise 5.x | fax service |
| WinZip 6.1 | File decompression |
| Diskeeper | NTFS file de-fragmentation |
| Farallon Timbuktu | Server remote control |

BACKUPS

The following files and directories need to be backed up on a regular basis:

| Computer | Directory | Description | Schedule |
|---|---|---|---|
| FLOWERS1 | F:\BMAO | Application files, FedEx labels | Daily |
| FLOWERS2 | F:\SQLDevices\backup | SQL Server database dump | Daily, after 10:00 PM |
| FLOWERS2 | C:\cybercash | CyberCash database, merchant configuration, logs, . . . | Daily |
| FLOWERS3 | C:\NTBind\DNSData C:\WINNT\NAMED.BOOT | DNS files | Daily |

Rotation Schedule
Weekly full backup and daily incremental backup are scheduled for 10:30 PM. The weekly full backup runs on Monday night and erases the tape. Thus, a new tape should be inserted on Monday anytime between midnight and 10:00 PM.
The daily incremental backup runs every night and appends to the tape. Thus, any backup tape contains a full backup, augmented by six sets of daily incremental backups.
Note, that there is a heavy load on the servers during the nightly batch order processing, which starts at 1:00 a.m. During this time period, processing of other tasks should be minimized.

MAINTENANCE TASKS
FLOWERS1

| Task | Detail | Schedule |
|---|---|---|
| Check Error Log | BackOff ice | daily |
| Check batch processing logs | F:\bmao\log | daily |
| Correct batch settlement errors, if any | F:\bmao\log\BatchSettle.html CyberCash admin from BackOffice | daily |
| Check NT Event Viewer | NT Control Panel | daily |

-continued

| Task | Detail | Schedule |
|---|---|---|
| Check Cold Fusion Mail and Server logs | C:\apps\cfusion\mail\log C:\apps\cfusion\log | weekly |
| Delete Cold Fusion logs | C:\apps\cfusion\mail\log C:\apps\cfusion\log | monthly |

FLOWERS2

| Task | Detail | Schedule |
|---|---|---|
| Check NT Event Viewer | NT Control Panel | daily |
| Delete SQL Server maintenance reports | C:\MSSQL\log | monthly |
| Check/delete CyberCash logs | C:\CyberCash\logs | monthly |
| Export CyberCash orders | C:\CyberCash\export\BMAO use CyberCash administrator from BackOffice | monthly |

URL ACCESS TO APPLICATION

| | |
|---|---|
| Product Directory: | www.proflowers.com proflowers.com |
| Optional referrer tracking: | www.proflowers.com/index.cfm?REF<aaa> e.g.: www.proflowers.com/index.cfm?REF=Yahoo (the ref variable <aaa> can be up to 20 characters long-letters, numbers, and "–" only, no spaces unless they are in URL-encoded format (e.g., REF=Bernd+Lutz)-and is stored in the order table, FL_order as well as in FL_clickThru) |
| Click-thru tracking: | http://204.132.117.151 :88/ss?click&ProFlowers&<watch_code> e.g., http://204.132.117.151 :88/ss?click&ProFlowers&3517e5be |
| Order Tracking: | www.proflowers.com/orderTracking.cfm |
| BackOffice: | www.proflowers.com/admin |
| Email: | info@proflowers.com |

PRICE SENSITIVITY OF ORDER

A product price change issued from within the BackOffice has the following effect on the order process:

1 any new order started after the price change will immediately use the new price 2 an order in progress will exhibit the following behavior:

the price stays the same throughout the order process, i.e., the old price is being used. However, if the customer waits for more than 20 minutes before pushing the 'Finish Order' button, the screen automatically switches to the order edit form, which then reflects the new price. If no action is taken for an additional 20 minutes, the screen switches to the product directory.

while the price stays constant throughout a straight order process, it always changes to the most current price if and when the order is modified (i.e., the 'Modify Order' button is pushed').

Note, that at all times, the price displayed in the order receipt and/or order confirmation screen is the actual price that the customer pays.

Multiple Supplier Fax Machines

Fax machine numbers are entered through the BackOffice (Insert New Supplier or Work With Supplier). Up to four fax numbers are available to be entered. The entry fields are sequential. The program counts, from left to right, the number of non-empty fax fields. It stops counting as soon as if finds an empty field. Thus, if fax fields one, two and four have entries, oniy the first two are accounted for. The program then sets field NrOfFaxMachines in table FL_supplier with the number of fax numbers (i.e., two in the case above).

During real-time order processing (cfm\orderform3.cfm) and batch order processing (admin\batchOrderProcessing.cfm), each of the available fax numbers is selected randomly (see cfm\notifySupplier.cfm).

Packing List/Greeting Message Template

The template for the packing list and greeting card message is in file <root>\misc\FAXTemplate.doc To edit the template, use WordPad (not MS Word since its PostScript output is undesirable and Word '97 reformats the document such that it can no longer be read by WordPad). Make sure to set the document margins correctly; the left margin must be at 1 inch.

To generate the template that is used for PostScript conversion, i.e., substitution of the tokens with the actual order values, print the template document on the Apple LaserWriter printer (which should be set to output to file) to file <root>\misc\FAXTemplate.ps. Make sure to use a legal page size! If not possible, change page size in FAXTemplate.ps to Legal.

The Cold Fusion custom tag CFX_NotifySupplierPS converts the PostScript template to actual content. CFX_EPSPostProcess scales the associated EPS graphic (i.e., FedEx waybill label), adds the necessary PostScript codes, and appends it to the converted template file (see <root>\admin\batchNotifySupplier).

CREDIT CARD PROCESSING

Credit cards are always verified for correct format. Real-time verification and processing is done through CyberCash for orders with next day delivery, i.e., those orders that are faxed immediately (actually, there is a delay of up to 15 minutes, depending on the schedule frequency of <root>\admin\batchNotifySupplier.cfm) to the appropriate supplier for fulfillment.

Delayed orders, i.e., any orders placed after the supplier cutoff time, are verified for proper credit card format only and then authorized during the nightly order batch processing run the night before delivery. This process has the following advantages:

1. Avoidance of duplicate authorizations and the associated bank fees.

2. Faster online processing performance (no connection to CyberCash).

3. Orders with expired bank authorization (this may happen as early as five days after the initial authorization, i.e., placement of order) would have to be re-authorized under a different order ID. Besides being confusing and becoming an order tracking nightmare, this would also result in additional bank charges.

Storage of Credit Card Data

Credit card information, i.e., credit card number and expiration date, is only stored during the current user session and for up to 20 minutes of inactivity. The data is stored in session memory and not in the database.

For delayed orders, credit card information has to be available at the time of order processing (the night before delivery). Therefore, the necessary data is stored in table FL_tempCCData only until then and immediately deleted once the order has been processed.

SYSTEM OPERATIONS

The following tasks should be performed on a daily/weekly basis by trained operations personnel. These tasks do not include technical systems administration responsibilites, which are described elsewhere in this document.

All operational tasks are performed from within the BackOffice.

Daily Tasks

Processing Errors—check for any batch processing or online/real-time errors that may have occurred during the night or during the (previous) day. Take appropriate action.

Daily Logs—review all current logs and take appropriate action

Reports—compare Audit Report data with what actually has been shipped by the growers Weekly Tasks

TBD

Monthly Tasks

1. Remove previous month's log files (<root>\log)

Click-Thru Tracking

Table FL_clickThru keeps track of referral code, date, and time for each click-thru that is coded in the following format:

http://www.proflowers.com/index.cfm?REF=<whatever+banner+code+you+want> e.g., http://www.proflowers.com/index.cfm?REF=123Greetings-trycp

Note, that the referral code will be truncated to the first 20 characters. no funny characters or spaces are allowed (unless the latter are coded in URL-encoded format, such as REF=Bernd+Lutz).

Note, that each time index.cfm is called with the referral code parameter, an associated click-thru entry is made in FL_clickThru, even if this happens within the same user session. Alternative coding would be possible to only write a single click-thru entry within the same session.

Product Maintenance

Product appearance and Web viewing ability is determined by three factors:

1. Product display sequence
2. Product association with occasion and flower type
3. Product inventory

1 and #2 above are set within the product insert or edit pages, while #3 is accomplished with the Inventory feature. A product with a display sequence number of 255 is non-viewable by the Web user. The only exception to this rule is for the two products with the lowest display sequence number. These two products always show up on the home page.

Only products with inventory assigned to them can be ordered.

All the steps outlined below are administered from the BackOffice.

Adding a New Product

1. Insert new product—make sure to associate product with at least one occasion and/or flower type. The product display sequence number determines the relative display sequence, i.e., a product with a sequence number of 10 will be displayed before a product with sequence number 20.

Assign a picture file for the detail/full picture and one for the thumbnail view. Except for the top two products (in terms of display sequence), there will not be a broken picture link if there is no picture available; the (non-existing) picture will simply be ignored. However, if the product happens to be among the top two display products, a broken picture link will appear on the home page if there is no thumbnail picture.

A product with a display sequence number of 255 is non-viewable by the Web user.

2. Add inventory for product (Inventory feature)—unless the product is in the inventory of at least one supplier, it can not be ordered (a message indicating no current inventory will be displayed to the Web user).

Removing a Product

Work with Product—edit the product and remove all associations with occasion or flower type. Unless the product happens to be among the top two displayed products, it will not be visible to the Web user. To permanently remove a product, delete it. In this case, the associated inventory should be deleted as well. Make sure to check whether there are future orders for the product before deleting it or else the delayed order batch process will cancel the order and notify the customer via email of non-existing inventory.

Setting the Display Sequence of a Product

Whenever there is more than one product in the set of products to be displayed (e.g., show all roses), the order by which each product is displayed is determined by its relative display sequence. For example, product with display sequence of 10 will be positioned ahead of one with sequence 20. For identical numbers, random positioning takes place. To view the exact position of each product, goto "Work With Product". The product list is shown in order of display sequence. Note, that while the top two products always appear on the home page, regardless of whether they have any flowertype or occasion associations and irrespective of their absolute display sequence number, a product can only be viewed by the Web user if its display sequence is less than 255. A product with a display sequence number of 255 is non-viewable by the Web user. Products that are non-viewable are marked by a red asterisk.

Data Maintenance

To ensure proper operations of certain features, it is important to accurately maintain associated data. Details are described below. All tasks are administered from the BackOffice.

Occasion

These are the occasions listed in the pull-downs on the Web navigation bar.

They are also listed in BackOffice product insertion and editing.

Flower Type

These are the flower types listed in the pull-downs on the Web navigation bar. They are also listed in BackOffice product insertion and editing.

Holiday

Holidays (e.g., Valentine's Day, Mother's Day) must accurately reflect the month and day of their next appearance.

Data is used by Reminder Service.

Problem Type

Customers contacting Proflowers via the customer service form-driven contact feature will be presented with a list of these problem types.

Data is used in customer service contact form.

Ship Charge

These are the shipping charges on a state-by-state basis. The program calculates shipping charges from this data for each destination state.

Surcharge

Surcharges such as Saturday delivery are calculated from this data.

Turning now to FIG. 42 there is shown an illustration of a representative courier shipping label including an ornamental graphic design, namely, a heart. The idea is that while couriers may have used some ornamentation in having their own hard-copy labels printed, e.g., the use of the colors and corporate logos on printed waybills, such printing has not been generated at the computer of a shipper and/or under the selection and/or control of one other than the courier. The same can be said for greeting cards—these may have been the domain of those who compose them as a product in themselves, in contrast to being generated by those engaged in a particular shipment. Similarly, packing lists have not been known as the subject of much by way of ornamentation.

Under the present invention, the printer device of whoever is doing the shipping is a key feature, e.g., the printer 50 or a printer at the Consumer Ordering System 2, if that be the system carrying out the particular shipment at issue. One option is for the courier to communicate the graphical ornamentation when communicating the digital signals for the shipping label (the name and address of the sender, recipient, etc.) from the Courier Shipping System 41 to whoever will be generating the hard copy shipping label and who will also be doing a shipment pursuant to the shipping label. For example, by utilizing such software as the popular FedEx (Federal Express) Ship software or the like at a printer device remote from the Courier Shipping System 41, e.g., any user's/shipper's computer ordering a shipment or a distribution center carrying out such a shipment, the remotely generated shipping label can be given a decorated appearance. Color printing signals may also be employed where the local printer generating the label is a color printer. Optionally, such code can be operated or controlled at any or all of the following: Consumer Ordering System 2, Order Center System 26, Financial Institution System 33, Courier Shipping System 41, and/or a computer (not shown in FIG. 1) connected to the printer 50 at the Distribution Center System 51 in FIG. 1. Whichever computer system(s) is (are) at issue, the graphical element can be added to the greeting card, packing list, or courier label, or any combination thereof, and preferably on the sheet 57 for separation into respective pieces as discussed above. Such a graphic design can be generated by computer running such code as that set forth below.

'See if we need to print any holiday graphics pdteDDate=Data("DeliveryDate")& vbNullString 'Valentines Day graphics If Month(pdteDDate)=2 And Day(pdteDDate)=14 Then .DrawPicture LoadResPicture(4003, vbResBitmap), 4000, 6650

'maplPrintLocs(PL_HOLIDAY). Left, maplPrintLocs(PL_HOLIDAY). Top

ElseIf Month(pdteDDate)=5 And Weekday(pdteDDate)=vbSaturday Then

'Check for Mothers Day

If Day(pdteDDate)>6 And Day(pdteDDate)<14 Then

.DrawPicture LoadResPicture(4002, vbResBitmap), 4000, 6650

'maplPrintLocs(PL_HOLIDAY). Left, maplPrintLocs(PL_HOLIDAY). Top End If

ElseIf Month(pdteDDate)=12 And Day(pdteDDate)=24 Then

'Christmas Graphic

.DrawPicture LoadResPicture(4005, vbResBitmap), 4000, 6650' maplPrintLocs(PL_HOLIDAY).Left, maplPrintLocs(PL_HOLIDAY). Top

This code can be located in the pfPrint project in VSS (see, e.g., Appendix of Ser. No. 09/149,650, incorporated by reference).

In such an embodiment, the invention can be considered as a method for generating an ornamental design on a courier shipping label at a non-courier printer in connection with printing the label for a particular shipment specified on the label, the method including the steps of: assigning shipping information signals corresponding to a shipping label for a particular shipment with a digital electrical computer shipping apparatus; transmitting the shipping information signals corresponding to the shipping label for the particular shipment to a non-courier printer device; combining the shipping information signals corresponding to the shipping label for the particular shipment with signals corresponding to an ornamental design; and printing the shipping label for the particular shipment at the non-courier printer device including an ornamental design.

In any of the foregoing, the method can be carried out so that the ornamental design includes a heart, a wreath, or another holiday symbol, and even a first design that includes a second design, wherein the designs may or may not be printed in color, as may be desired. Preferably the ornamental design is a bit map, not including a logo, shipment, or courier information. The method can further include the step of controlling addition of the design to the shipping label at an ordering system computer, at an ordering center system computer, at a financial institution system computer, and/or at a distribution center system.

Indeed, the invention encompasses generating an ornamental design on a sheet including a member from a group consisting of a courier shipping label, a greeting card, and a packing list, the member printed at a shipper printer device in connection with a particular shipment, the method including the steps of: assigning digital electrical signals corresponding to a member of the group for a particular shipment;

transmitting the digital electrical signals corresponding to the member of the group for the particular shipment to a shipper printer device; combining the digital electrical signals corresponding to the member of the group for the particular shipment with signals corresponding to an ornamental design; and printing the member of the group, including the ornamental design, for the particular shipment at the shipper printer device.

Another way of viewing the invention is as method for generating an ornamental design on a sheet including a member from a group consisting of a courier shipping label, a greeting card, and a packing list, the member printed at a shipper printer device in connection with a particular shipment including at least two members of the group, the method including the steps of: assigning digital electrical signals corresponding to a member of the group for a particular shipment; transmitting the digital electrical signals corresponding to the member of the group for the particular shipment to a shipper printer device; combining the digital electrical signals corresponding to the member of the group for the particular shipment with signals corresponding to an ornamental design; and printing the member of the group, including the ornamental design, for the particular shipment at the shipper printer device. Preferably, at least two members are printed on the same sheet, and better still, all the members are printed on the same sheet. Also preferable is to have a step of combining ornamental design signals with signals for printing another member of the group, if not each member of the group, and depending upon the embodiment at issue, to have the design be the same on whatever of the members are at issue.

Turning now to FIG. 43, there is an illustration of representative printing the graphical element, including for a greeting card, for a packing list, and for a courier shipping label including respective ornamental graphic designs. In FIG. 43, the designs include a Christmas wreath, a heart, and a heart with the word "MOM" written therein, e.g., a first design with a second design therein. Any such holiday graphical element can be selectable at the above-referenced computers for graphic ornamentation of a greeting message, courier label, packing list, and/or the like that is computer-generated preferably at a shipper's location (such as a distribution center), e.g., by using shipping label data assigned by/from a carrier computer. On the shipping label, such bit maps can utilize areas on the sheet that are not utilized for scanning shipping data. Said graphical designs are distinct from information used for the shipment, billing, identification of parties involved, etc., and the purpose is not functional as regards the shipment. For example, the particular kind of flowers can be used as the design wherever on the sheet as may be desired, or the contents of the box can also be illustrated with the graphical element or design. Therefore, there can be more than an ornamental utility in utilizing such designs as customizable elements or messages—the designs and/or their location can assist in sorting the shipments or packages, e.g., so that personal Valentine's Day gifts can be conveniently sorted from business communications, items such as fresh food that requires refrigeration can be illustrated distinct from items that do not require refrigeration, etc.

VII. CONCLUSION

While a particular embodiment of the present invention has been disclosed with a preferred application to flowers, it is to be understood that various different applications and modifications are possible and are within the true spirit of the invention, the scope of which is to be determined with reference to the claims set forth below. Of course, the invention can be carried out by using multiple computers or by using the same computer to handle operations sequentially, as would be equivalent under the circumstances—software embodiments being equivalent to hardwired embodiments, as is well known in the art. There is no intention, therefore, to limit the invention to the exact disclosure presented herein as a teaching of one embodiment of the invention.

We claim:

1. A method of generating an ornamental design, the method including the steps of:
    assigning shipping information signals corresponding to a waybill for a particular shipment with a courier computer;
    transmitting the shipping information signals to a non-courier printer device;
    combining the shipping information signals with signals corresponding to an ornamental design; and
    printing the waybill, including the ornamental design on the waybill, for the particular shipment at the non-courier printer device.

2. The method of claim 1, wherein the step of printing includes printing the ornamental design including a heart.

3. The method of claim 1, wherein the step of printing includes printing the ornamental design including a wreath.

4. The method of claim 1, wherein the step of printing includes printing the ornamental design is in color.

5. The method of claim 1, wherein the ornamental design includes printing a bit map not including a logo, shipment information, or courier information.

6. The method of claim 1, wherein the step of printing includes printing the ornamental design as a first design and said first design includes a second design.

7. The method of claim 1, further including the step of controlling addition of the design to the waybill at an ordering system computer.

8. The method of claim 4, further including the step of controlling addition of the design to the waybill at an ordering center system computer.

9. The method of claim 1, further including the step of controlling addition of the design to the waybill at a financial institution system computer.

10. The method of claim 1, further including the step of controlling addition of the design to the waybill at a distribution center system.

11. A method of generating an ornamental design, the method including the steps of:
    assigning shipping information signals corresponding to a waybill for a particular shipment with a courier computer;
    controlling addition of an ornamental design on a sheet conveyed with the shipment, the sheet including a member of the group including the waybill, a greeting card, a packing list, and a combination thereof;
    transmitting the digital electrical signals corresponding to the waybill and signals corresponding to the ornamental design a shipper printer device;
    printing the waybill and printing along with the ornamental design on the member of the group with the shipper printer device; and
    shipping the member of the group with the ornamental design, along with the particular shipment, in accordance with the waybill.

12. The method of claim 11, wherein the step of printing includes printing the ornamental design including a heart.

13. The method of claim 11, wherein the step of printing includes printing the ornamental design including a wreath.

14. The method of claim 11, wherein the step of printing includes printing the ornamental design is in color.

15. The method of claim 11, wherein the step of printing includes printing the ornamental design includes printing a bit map not including a logo, shipment information, or courier information.

16. The method of claim 11, wherein the step of printing includes printing the ornamental design as a first design and said first design includes a second design.

17. The method of claim 11, further including the step of controlling addition of the design at an ordering system computer.

18. The method of claim 15, further including the step of controlling addition of the design at an ordering center system computer.

19. The method of claim 11, further including the step of controlling addition of the design at a financial institution system computer.

20. The method of claim 11, further including the step of controlling addition of the design at a distribution center system.

21. A method of generating a waybill, the method including the steps of:
assigning shipping information signals corresponding to a waybill for a particular shipment with a courier computer;
controlling addition of an ornamental design on a sheet conveyed with the shipment, the sheet including a member of the group including the waybill, a greeting card, a packing list, and a combination thereof;
transmitting the digital electrical signals corresponding to the waybill and signals corresponding to the ornamental design to a shipper printer device;
printing the waybill and printing the ornamental design on the member of the group at the shipper printer device; and
shipping at least two members of the group, along with the shipment, in accordance with the waybill.

22. The method of claim 21, wherein said step of printing is carried out such that said at least two members are printed on the same sheet.

23. The method of claim 21, wherein said step of printing is carried out such that all said members are printed on the same sheet.

24. The method of claim 20, further including the steps of:
combining ornamental design signals with signals for printing an other member of the group; and
printing the other member of the group, including the ornamental design, for the particular shipment at the shipper printer device.

25. A method of using a digital computer apparatus located at an order center to ship a product from a remotely located distribution center, the method including the steps of:
producing output electrical signals representing a packing list for an order of a product by causing an order center apparatus located at an order center to change input digital signals into the output digital signals, the order center apparatus including a digital computer having a processor, the processor operably connected to a memory device for storing and retrieving machine-readable signals in the memory device, to an input device for receiving input data and converting the input data into the input signals, and to an output device for receiving the output signals, and wherein the processor is controlled by a computer program to implement the step of producing;
assigning shipping information signals to the order with a digital computer shipping apparatus;
linking, by digital communication, the signals representing the packing list with the shipping information signals;
transmitting the signals representing the packing list to, and receiving the signals representing the packing list at, a printer device at a distribution center located remotely from the order center;
printing the packing list at the printer device at the distribution center; and
shipping the product specified by the packing list, in accordance with the shipping information signals, from the distribution center;
entering more of the input data at the input device to produce more of the output signals representing a customized message and a customized graphical element received from an ordering system for communication to a recipient of the product; wherein:
the step of linking includes linking, by digital communication, the signals representing packing list with the signals representing the customized graphical element;
the step of transmitting includes transmitting the signals representing the customized graphical element, along with the shipping information signals, to the printer device at the distribution center;
the step of printing includes printing the customized graphical element, along with the packing list and a shipping label, at the printing device at the distribution center; and
the step of shipping is carried out by shipping the customized graphical element, along with the product, from the distribution center.

26. The method of claim 25, wherein the step of printing includes printing the message and the graphical element on a greeting card.

27. The method of claim 25, wherein the step of printing is carried out by locating a sheet in the printer, the sheet including a greeting card for the message and having preprinted artwork and demarcations for detaching the greeting card from the packing list and the shipping label; and wherein the step of shipping includes separating the packaging list, the shipping information, and the greeting card by tearing the sheet at the demarcations.

28. A product produced by the method of any one of claims 1-27.

29. A computer system to generate an ornamental design, the system including:
a courier computer programmed to carry out the steps of:
assigning shipping information signals corresponding to a waybill for a particular shipment;
combining the shipping information signals with signals corresponding to an ornamental design; and
transmitting the shipping information signals to a non-courier printer device to enable printing the waybill, including printing the ornamental design on the waybill, for the particular shipment.

30. The system of claim 29, wherein the ornamental design includes a heart.

31. The system of claim 29, wherein the ornamental design includes a wreath.

32. The system of claim 29, wherein the ornamental design is printed in color.

33. The system of claim 29, wherein the ornamental design is a printing of bit map, said bit map not including a logo, shipment information, or courier information.

34. The system of claim 29, wherein the ornamental design is a first design and said first design includes a second design.

35. The system of claim 29, further including the step of controlling addition of the design to the waybill at an ordering system computer.

36. The system of claim 29, further including the step of controlling addition of the design to the waybill at an ordering center system computer.

37. The system of claim 29, further including the step of controlling addition of the design to the waybill at a financial institution system computer.

38. The system of claim 29, further including the step of controlling addition of the design to the waybill at a distribution center system.

39. A computer system to generate an ornamental design, the system including:
    a computer programmed to carry out the step of controlling addition of an ornamental design on a sheet conveyed with the shipment, the sheet including a member of the group including a waybill, a greeting card, a packing list, and a combination thereof; and
    a courier computer programmed to carry out the steps of
    assigning shipping information signals corresponding to the waybill for a particular shipment with the courier computer; whereby
    the digital electrical signals corresponding to the waybill and signals corresponding to the ornamental design are transmitted to a shipper printer device to enable printing the waybill and the ornamental design is printed on the member of the group with the shipper printer device; and
    the member of the group is shipped with the ornamental design, along with the particular shipment, in accordance with the waybill.

40. The system of claim 39, wherein the ornamental design includes a heart.

41. The system of claim 39, wherein the ornamental design includes a wreath.

42. The system of claim 39, wherein the ornamental design is printed in color.

43. The system of claim 39, wherein the ornamental design is a printing of bit map, said bit map not including a logo, shipment information, or courier information.

44. The system of claim 39, wherein the ornamental design is a first design and said first design includes a second design.

45. The system of claim 39, wherein the computer programmed to carry out the step of controlling addition of the design is an ordering system computer.

46. The system of claim 44, wherein the computer programmed to carry out the step of controlling addition of the design is an ordering center system computer.

47. The system of claim 39, wherein the computer programmed to carry out the step of controlling addition of the design is a financial institution system computer.

48. The system of claim 39, wherein the computer programmed to carry out the step of controlling addition of the design is a distribution center system.

49. A computer system to generate a waybill, the system including:
    means for controlling addition of an ornamental design on a sheet conveyed with the shipment, the sheet including a member of the group including a waybill, a greeting card, a packing list, and a combination thereof; and
    a courier computer programmed to carry out the steps of:
    assigning shipping information signals corresponding to a waybill for a particular shipment;
    communicating the digital electrical signals corresponding to the waybill and signals corresponding to the ornamental design to a printer device; and
    printing the waybill and printing the ornamental design on the member of the group at the printer device to enable shipping at least two members of the group, along with the shipment, in accordance with the waybill.

50. The system of claim 49, wherein said at least two members are printed on the same sheet.

51. The system of claim 49, wherein all said members are printed on the same sheet.

52. The system of claim 49, wherein the courier computer is programmed to carry out the steps of:
    combining ornamental design signals with signals for printing an other member of the group; and
    printing the other member of the group, including the ornamental design, for the particular shipment at the printer device.

53. A method for using an order center apparatus to ship a product, the method including the steps of:
    producing signals representing a packing list for an order of the product with the order center apparatus, located at an order center, the order center apparatus including a computer having a programmed processor;
    linking, by a digital communication, the signals representing the packing list with waybill shipping information signals;
    receiving the signals representing the packing list at a printer device at a distribution center located separately from the order center;
    combining the waybill shipping information signals with signals corresponding to an ornamental design specified at an consumer ordering system;
    printing the waybills including an printing the ornamental design on the waybill, at the printer device;
    printing the packing list at the printer device; and
    shipping the product specified by the packing list from the distribution center, in accordance with the waybill shipping information signals by using the waybill with the ornamental design.

54. The method of claim 53, wherein the ornamental design includes a heart.

55. The method of claim 53, wherein the ornamental design includes a wreath.

56. The method of claim 53, wherein the ornamental design is printed in color.

57. The method of claim 53, wherein the ornamental design is a printing of bit map, said bit map not including a logo, shipment, or courier information.

58. The method of claim 53, wherein the ornamental design is a first design and said first design includes a second design.

59. The method of claim 53, further including the step of controlling addition of the design to the shipping label at an ordering system computer.

60. The method of claim 53, further including the step of controlling addition of the design to the shipping label at an ordering center system computer.

61. The method of claim 53, further including the step of controlling addition of the design to the shipping label at a financial institution system computer.

62. The method of claim 53, further including the step of controlling addition of the design to the shipping label at a distribution center system.

63. A method for generating an ornamental design on a sheet including a member from a group consisting of a courier waybill shipping label, a greeting card, and a packing list, the member printed at a shipper printer device in connection with a particular shipment, the method including the steps of:

assigning, with a consumer ordering system, digital electrical signals corresponding to a member of the group for a particular shipment;

transmitting the digital electrical signals corresponding to the member of the group for the particular shipment to an order center apparatus;

combining, under control of the order center apparatus, the digital electrical signals corresponding to the member of the group for the particular shipment with signals corresponding to an ornamental design;

printing the member of the group, and printing including the ornamental design on the member, for the particular shipment at a shipper printer device; and shipping the member of the group under control of the order center apparatus in accordance with waybill shipping information signals triggered by said ordering center apparatus.

64. The method of claim 63, wherein the ornamental design includes a heart.

65. The method of claim 63, wherein the ornamental design includes a wreath.

66. The method of claim 63, wherein the ornamental design is printed in color.

67. The method of claim 63, wherein the ornamental design is a printing of bit map, said bit map not including a logo, shipment, or courier information.

68. The method of claim 63, wherein the ornamental design is a first design and said first design includes a second design.

69. The method of claim 63, further including the step of controlling addition of the design at an ordering system computer.

70. The method of claim 63, further including the step of controlling addition of the design at an ordering center system computer.

71. The method of claim 63, further including the step of controlling addition of the design at a financial institution system computer.

72. The method of claim 63, further including the step of controlling addition of the design at a distribution center system.

73. A method for generating an ornamental design on a sheet including a member from a group consisting of a courier waybill shipping label, a greeting card, and a packing list, the member printed at a shipper printer device in connection with a particular shipment including at least two members of the group, the method including the steps of:

assigning, with a consumer ordering system, digital electrical signals corresponding to a member of the group for a particular shipment;

transmitting the digital electrical signals corresponding to the member of the group for the particular shipment to an order center apparatus;

combining, under control of the order center apparatus, the digital electrical signals corresponding to the member of the group for the particular shipment with signals corresponding to an ornamental design;

printing the member of the group, including printing the ornamental design on the member, for the particular shipment at a shipper printer device; and shipping the member of the group under control of the order center apparatus in accordance with waybill shipping information signals triggered by said ordering center apparatus.

74. The method of claim 73, wherein said at least two members are printed on the same sheet.

75. The method of claim 73, wherein all said members are printed on the same sheet.

76. The method of claim 73, further including the steps of:

combining ornamental design signals with signals for printing another member of the group; and printing the member of the group, including the ornamental design, for the particular shipment at the shipper printer device.

77. A method for using a digital electrical computer apparatus located at an order center for shipping a product from a remotely located distribution center, the method including the steps of:

producing output electrical signals representing a packing list for an order of a product by causing an order center apparatus located at an order center to change input digital electrical signals into the output digital electrical signals, the order center apparatus including a digital electrical computer having a processor, the processor electrically connected to a memory device for storing and retrieving machine-readable signals in the memory device, to an input device for receiving input data and converting the input data into the input electrical signals, and to an output device for receiving the output electrical signals, and wherein the processor is controlled by a computer program to implement the step of producing;

assigning waybill shipping information signals to the order with a digital electrical computer shipping apparatus;

linking, by digital communication, the signals representing the packing list with the waybill shipping information signals;

transmitting the signals representing the packing list to, and receiving the signals representing the packing list at, a printer device at a distribution center located remotely from the order center;

printing the packing list at the printer device at the distribution center; and shipping the product specified by the packing list, in accordance with the waybill shipping information signals, from the distribution center;

entering more of the input data at the input device to produce more of the output electrical signals representing a customized message and a customized graphical element received from an ordering system for communication to a recipient of the product, wherein:

the step of linking includes linking, by digital communication, the signals representing packing list with the signals representing the customized graphical element;

the step of transmitting includes transmitting the signals representing the customized element, along with the waybill shipping information signals, to the printer device at the distribution center;

the step of printing includes printing the customized graphical element, along with the packing list and a waybill shipping label, at the printing device at the distribution center; and the step of shipping is carried out by shipping the customized graphical element, along with the product, from the distribution center under control of the order center apparatus in accordance with the waybill shipping information signals as triggered by said ordering center apparatus.

78. The method of claim 77, wherein the step of printing includes printing the message and the graphical element on a greeting card.

79. The method of claim 77, wherein the step of printing is carried out by locating a sheet in the printer, the sheet including a greeting card for the message and having pre-printed artwork and demarcations for detaching the greeting card from the packing list and the shipping label; and wherein the step of shipping includes separating the packaging list, the shipping information, and the greeting card by tearing the sheet at the demarcations.

* * * * *